(12) United States Patent
Clark et al.

(10) Patent No.: US 7,944,932 B2
(45) Date of Patent: *May 17, 2011

(54) INTERCONNECT FABRIC FOR A DATA PROCESSING SYSTEM

(75) Inventors: Leo J. Clark, Georgetown, TX (US);
James S. Fields, Jr., Austin, TX (US);
Guy L. Guthrie, Austin, TX (US);
William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 12/060,751

(22) Filed: Apr. 1, 2008

(65) Prior Publication Data

US 2008/0181244 A1 Jul. 31, 2008

(51) Int. Cl.
*H04L 12/28* (2006.01)
*G06F 15/173* (2006.01)
*G06F 15/76* (2006.01)
*G06F 15/00* (2006.01)

(52) U.S. Cl. ............. 370/400; 709/238; 712/11; 712/28
(58) Field of Classification Search .................... None
See application file for complete search history.

(56) References Cited

U.S. PATENT DOCUMENTS

| | | | |
|---|---|---|---|
| 5,060,141 A * | 10/1991 | Wakatani | 711/219 |
| 5,452,330 A | 9/1995 | Goldstein | |
| 5,644,753 A | 7/1997 | Ebrahim et al. | |
| 6,038,644 A * | 3/2000 | Irie et al. | 711/141 |
| 6,038,651 A * | 3/2000 | VanHuben et al. | 712/21 |
| 6,260,174 B1 | 7/2001 | Van Loo | |
| 6,434,145 B1 | 8/2002 | Opsasnick et al. | |
| 6,581,115 B1 | 6/2003 | Arimilli et al. | |
| 6,826,640 B1 | 11/2004 | Chang | |
| 7,415,594 B2 | 8/2008 | Doerr et al. | |
| 7,483,422 B2 | 1/2009 | Fields | |
| 7,526,631 B2 * | 4/2009 | Arimilli et al. | 712/11 |
| 2001/0021187 A1 * | 9/2001 | Saeki et al. | 370/389 |
| 2004/0190546 A1 * | 9/2004 | Jackson | 370/463 |
| 2005/0038978 A1 | 2/2005 | Nickolls et al. | |
| 2005/0125563 A1 | 6/2005 | Douglas | |
| 2005/0143843 A1 | 6/2005 | Bogin et al. | |
| 2007/0296873 A1 | 12/2007 | Ironi et al. | |
| 2008/0148009 A1 | 6/2008 | Doerr et al. | |

OTHER PUBLICATIONS

Office Action for Related U.S. Appl. No. 12/057,907 mailed Apr. 15, 2009.
Office Action for Related U.S. Appl. No. 11/055,399 dated Jan. 21, 2010.

* cited by examiner

*Primary Examiner* — Pankaj Kumar
*Assistant Examiner* — Hicham B Foud
(74) *Attorney, Agent, or Firm* — Dillon & Yudell LLP

(57) ABSTRACT

A data processing system includes a plurality of processing units each having a respective point-to-point communication link with each of multiple others of the plurality of processing units but fewer than all of the plurality of processing units. Each of the plurality of processing units includes interconnect logic, coupled to each point-to-point communication link of that processing unit, that broadcasts operations received from one of the multiple others of the plurality of processing units to one or more of the plurality of processing units.

15 Claims, 38 Drawing Sheets

First Tier (XYZ) Link Information Allocation

| | (Cycle Modulo 8 = 0) | (Cycle Modulo 8 = 1) | (Cycle Modulo 8 = 2) | (Cycle Modulo 8 = 3) | (Cycle Modulo 8 = 4) | (Cycle Modulo 8 = 5) | (Cycle Modulo 8 = 6) | (Cycle Modulo 8 = 7) |
|---|---|---|---|---|---|---|---|---|
| Byte 0 | TT 700a | Master Tag 706a | TT 700b | Master Tag 706b | Data (0-7) 716a | Data (8-15) 716b | Data (16-23) 716c | Data (24-31) 716d |
| Byte 1 | Addr (low) 702a1 | Addr (hi) 702a2 | Addr (low) 702b1 | Addr (hi) 702b2 | | | | |
| Byte 2 | | Local Presp 708a | | Local Presp 708b | | | | |
| Byte 3 | | | | | | | | |
| Byte 4 | | Cresp 710a | | Cresp 710b | | | | |
| Byte 5 | | Remote Presp 712a | Data Tag 714 | Remote Presp 712b | | | | |
| Byte 6 | (reserve) 704 | | | | | | | |
| Byte 7 | | | | Data token 715 | | | | |

FIGURE 7A

Second Tier (A) Link Information Allocation

| | (Cycle Modulo 8 = 0) | (Cycle Modulo 8 = 1) | (Cycle Modulo 8 = 2) | (Cycle Modulo 8 = 3) | (Cycle Modulo 8 = 4) | (Cycle Modulo 8 = 5) | (Cycle Modulo 8 = 6) | (Cycle Modulo 8 = 7) |
|---|---|---|---|---|---|---|---|---|
| Byte 0 | TT 700a | Master Tag 706a | TT 700b | Master Tag 706b | Data (0-7) 716a | Data (8-15) 716b | Data (16-23) 716c | Data (24-31) 716d |
| Byte 1 | Addr (low) 702a1 | Addr (hi) 702a2 | Addr (low) 702b1 | Addr (hi) 702b2 | | | | |
| Byte 2 | | | | | | | | |
| Byte 3 | | (rsv) 718a | | (rsv) 718b | | | | |
| Byte 4 | | Cresp 710a | | Cresp 710b | | | | |
| Byte 5 | | | Data Tag 714 | | | | | |
| Byte 6 | (reserve) 704 | Remote Presp 712a | | Remote Presp 712b | | | | |
| Byte 7 | | | | | | | | |

Data token 715

FIGURE 7B

First Tier (XYZ) Link Information Allocation

| | (Cycle Modulo 6 = 0) | (Cycle Modulo 6 = 1) | (Cycle Modulo 6 = 2) | (Cycle Modulo 6 = 3) | (Cycle Modulo 6 = 4) | (Cycle Modulo 6 = 5) |
|---|---|---|---|---|---|---|
| Byte 0 | TT 800 | Master Tag 806 | Data (0-7) 816a | Data (8-15) 816b | Data (16-23) 816c | Data (24-31) 816d |
| Byte 1 | Addr (low) 802a1 | | | | | |
| Byte 2 | | Addr (hi) 802a2 | | | | |
| Byte 3 | | Local Presp 808 | | | | |
| Byte 4 | | Cresp 810 | | | | |
| Byte 5 | | | | | | |
| Byte 6 | Data Tag 814 | Remote Presp 812 | | | | |
| Byte 7 | | Data token 815 | | | | |

FIGURE 8A

Second Tier (A) Link Information Allocation

| (Cycle Modulo 6 = 0) | (Cycle Modulo 6 = 1) | (Cycle Modulo 6 = 2) | (Cycle Modulo 6 = 3) | (Cycle Modulo 6 = 4) | (Cycle Modulo 6 = 5) |
|---|---|---|---|---|---|
| TT 800 | Master Tag 806 | Data (0-7) 816a | Data (8-15) 816b | Data (16-23) 816c | Data (24-31) 816d |
| Addr (low) 802a1 | Addr (hi) 802a2 | | | | |
| | (rsv) 818 | | | | |
| | Cresp 810 | | | | |
| Data Tag 814 | Remote Presp 812 | | | | |
| Data token 815 | | | | | |

Byte 0, Byte 1, Byte 2, Byte 3, Byte 4, Byte 5, Byte 6, Byte 7

FIGURE 8B

INTERCONNECT FABRIC FOR A DATA PROCESSING SYSTEM

CROSS-REFERENCE TO RELATED APPLICATIONS

The present application is related to the following applications, which are assigned to the assignee of the present invention and incorporated herein by reference in their entireties:

(1) U.S. patent application Ser. No. 11/055,297, now U.S. Pat. No. 7,254,694;

(2) U.S. patent application Ser. No. 11/055,299, now U.S. Pat. No. 7,451,231; and (3) U.S. patent application Ser. No. 11/055,366, now U.S. Pat. No. 7,483,422.

BACKGROUND OF THE INVENTION

1. Technical Field

The present invention relates in general to data processing systems and, in particular, to an improved interconnect fabric for data processing systems.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

As the clock frequencies at which processing units are capable of operating have risen and system scales have increased, the latency of communication between processing units via the system interconnect has become a critical performance concern. To address this performance concern, various interconnect designs have been proposed and/or implemented that are intended to improve performance and scalability over conventional bused interconnects.

SUMMARY OF THE INVENTION

The present invention provides an improved data processing system, interconnect fabric and method of communication in a data processing system.

In one embodiment, a data processing system includes a plurality of processing units each having a respective point-to-point communication link with each of multiple others of the plurality of processing units but fewer than all of the plurality of processing units. Each of the plurality of processing units includes interconnect logic, coupled to each point-to-point communication link of that processing unit, that broadcasts operations received from one of the multiple others of the plurality of processing units to one or more of the plurality of processing units.

In another embodiment, a data processing system includes a plurality of processing units each having a respective point-to-point communication link with each of multiple others of the plurality of processing units but fewer than all of the plurality of processing units. Each of the plurality of processing units includes interconnect logic, coupled to each point-to-point communication link of that processing unit, that broadcasts requests received from one of the multiple others of the plurality of processing units to one or more of the plurality of processing units. The interconnect logic includes a partial response data structure including a plurality of entries each associating a partial response field with a plurality of flags respectively associated with each processing unit containing a snooper from which that processing unit will receive a partial response. The interconnect logic accumulates partial responses of processing units by reference to the partial response field to obtain an accumulated partial response, and when the plurality of flags indicate that all processing units from which partial responses are expected have returned a partial response, outputs the accumulated partial response.

In yet another embodiment, a data processing system includes a plurality of processing units, including at least a local master and a local hub, which are coupled for communication via a communication link. The local master includes a master capable of initiating an operation, a snooper capable of receiving an operation, and interconnect logic coupled to a communication link coupling the local master to the local hub. The interconnect logic includes request logic that synchronizes internal transmission of a request of the master to the snooper with transmission, via the communication link, of the request to the local hub.

In yet another embodiment, a data processing system includes a plurality of processing units coupled for communication by a communication link and a configuration register. The configuration register has a plurality of different settings each corresponding to a respective one of a plurality of different link information allocations. Information is communicated over the communication link in accordance with a particular link information allocation among the plurality of link information allocations determined by a respective setting of the configuration register.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIGS. 7A-7B illustrate a first exemplary link information allocation for the first and second tier links in accordance with the present invention;

FIGS. 8A-8B depict a second exemplary link information allocation for the first and second tier links in accordance with the present invention;

DETAILED DESCRIPTION OF ILLUSTRATIVE EMBODIMENT

I. Processing Unit and Data Processing System

Figure 1:
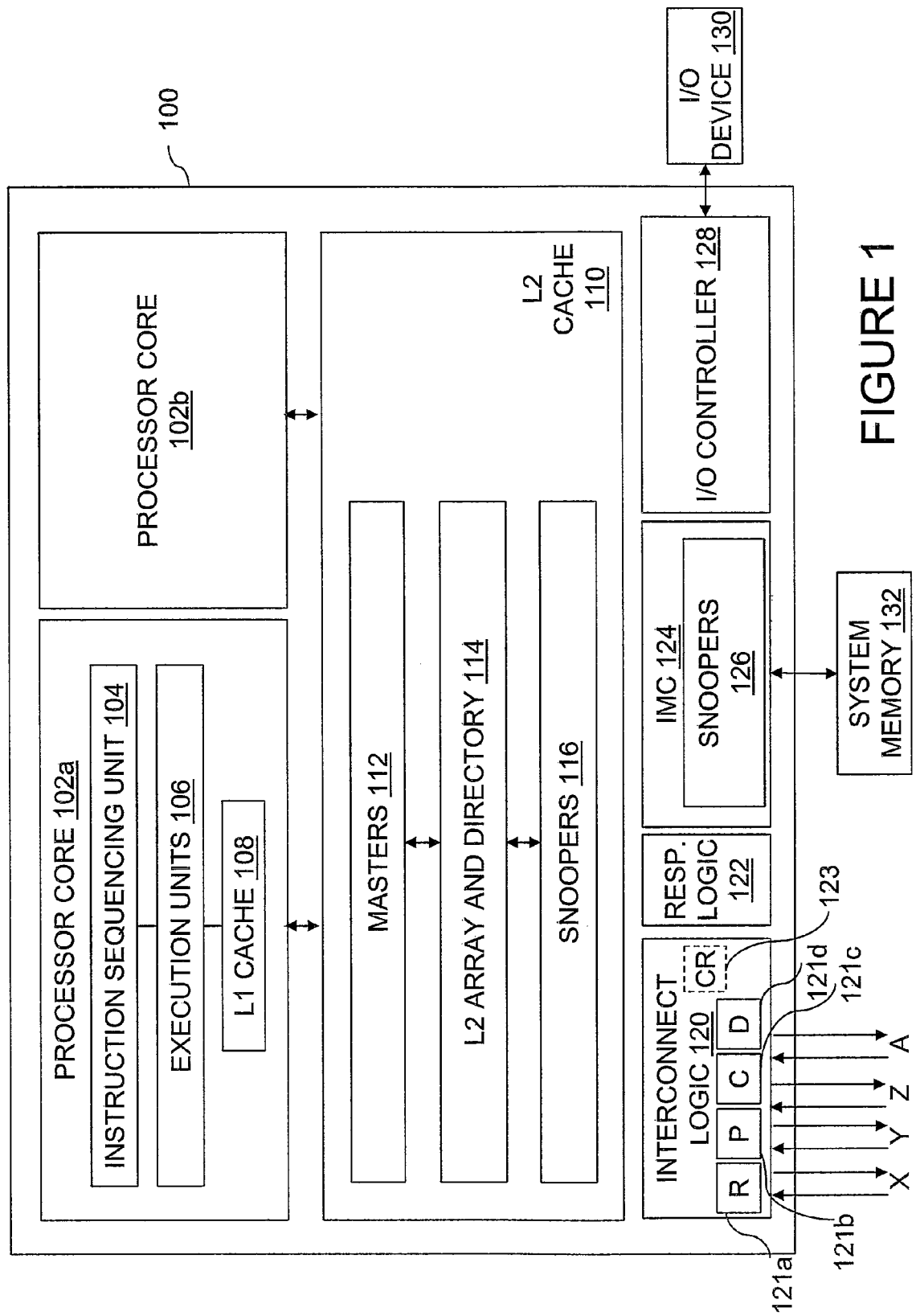
FIG. 1 is a high level block diagram of a processing unit in accordance with the present invention.

With reference now to the figures and, in particular, with reference to FIG. 1, there is illustrated a high level block diagram of an exemplary embodiment of a processing unit 100 in accordance with the present invention. In the depicted embodiment, processing unit 100 is a single integrated circuit including two processor cores 102a, 102b for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by a snooper 126.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. L2 cache 110 includes an L2 array and directory 114, masters 112 and snoopers 116. Masters 112 initiate transactions on the interconnect fabric and access L2 array and directory 114 in response to memory access (and other) requests received from the associated processor cores 102a, 102b. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number N of "first tier" interconnect links, which in this case include in-bound and out-bound X, Y and Z links. Interconnect logic 120 further supports two second tier links, designated in FIG. 1 as in-bound and out-bound A links. With these first and second tier links, each processing unit 100 may be coupled for bi-directional communication to up to N/2+1 (in this case, four) other processing units 100. Interconnect logic 120 includes request logic 121a, partial response logic 121b, combined response logic 121c and data logic 121d for processing and forwarding information during different phases of operations.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the X, Y, Z and A links in response to requests by I/O device 130.

Figure 2:
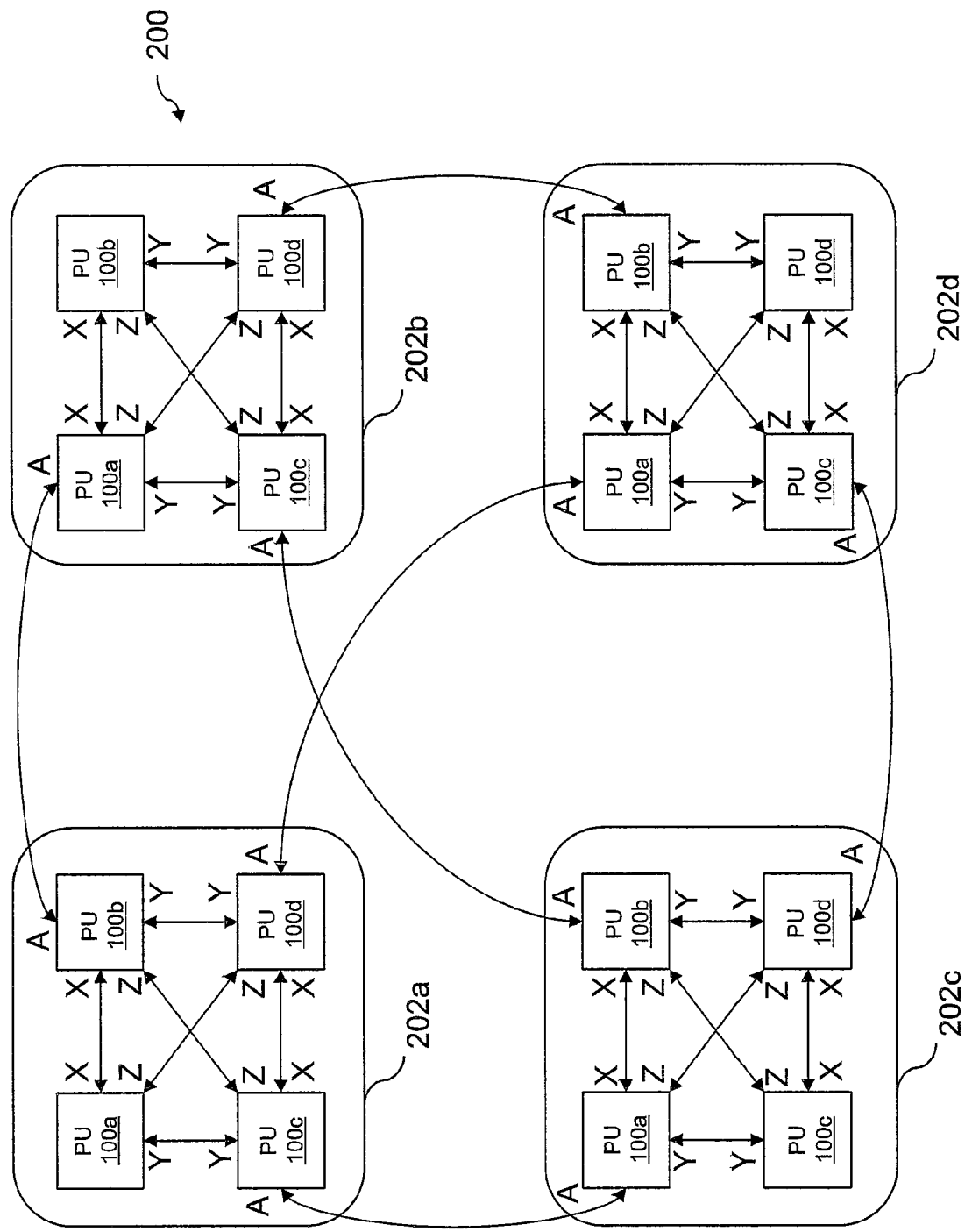
FIG. 2 is a high level block diagram of an exemplary data processing system in accordance with the present invention.

Referring now to FIG. 2, there is depicted a block diagram of an exemplary embodiment of a data processing system 200 formed of multiple processing units 100 in accordance with the present invention. As shown, data processing system 200 includes four processing nodes 202a-202d, which in the depicted embodiment, are each realized as a multi-chip module (MCM) comprising a package containing four processing units 100. The processing units 100 within each processing node 202 are coupled for point-to-point communication by the processing units' X, Y, and Z links, as shown. Each processing unit 100 may be further coupled to a processing unit 100 in a different processing node 202 for point-to-point communication by the processing units' A links. Although illustrated in FIG. 2 with a double-headed arrow, it should be understood that each pair of X, Y, Z and A links are preferably (but not necessarily) implemented as two uni-directional links, rather than as a bi-directional link.

A general expression for forming the topology shown in FIG. 2 can be given as follows:

For all W≠V, Node[V].chip[W].link_A connects to Node[W].chip[V].link_A,
  where V and W belong to the set {a,b,c,d}
For each W=V, Node[V].chip[W].link_A may connect to either:
  1) nothing; or
  2) Node[extra].chip[W].link_A, in which case all links are fully utilized to construct a data processing system of five 8-way nodes Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier links coupled to each processing unit 100 can be an arbitrary number N (meaning that the number of processing units 100 in each processing node 202 is N/2+1) and the number of processing nodes 202 need not equal the number of processing units 100 per processing node 100.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

II. Exemplary Operation

Figure 3:
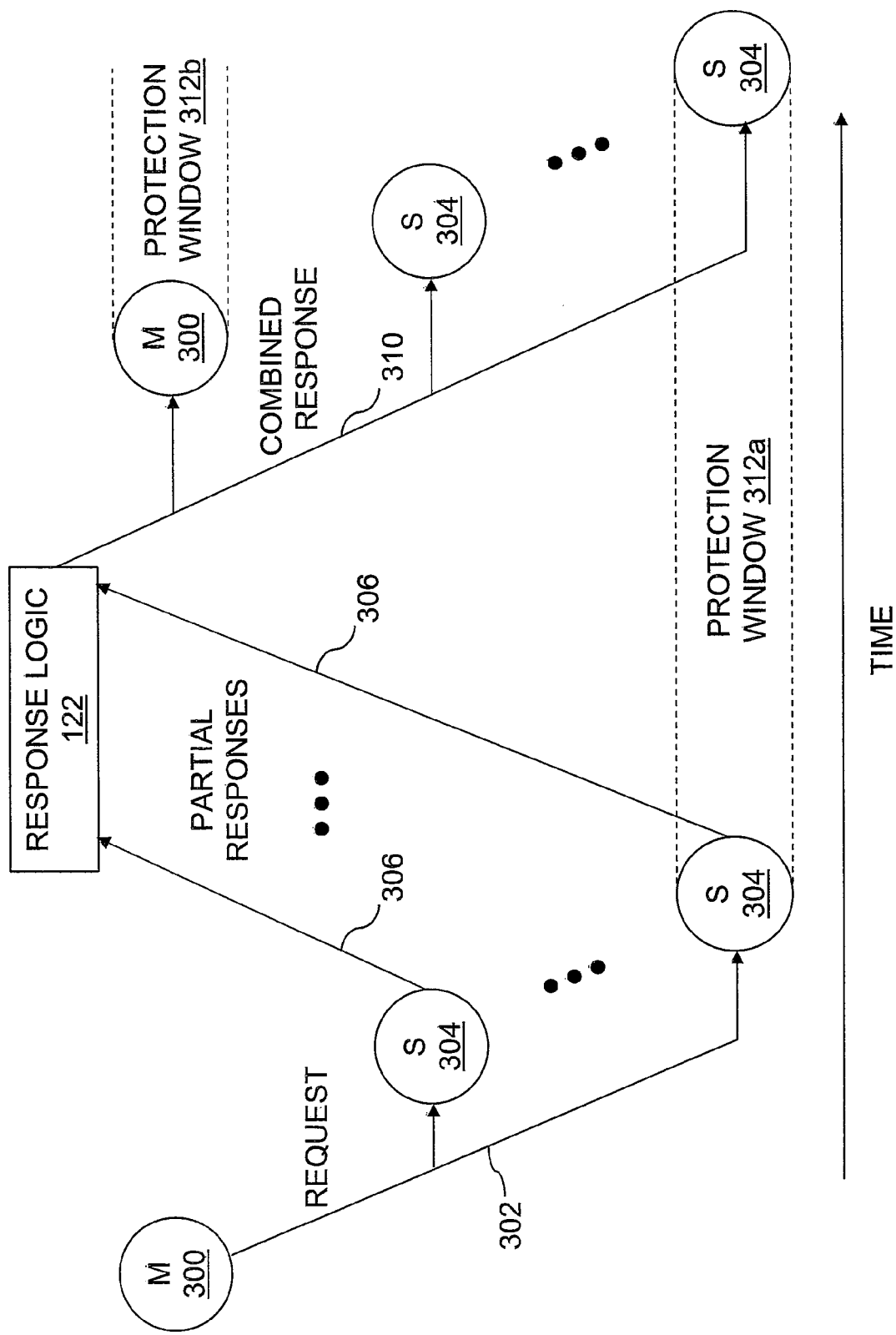
FIG. 3 is a time-space diagram of an exemplary operation including a request phase, a partial response phase and a combined response phase.

Referring now to FIG. 3, there is depicted a time-space diagram of an exemplary operation on the interconnect fabric of data processing system 200 of FIG. 2. The operation begins when a master 300 (e.g., a master 112 of an L2 cache 110 or a master within an I/O controller 128) issues a request 302 on the interconnect fabric. Request 302 preferably includes a transaction type indicating a type of desired access and a resource identifier (e.g., real address) indicating a resource to be accessed by the request. Common types of requests preferably include those set forth below in Table I.

Further details regarding these operations and an exemplary cache coherency protocol that facilitates efficient handling of these operations may be found in copending U.S. patent application Ser. No. 11/055,483, which is incorporated herein by reference.

Request 302 is received by snoopers 304, for example, snoopers 116 of L2 caches 110 and snoopers 126 of IMCs 124, distributed throughout data processing system 200. In general, with some exceptions, snoopers 116 in the same L2 cache 110 as the master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304 are logically combined either in stages or all at once by one or more instances of response logic 122 to determine a system-wide combined response (CR) 310 to request 302. In one preferred embodiment, which will be assumed hereinafter, the instance of response logic 122 responsible for generating combined response 310 is located in the processing unit 100 containing the master 300 that issued request 302. Response logic 122 provides combined response 310 to master 300 and snoopers 304 via the interconnect fabric to indicate the system-wide response (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requester in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block in response to a request 302 during a protection window 312a. In the exemplary scenario shown in FIG. 3, a snooper 304 at the HPC (or in the absence of an HPC, the LPC) for the memory block specified by the request address of request 302 protects the transfer of ownership of the requested memory block to master 300 during a protection window 312a that extends from the time that snooper 304 determines its partial response 306 until snooper 304 receives combined response 310. During protection window 312a, snooper 304 protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 312b to protect its ownership of the memory block requested in request 302 following receipt of combined response 310.

Because snoopers 304 all have limited resources for handling the CPU and I/O requests described above, several different levels of partial responses and corresponding CRs are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding CR) signaling an inability to service the request due to absence of a required resource.

III. Broadcast Flow of Exemplary Operation

Figure 4:
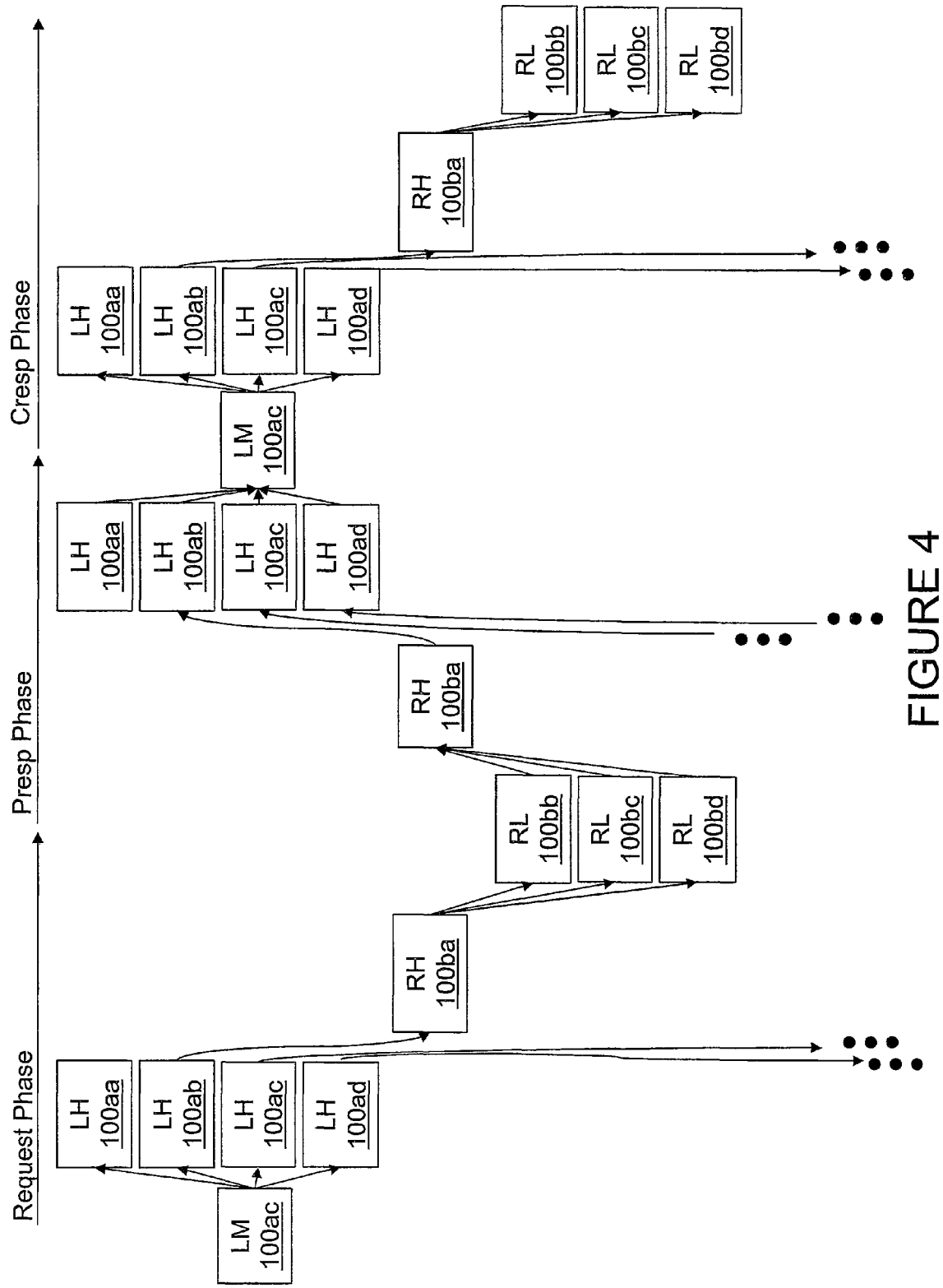
FIG. 4 is a time-space diagram of an exemplary operation within the data processing system of FIG. 2.

Referring now to FIG. 4, which will be described in conjunction with FIGS. 5A-5C, there is illustrated a time-space diagram of an exemplary operation flow in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100ac refers to processing unit 100c of processing node 202a. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Figure 5A:
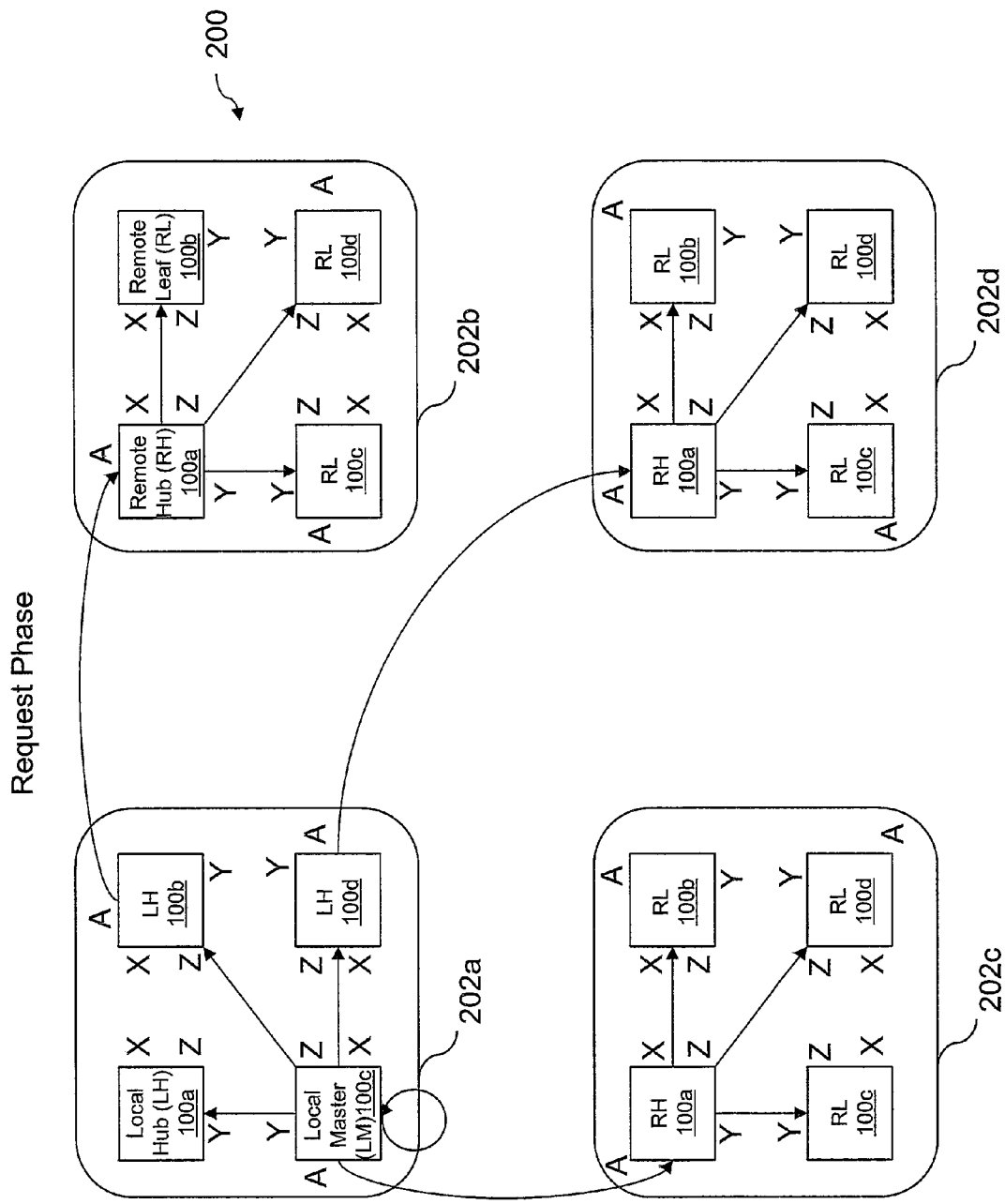
FIGS. 5A-5C depict the information flow of the exemplary operation depicted in FIG. 4.

Still referring to FIG. 4 and referring additionally to FIG. 5A, the request phase begins when a local master 100ac (i.e., processing unit 100c of processing node 202a) performs a synchronized broadcast of an operation, for example, a read operation, to each of the local hubs 100aa, 100ab, 100ac and 100ad within its processing node 202a. It should be noted that the list of local hubs includes local hub 100ac, which is also the local master. As described further below, this internal transmission is advantageously employed to synchronize the operation of local hub 100ac with local hubs 100aa, 100ab and 100ad so that the timing constraints discussed below can be more easily satisfied.

In response to receiving the operation, each local hub 100 that is coupled to a remote hub 100 by its A links transmits the operation to its remote hub 100. Thus, local hub 100aa makes no further transmission of the operation, but local hubs 100ab, 100ac and 100ad transmit the operation to remote hubs 100ba, 100ca and 100da, respectively. Each remote hub 100 receiving the operation in turn transmits the operation to each remote leaf 100 in its processing node 202. Thus, remote hub 100ba transmits the operation to remote leaves 100bb, 100be and 100bd, remote hub 100ca transmits the operation to remote leaves 100cb, 100cc and 100cd, and remote hub 100*da* transmits the operation to remote leaves 100*db*, 100*de* and 100*dd*. In this manner, the operation is efficiently broadcast to all processing units 100 within data processing system 200 utilizing transmission over no more than three links.

Figure 5B:
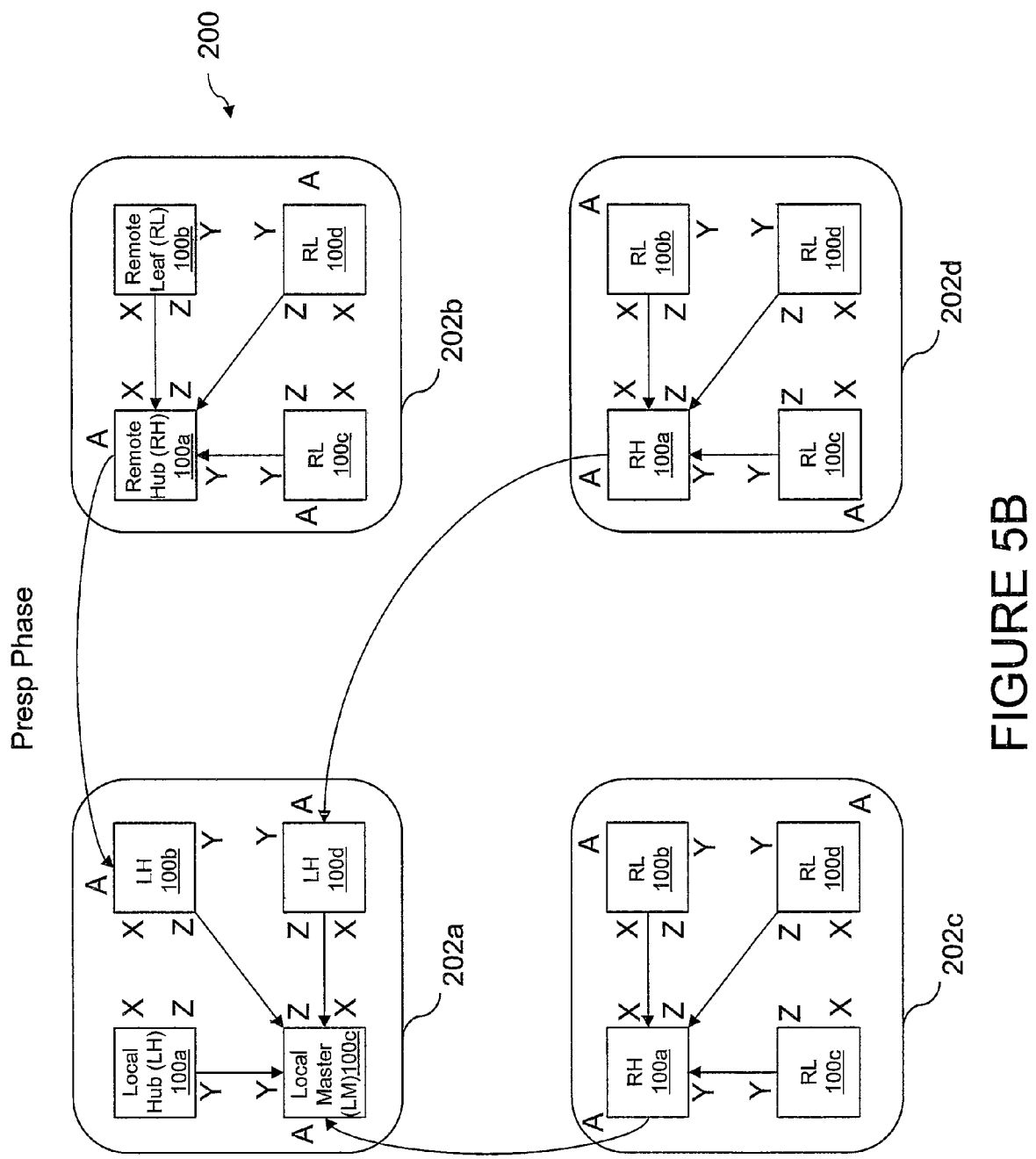

Following the request phase, the partial response (Presp) phase occurs, as shown in FIGS. 4 and 5B. In the partial response phase, each remote leaf 100 evaluates the operation and provides its partial response to the operation to its respective remote hub 100. That is, remote leaves 100*bb*, 100*bc* and 100*bd* transmit their respective partial responses to remote hub 100*ba*, remote leaves 100*cb*, 100*cc* and 100*cd* transmit their respective partial responses to remote hub 100*ca*, and remote leaves 100*db*, 100*dc* and 100*dd* transmit their respective partial responses to remote hub 100*da*. Each of remote hubs 100*ba*, 100*ca* and 100*da* in turn transmits these partial responses, as well as its own partial response, to a respective one of local hubs 100*ab*, 100*ac* and 100*ad*. Local hubs 100*ab*, 100*ac* and 100*ad* then forward these partial responses, as well their own partial responses to local master 100*ac*. In addition, local hub 100*aa* forwards its partial response to local master 100*ac*, concluding the partial response phase.

As will be appreciated, the collection of partial responses in the manner shown can be implemented in a number of different ways. For example, it is possible to communicate an individual partial response back to the local master from each local hub, remote hub and remote leaf. Alternatively, for greater efficiency, it may be desirable to accumulate partial responses as they are communicated back to the local master. In order to ensure that the effect of each partial response is accurately communicated back to local master 100*ac*, it is preferred that the partial responses be accumulated, if at all, in a non-destructive manner, for example, utilizing a logical OR function and an encoding in which no relevant information is lost when subjected to such a function (e.g., a "one-hot" encoding).

Figure 5C:
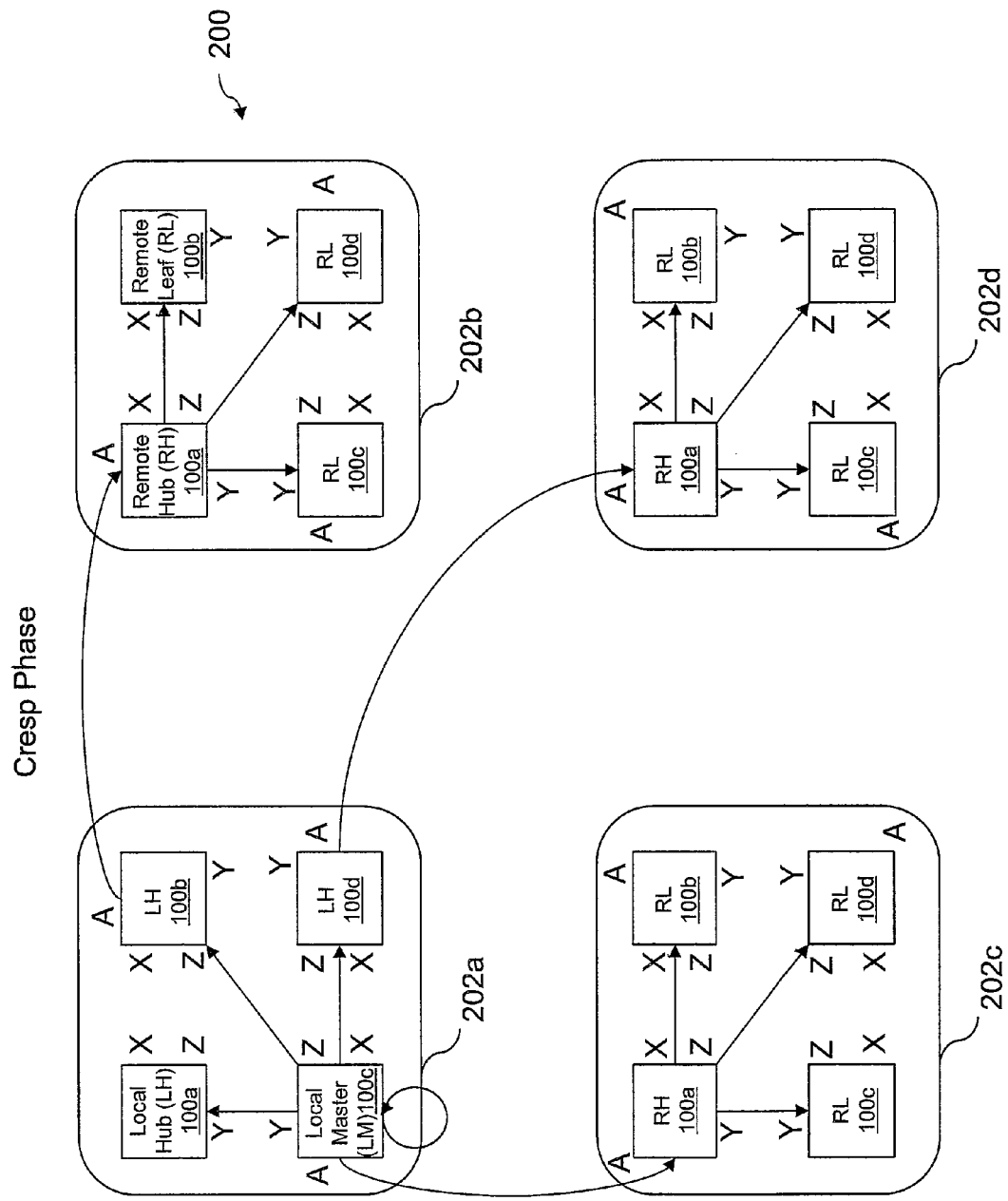

As further shown in FIG. 4 and FIG. 5C, response logic 122 at local master 100*ac* compiles the partial responses of the other processing units 100 to obtain a combined response representing the system-wide response to its operation. Local master 100*ac* then broadcasts the combined response to all processing units 100 following the same paths of distribution as employed for the request phase. Thus, the combined response is first broadcast to each of the local hubs 100*aa*, 100*ab*, 100*ac* and 100*ad* within processing node 202*a*. Again, for timing reasons, the local hubs 100 receiving the combined response include local hub 100*ac*, which is also the local master. In response to receiving the combined response, local hub 100*aa* makes no further transmission of the operation, but local hubs 100*ab*, 100*ac* and 100*ad* transmit the operation to remote hubs 100*ba*, 100*ca* and 100*da*, respectively. Each remote hub 100 receiving the operation in turn transmits the operation to each remote leaf 100 in its processing node 202. Thus, remote hub 100*ba* transmits the operation to remote leaves 100*bb*, 100*be* and 100*bd*, remote hub 100*ca* transmits the operation to remote leaves 100*cb*, 100*cc* and 100*cd*, and remote hub 100*da* transmits the operation to remote leaves 100*db*, 100*dc* and 100*dd*.

Figure 5D:
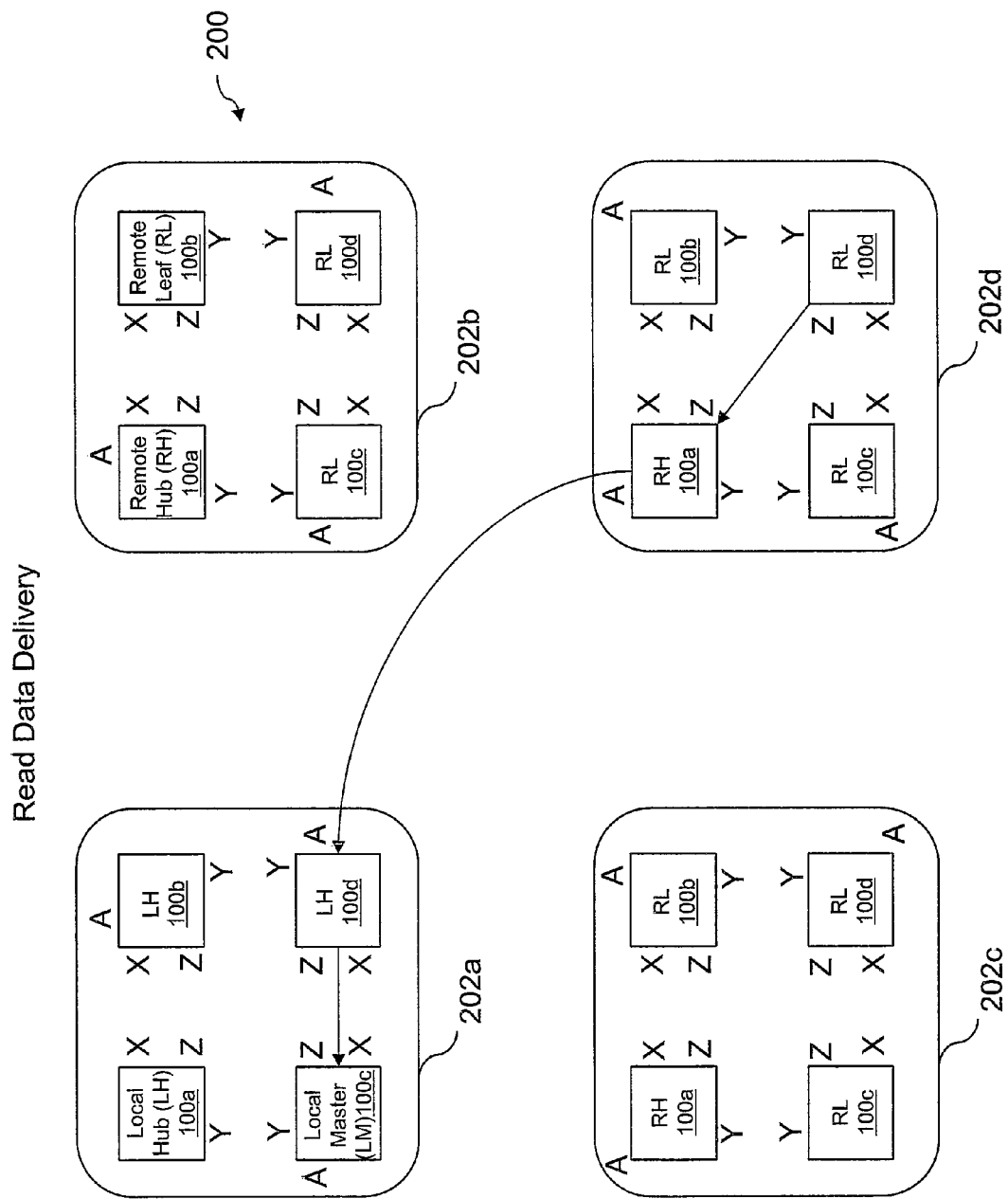
FIGS. 5D-5E depict an exemplary data flow for an exemplary operation in accordance with the present invention.
Figure 5E:
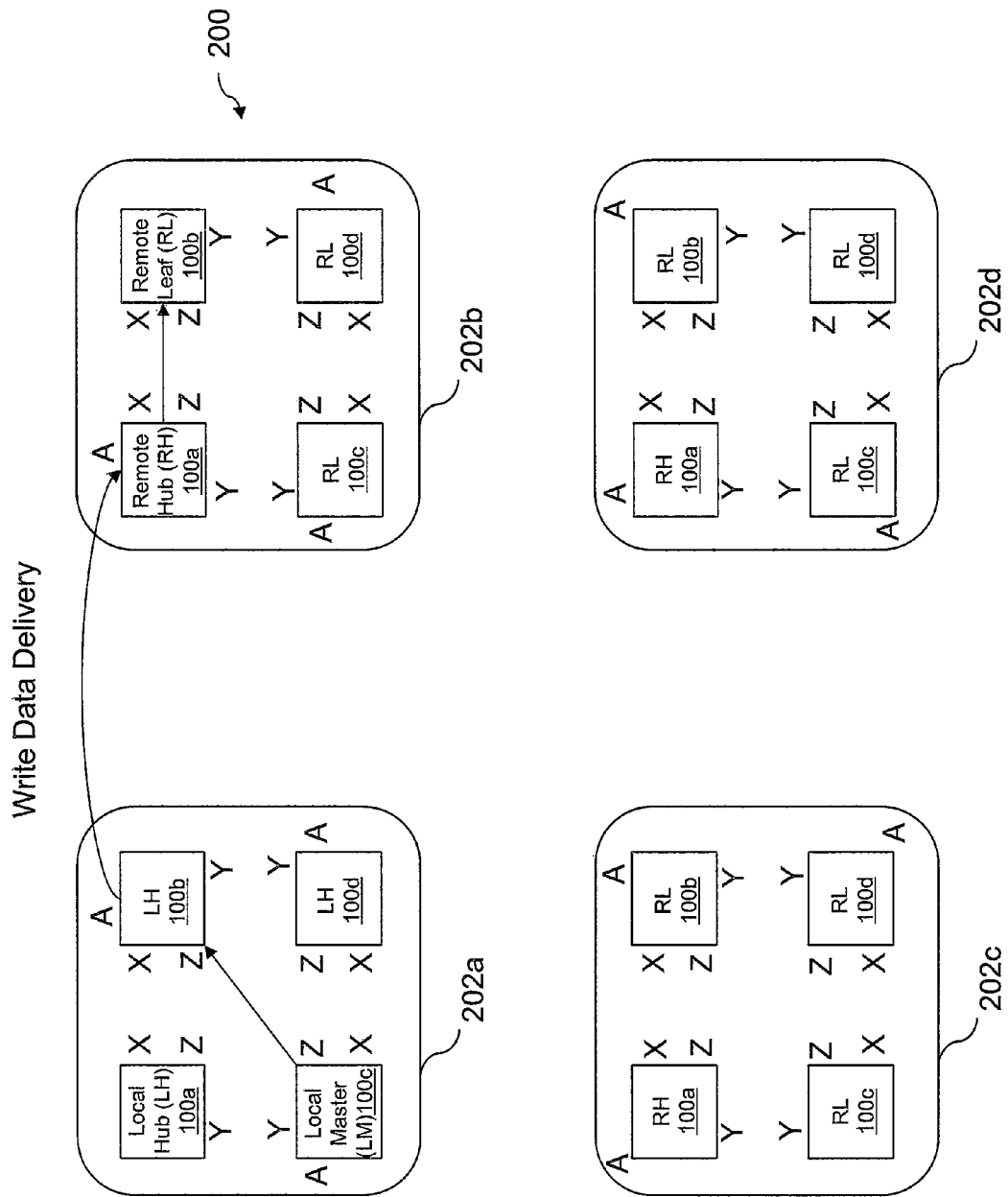

As noted above, servicing the operation may require an additional data phase, such as shown in FIGS. 5D and 5E. For example, as shown in FIG. 5D, if the operation is a read-type operation, such as a read or RWITM operation, remote leaf 100*dd* may source the requested memory block to local master 100*ac* via the links connecting remote leaf 100*dd* to remote hub 100*da*, remote hub 100*da* to local hub 100*ad*, and local hub 100*ad* to local master 100*ac*. Conversely, if the operation is a write-type operation, for example, a cache castout operation writing a modified memory block back to the system memory 132 of remote leaf 100*bb*, the memory block is transmitted via the links connecting local master 100*ac* to local hub 100*ab*, local hub 100*ab* to remote hub 100*ba*, and remote hub 100*ba* to remote leaf 100*bb*, as shown in FIG. 5E.

Of course, the scenario depicted in FIG. 4 and FIGS. 5A-5E is merely exemplary of the myriad of possible operations that may occur concurrently in a multiprocessor data processing system such as data processing system 200.

IV. Timing Considerations

Figure 6:
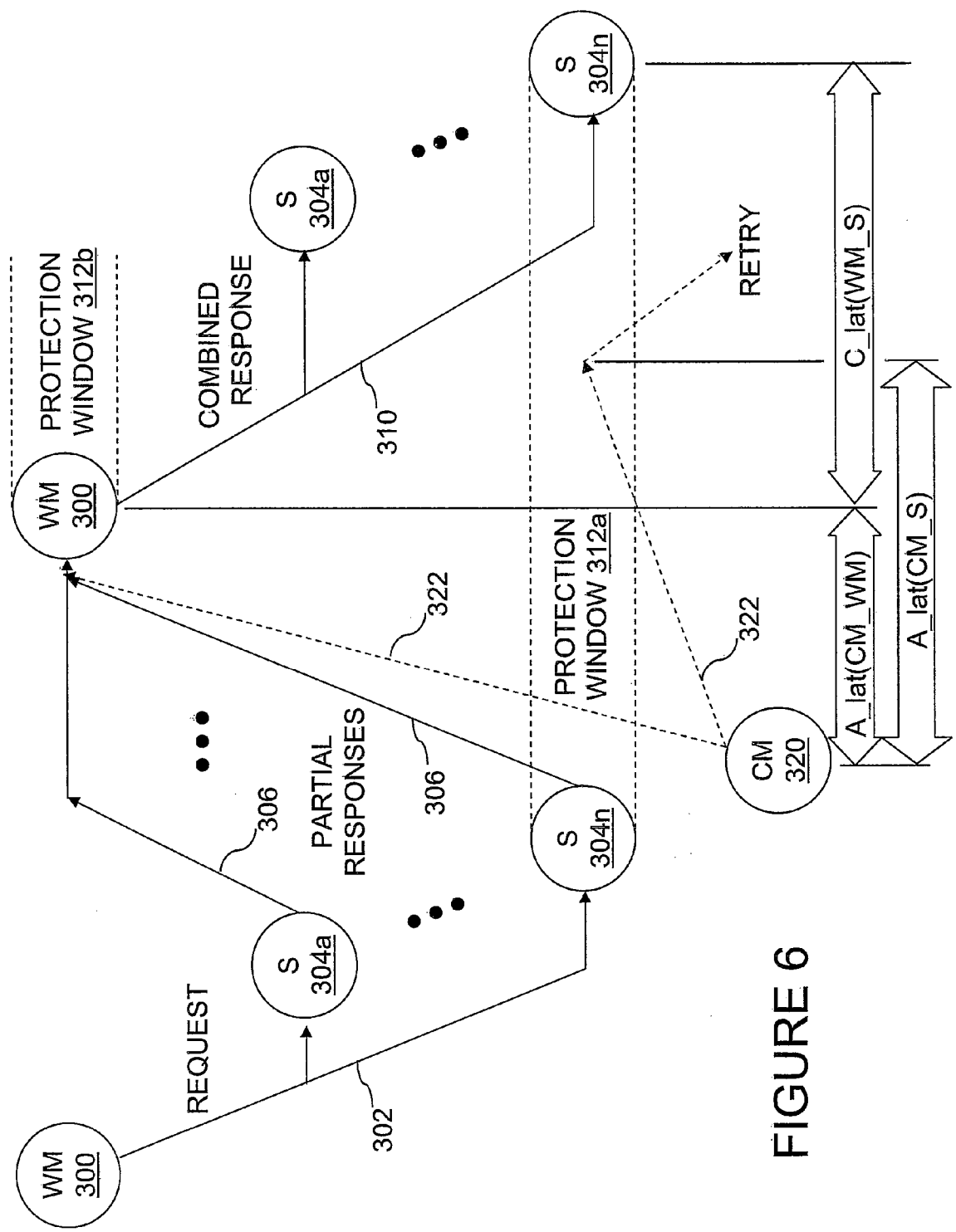
FIG. 6 is a time-space diagram of an exemplary operation, illustrating the timing constraints of an arbitrary data processing system topology.

As described above with reference to FIG. 3, coherency is maintained during the "handoff" of coherency ownership of a memory block from a snooper 304 to a requesting master 300 in the possible presence of other masters competing for ownership of the same memory block through protection windows 312*a*-312*b*. For example, as shown in FIG. 6, protection window 312*a* must be of sufficient duration to protect the transfer of coherency ownership of the requested memory block to winning master (WM) 300 in the presence of a competing request 322 by a competing master (CM) 320. To ensure that protection window 312*a* has sufficient duration to protect the transfer of ownership of the requested memory block to winning master 300, the latency of communication between processing units 100 in accordance with FIG. 4 is preferably constrained such that the following conditions are met:

$$A\_lat(CM\_S) \leq A\_lat(CM\_WM) + C\_lat(WM\_S),$$

where A_lat(CM_S) is the address latency of any competing master (CM) 320 to the snooper (S) 304*n* owning coherence of the requested memory block, A_lat(CM_WM) is the address latency of any competing master (CM) 320 to the "winning" master (WM) 300 that is awarded ownership by snooper 304*n*, and C_lat(WM_S) is the combined response latency from the time that the combined response is received by the winning master (WM) 300 to the time the combined response is received by the snooper (S) 304*n* owning the requested memory block.

If the foregoing timing constraint, which is applicable to a system of arbitrary topology, is not satisfied, the request 322 of the competing master 320 may be received (1) by winning master 300 prior to winning master 300 assuming coherency ownership and initiating protection window 312*b* and (2) by snooper 304*n* after protection window 312*a* ends. In such cases, neither winning master 300 or snooper 304*n* will provide a partial response to competing request 322 that prevents competing master 320 from assuming coherency ownership of the memory block and reading non-coherent data from memory.

Several observations may be made regarding the foregoing timing constraint. First, the address latency from the competing master 320 to the owning snooper 304*a* has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master 320 to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master 320 has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master 320 to winning master 300 have no necessary upper or lower bounds.

V. Exemplary Link Information Allocation

The first tier and second tier links connecting processing units 100 may be implemented in a variety of ways to obtain the topology depicted in FIG. 2 and to meet the timing constraints illustrated in FIG. 6. In one preferred embodiment, each inbound and outbound first tier (X, Y and Z) link and each inbound and outbound second tier (A) link is implemented as a uni-directional 8-byte bus containing a number of different virtual channels or tenures to convey address, data, control and coherency information.

With reference now to FIGS. 7A-7B, there is illustrated a first exemplary time-sliced information allocation for the first tier X, Y and Z links and second tier A links. As shown, in this first embodiment information is allocated on the first and second tier links in a repeating 8 cycle frame in which the first 4 cycles comprise two address tenures transporting address, coherency and control information and the second 4 cycles are dedicated to a data tenure providing data transport.

Reference is first made to FIG. 7A, which illustrates the link information allocation for the first tier links. In each cycle in which the cycle number modulo 8 is 0, byte 0 communicates a transaction type 700a (e.g., a read) of a first operation, bytes 1-5 provide the 5 lower address bytes 702a1 of the request address of the first operation, and bytes 6-7 form a reserved field 704. In the next cycle (i.e., the cycle for which cycle number modulo 8 is 1), bytes 0-1 communicate a master tag 706a identifying the master 300 of the first operation (e.g., one of L2 cache masters 112 or a master within I/O controller 128), and byte 2 conveys the high address byte 702a2 of the request address of the first operation. Communicated together with this information pertaining to the first operation are up to three additional fields pertaining to different operations, namely, a local partial response 708a intended for a local master in the same processing node 202 (bytes 3-4), a combined response 710a in byte 5, and a remote partial response 712a intended for a local master in a different processing node 202 (bytes 6-7). As noted above, these first two cycles form what is referred to herein as an address tenure.

As further illustrated in FIG. 7A, the next two cycles (i.e., the cycles for which the cycle number modulo 8 is 2 and 3) form a second address tenure having the same basic pattern as the first address tenure, with the exception that reserved field 704 is replaced with a data tag 714 and data token 715 forming a portion of the data tenure. Specifically, data tag 714 identifies the destination data sink to which the 32 bytes of data payload 716a-716d appearing in cycles 4-7 are directed. Its location within the address tenure immediately preceding the payload data advantageously permits the configuration of downstream steering in advance of receipt of the payload data, and hence, efficient data routing toward the specified data sink. Data token 715 provides an indication that a downstream queue entry has been freed and, consequently, that additional data may be transmitted on the paired X, Y, Z or A link without risk of overrun. Again it should be noted that transaction type 700b, master tag 706b, low address bytes 702b1, and high address byte 702b2 all pertain to a second operation, and data tag 714, local partial response 708b, combined response 710b and remote partial response 712b all relate to one or more operations other than the second operation.

FIG. 7B depicts the link information allocation for the second tier A links. As can be seen by comparison with FIG. 7A, the link information allocation on the second tier A links is the same as that for the first tier links given in FIG. 7A, except that local partial response fields 708a, 708b are replaced with reserved fields 718a, 718b. This replacement is made for the simple reason that, as a second tier link, no local partial responses need to be communicated.

Figure 7C:
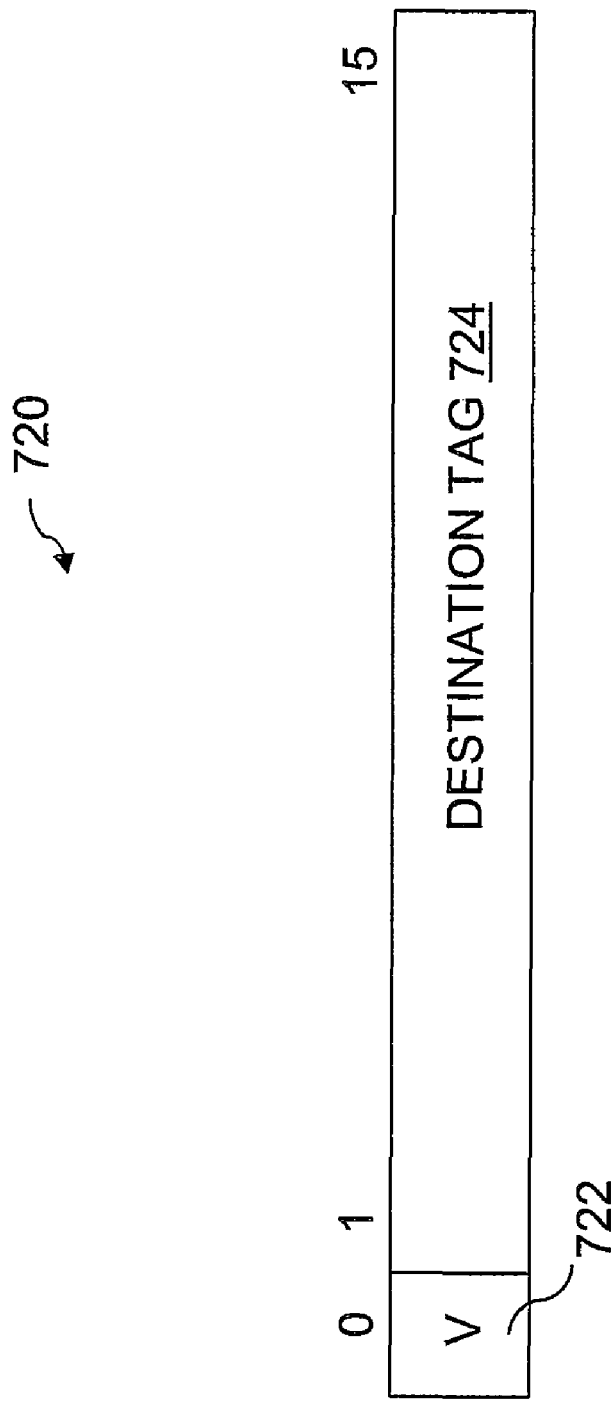
FIG. 7C is an exemplary embodiment of a partial response field for a write request that is included within the link information allocation.

FIG. 7C illustrates an exemplary embodiment of a write request partial response 720, which may be transported within either a local partial response field 708a, 708b or a remote partial response field 712a, 712b in response to a write request. As shown, write request partial response 720 is two bytes in length and includes a 15-bit destination tag field 724 for specifying the tag of a snooper (e.g., an IMC snooper 126) that is the destination for write data and a 1-bit valid (V) flag 722 for indicating the validity of destination tag field 724.

Referring now to FIGS. 8A-8B, there is depicted a second exemplary cyclical information allocation for the first tier X, Y and Z links and second tier A links. As shown, in the second embodiment information is allocated on the first and second tier links in a repeating 6 cycle frame in which the first 2 cycles comprise an address frame containing address, coherency and control information and the second 4 cycles are dedicated to data transport. The tenures in the embodiment of FIGS. 8A-8B are identical to those depicted in cycles 2-7 of FIGS. 7A-7B and are accordingly not described further herein. For write requests, the partial responses communicated within local partial response field 808 and remote partial response field 812 may take the form of write request partial response 720 of FIG. 7C.

It will be appreciated by those skilled in the art that the embodiments of FIGS. 7A-7B and 8A-8B depict only two of a vast number of possible link information allocations. The selected link information allocation that is implemented can be made programmable, for example, through a hardware and/or software-settable mode bit in a configuration register 123 of FIG. 1. The selection of the link information allocation is typically based on one or more factors, such as the type of anticipated workload. For example, if scientific workloads predominate in data processing system 200, it is generally more preferable to allocate more bandwidth on the first and second tier links to data payload. Thus, the second embodiment shown in FIGS. 8A-8B will likely yield improved performance. Conversely, if commercial workloads predominate in data processing system 200, it is generally more preferable to allocate more bandwidth to address, coherency and control information, in which case the first embodiment shown in FIGS. 7A-7B would support higher performance. Although the determination of the type(s) of anticipated workload and the setting of configuration register 123 can be performed by a human operator, it is advantageous if the determination is made by hardware and/or software in an automated fashion. For example, in one embodiment, the determination of the type of workload can be made by service processor code executing on one or more of processing units 100 or on a dedicated auxiliary service processor (not illustrated).

VI. Request Phase Structure and Operation

Figure 9:
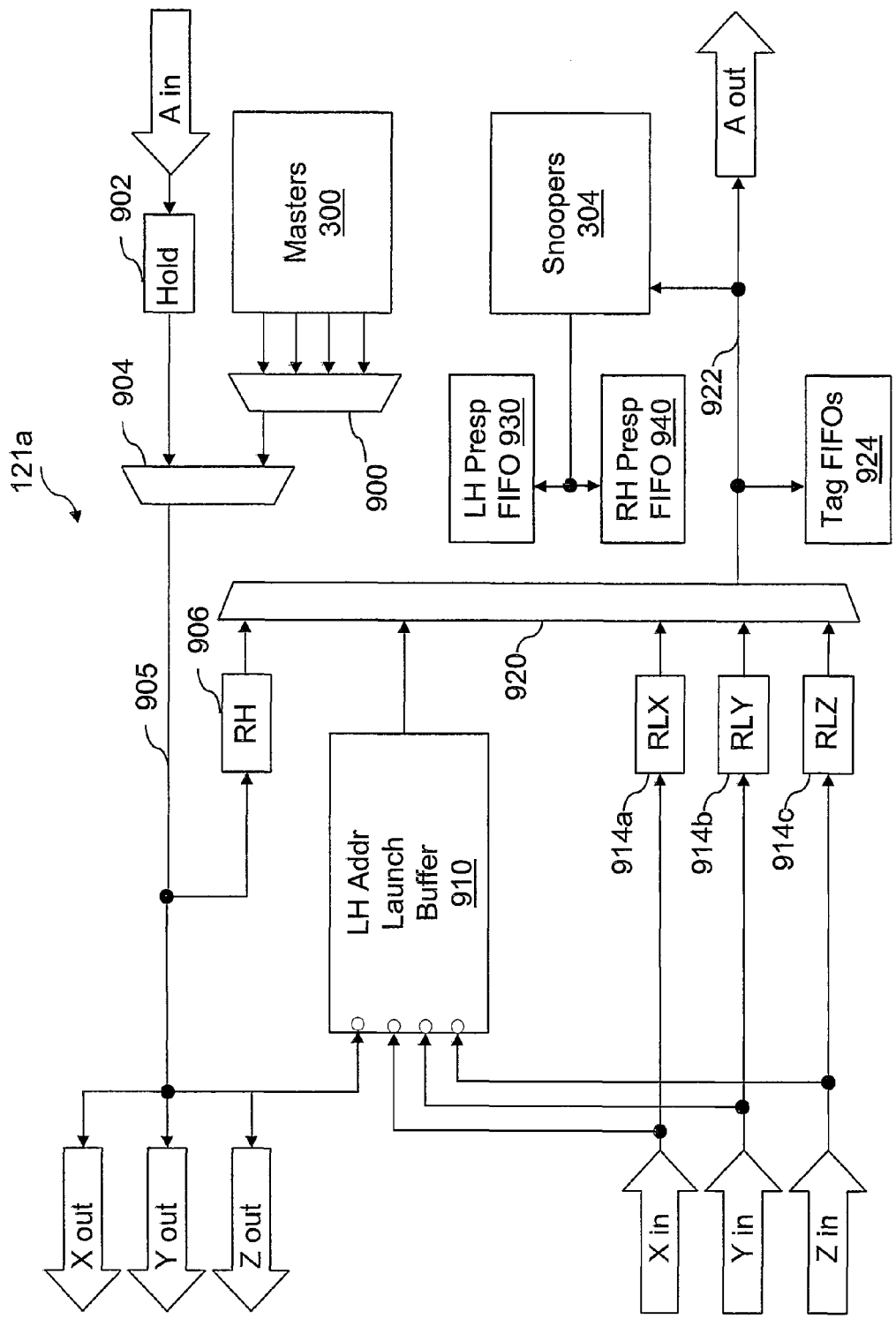
FIG. 9 is a block diagram illustrating a portion of the interconnect logic of FIG. 1 utilized in the request phase of an operation.

Referring now to FIG. 9, there is depicted a block diagram illustrating request logic 121*a* within interconnect logic 120 of FIG. 1 utilized in request phase processing of an operation. As shown, the masters 300 of a processing unit (e.g., masters 112 within L2 cache 110 and masters within I/O controller 128), which may each initiate an operation, are each coupled to a master multiplexer 900. The output of master multiplexer 900 and the output of a hold buffer 902 that receives operations on the inbound second tier A link form inputs to a request multiplexer 904. The output of request multiplexer 904 drives a request bus 905 that is coupled to each of the outbound X, Y and Z links, a remote hub (RH) buffer 906, and the local hub (LH) address launch First-In, First-out (FIFO) queue 910.

The inbound first tier (X, Y and Z) links are each coupled to the LH address launch buffer 910, as well as a respective one of remote leaf (RL) buffers 914*a*-914*c*. The outputs of remote hub buffer 906, LH address launch buffer 910, and RL buffers 914*a*-914*c* all form inputs of a snoop multiplexer 920. The output of snoop multiplexer 920 drives a snoop bus 922 to which a tag FIFO queue 924, the snoopers 304 (e.g., snoopers 116 of L2 cache 110 and snoopers 126 of IMC 124) of the processing unit 100, and the outbound A link are coupled. Snoopers 304 are further coupled to and supported by local hub (LH) partial response FIFO queues 930 and remote hub (RH) partial response FIFO queues 940.

Although other embodiments are possible, it is preferable if buffers 902, 906, and 914*a*-914*c* remain short in order to minimize communication latency. In one preferred embodiment, each of buffers 902, 906, and 914*a*-914*c* is sized to hold only the address tenure(s) of a single frame of the selected link information allocation.

Figure 10:
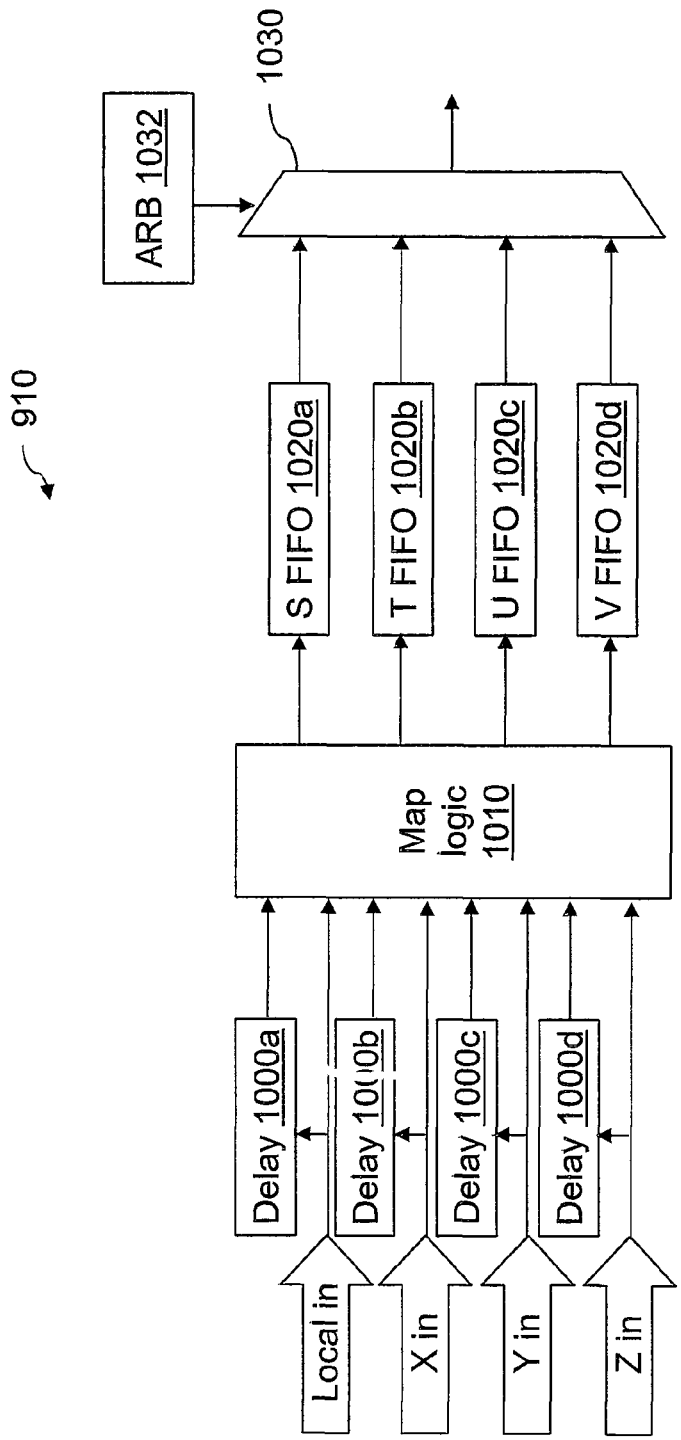
FIG. 10 is a more detailed block diagram of the local hub address launch buffer of FIG. 9.

With reference now to FIG. 10, there is illustrated a more detailed block diagram of local hub (LH) address launch buffer 910 of FIG. 9. As depicted, the local and inbound X, Y and Z link inputs of the LH address launch buffer 910 form inputs of a map logic 1010, which places requests received on each particular input into a respective corresponding position-dependent FIFO queue 1020*a*-1020*d*. In the depicted nomenclature, the processing unit 100*a* in the upper left-hand corner of a processing node/MCM 202 is the "S" chip; the processing unit 100*b* in the upper right-hand corner of the processing node/MCM 202 is the "T" chip; the processing unit 100*c* in the lower left-hand corner of a processing node/MCM 202 is the "U" chip; and the processing unit 100*d* in the lower right-hand corner of the processing node 202 is the "V" chip. Thus, for example, for local master/local hub 100*ac*, requests received on the local input are placed by map logic 1010 in U FIFO queue 1020*c*, and requests received on the inbound Y link are placed by map logic 1010 in S FIFO queue 1020*a*. Map logic 1010 is employed to normalize input flows so that arbitration logic 1032, described below, in all local hubs 100 is synchronized to handle requests identically without employing any explicit inter-communication.

Although placed within position-dependent FIFO queues 1020*a*-1020*d*, requests are not immediately marked as valid and available for dispatch. Instead, the validation of requests in each of position-dependent FIFO queues 1020*a*-1020*d* is subject to a respective one of programmable delays 1000*a*-1000*d* in order to synchronize the requests that are received during each address tenure on the four inputs. Thus, the programmable delay 1000*a* associated with the local input, which receives the request self-broadcast at the local master/local hub 100, is generally considerably longer than those associated with the other inputs. In order to ensure that the appropriate requests are validated, the validation signals generated by programmable delays 1000*a*-1000*d* are subject to the same mapping by map logic 1010 as the underlying requests.

The outputs of position-dependent FIFO queues 1020*a*-1020*d* form the inputs of local hub request multiplexer 1030, which selects one request from among position-dependent FIFO queues 1020*a*-1020*d* for presentation to snoop multiplexer 920 in response to a select signal generated by arbiter 1032. Arbiter 1032 implements a fair arbitration policy that is synchronized in its selections with the arbiters 1032 of all other local hubs 100 within a given processing node 202 so that the same request is broadcast on the outbound A links at the same time by all local hubs 100 in a processing node 202, as depicted in FIGS. 4 and 5A. Thus, given either of the exemplary link information allocation shown in FIGS. 7B and 8B, the output of local hub request multiplexer 1030 is timeslice-aligned to the address tenure(s) of an outbound A link request frame.

Because the input bandwidth of LH address launch buffer 910 is four times its output bandwidth, overruns of position-dependent FIFO queues 1020*a*-1020*d* are a design concern. In a preferred embodiment, queue overruns are prevented by implementing, for each position-dependent FIFO queue 1020, a pool of local hub tokens equal in size to the depth of the associated position-dependent FIFO queue 1020. A free local hub token is required for a local master to send a request to a local hub and guarantees that the local hub can queue the request. Thus, a local hub token is allocated when a request is issued by a local master 100 to a position-dependent FIFO queue 1020 in the local hub 100 and freed for reuse when arbiter 1032 issues an entry from the position-dependent FIFO queue 1020.

Figure 11:
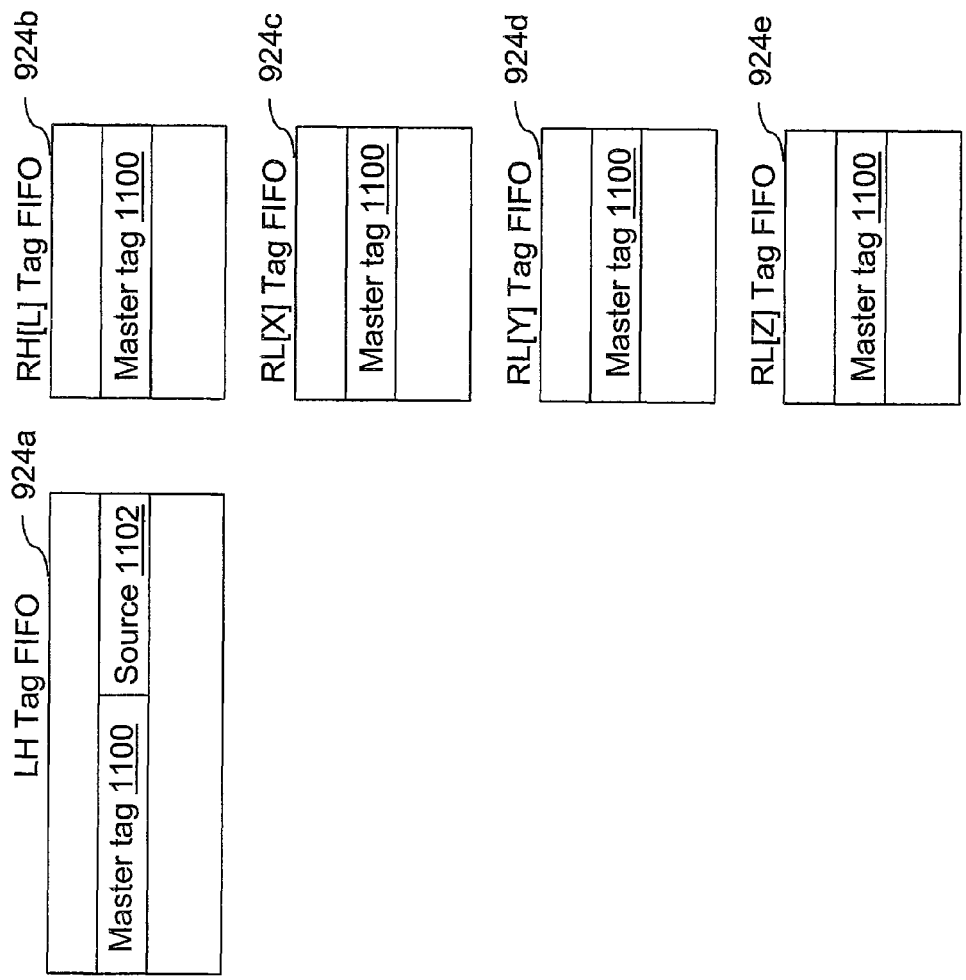
FIG. 11 is a more detailed block diagram of the tag FIFO queues of FIG. 9.

Referring now to FIG. 11, there is depicted a more detailed block diagram of tag FIFO queues 924 of FIG. 9. As shown, tag FIFO queues 924 include a local hub (LH) tag FIFO queue 924*a*, a remote hub (RH) tag FIFO queue 924*b*, and remote leaf (RL) tag FIFO queues 924*c*-924*e*. The master tag of a request is deposited in each of LH, RH and RL FIFO queues 924*a*-924*e* when the request is received at the processing unit(s) 100 serving in each of these given roles (LH, RH and RL) for that particular request. The master tag is retrieved from each of FIFO queues 924 when the combined response is received at the associated processing unit 100. Thus, rather than transporting the master tag with the combined response, master tags are retrieved by a processing unit 100 from its FIFO queue 924 as needed, resulting in bandwidth savings on the X, Y, Z and A links. Given that the order in which a combined response is received at the various processing units 100 is identical to the order in which the associated request was received, a FIFO policy for allocation and retrieval of the master tag can advantageously be employed.

LH tag FIFO queue 924*a* includes a number of entries, each including a master tag field 1100 for storing the master tag of a request launched by arbiter 1032 and a position field 1102 for storing an indication of the position (i.e., S, T, U or V) of the local master 100 of the request. RH tag FIFO queue 924*b* similarly includes multiple entries, each including at least a master tag field 1100 for storing the master tag of a request received via the inbound A link. RL tag FIFO queues 924c-924e are similarly constructed and respectively hold master tags of requests received by a remote leaf 100 via the inbound X, Y and Z links.

Figure 12A:
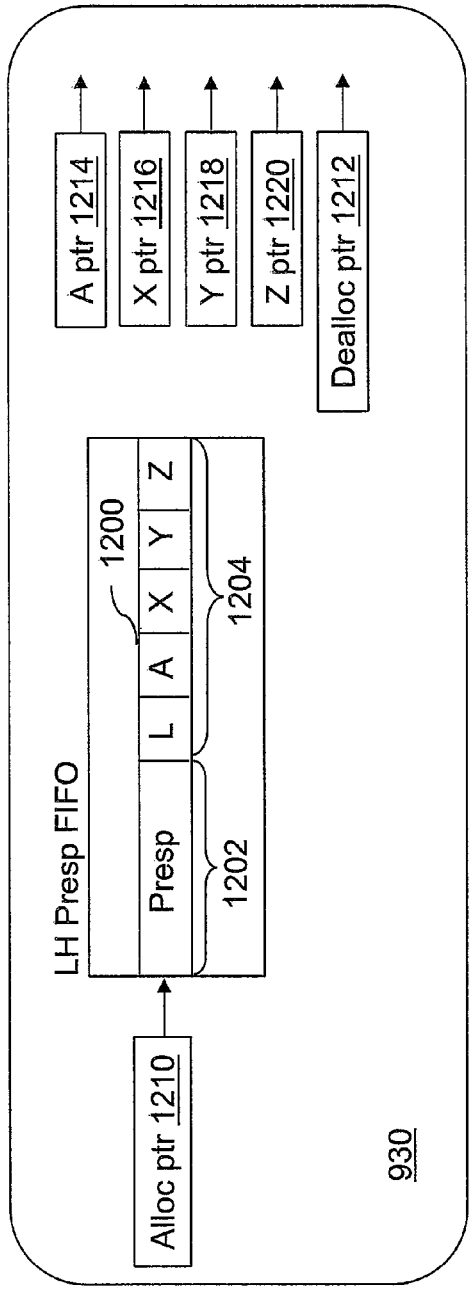
FIGS. 12A and 12B are more detailed block diagrams of the local hub partial response FIFO queue and remote hub partial response FIFO queue of FIG. 9, respectively.
Figure 12B:
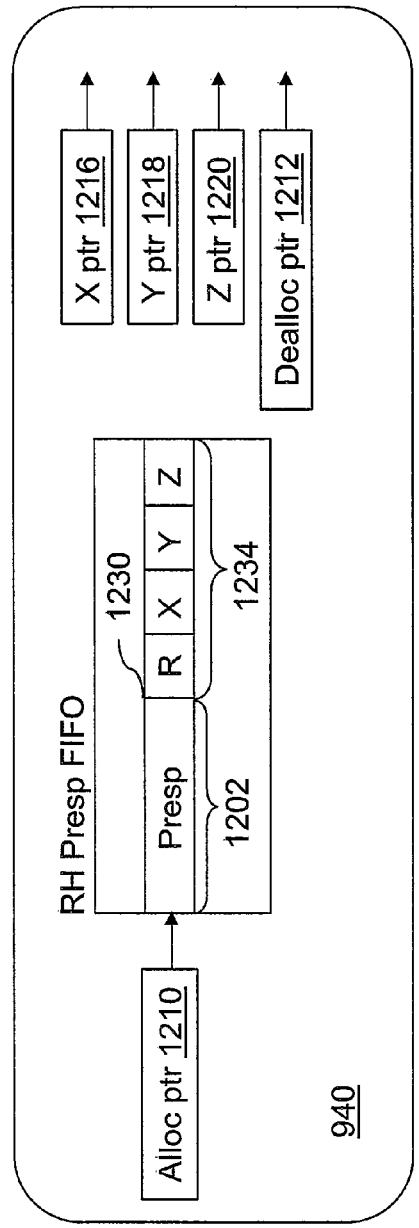

With reference now to FIGS. 12A and 12B, there are illustrated more detailed block diagrams of exemplary embodiments of the local hub (LH) partial response FIFO queue 930 and remote hub (RH) partial response FIFO queue 940 of FIG. 9. As indicated, LH partial response FIFO queue 930 includes a number of entries 1200 that each includes a partial response field 1202 for storing an accumulated partial response for a request and a response flag array 1204 having respective flags for each of the 5 possible sources from which the local hub 100 may receive a partial response (i.e., local (L), first tier X, Y, Z links, and second tier A link) at different times or possibly simultaneously. Entries 1200 within LH partial response FIFO queue 930 are allocated via an allocation pointer 1210 and deallocated via a deallocation pointer 1212. Various flags comprising response flag array 1204 are accessed utilizing A pointer 1214, X pointer 1216, Y pointer 1218, and Z pointer 1220.

As described further below, when a partial response for a particular request is received by partial response logic 121b at a local hub 100, the partial response is accumulated within partial response field 1202, and the link from which the partial response was received is recorded by setting the corresponding flag within response flag array 1204. The corresponding one of pointers 1214, 1216, 1218 and 1220 is then advanced to the subsequent entry 1200. Of course, if a processing unit 100 is not fully connected, meaning that a partial response will not be received on one or more of its links, the corresponding flag(s) within response flag array 1204 are ignored. The determination of which links of the processing unit are connected, and thus which flags are active for each processing unit 100, can be made by reference to a configuration register (not illustrated).

As can be seen by comparison of FIG. 12B and FIG. 12A, RH partial response FIFO queue 940 is constructed similarly to LH partial response FIFO queue 930. RH partial response FIFO queue 940 includes a number of entries 1230 that each includes a partial response field 1202 for storing an accumulated partial response and a response flag array 1234 having respective flags for each of the 4 possible sources from which the remote hub may receive a partial response (i.e., remote (R), and first tier X, Y, and Z links). Entries 1230 within RH partial response FIFO queue 940 are allocated via an allocation pointer 1210 and deallocated via a deallocation pointer 1212. Various flags comprising response flag array 1234 are accessed and updated utilizing X pointer 1216, Y pointer 1218, and Z pointer 1220. Of course, if a processing unit 100 is not fully connected, meaning that a partial response will not be received on one or more of its links, the corresponding flag(s) within response flag array 1234 are ignored. The determination of which links of the processing unit are connected, and thus which flags are active for each processing unit 100, can be made by reference to a configuration register (not illustrated).

Figure 13:
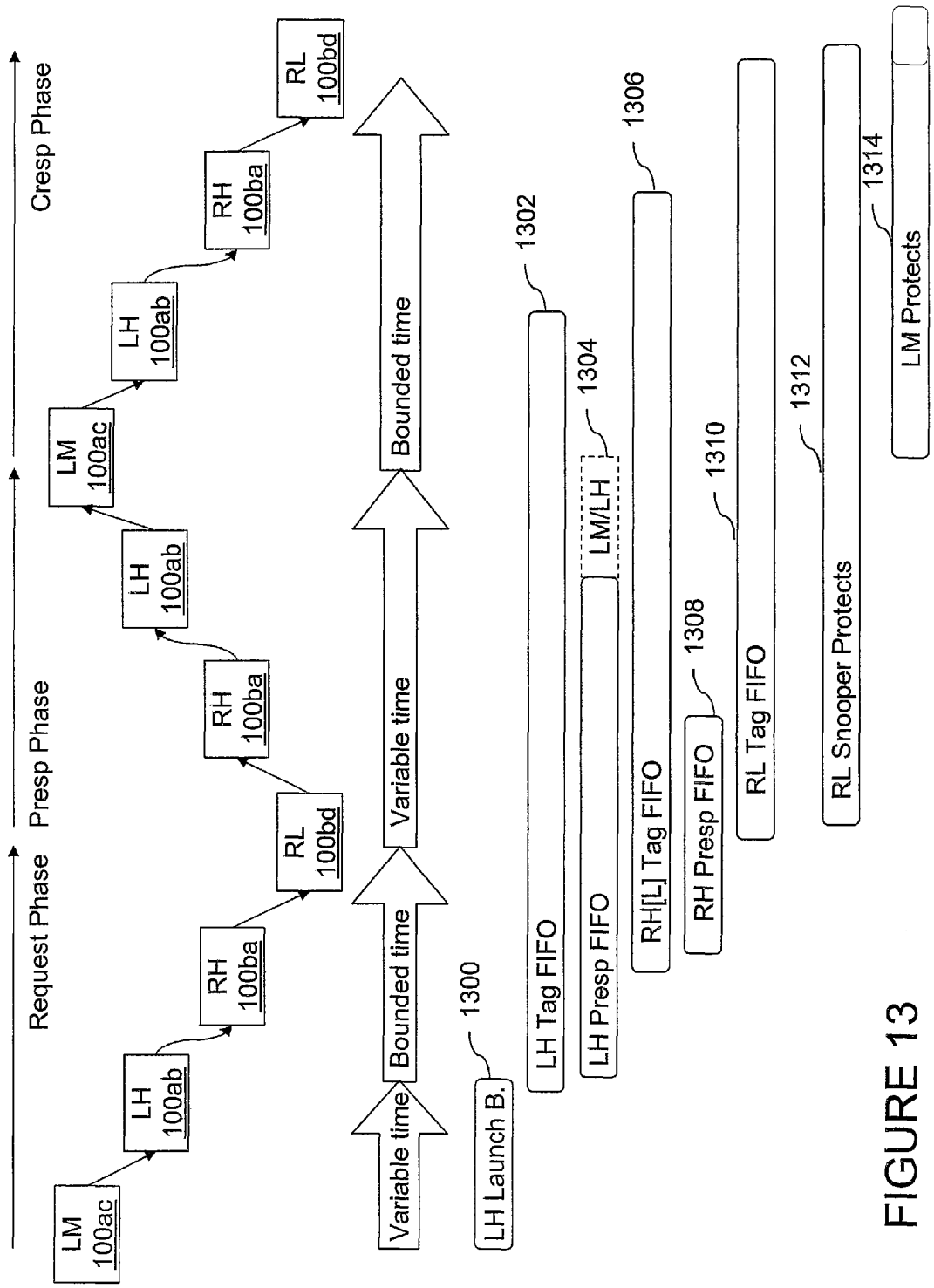
FIG. 13 is a time-space diagram illustrating the tenures of an operation with respect to the data structures depicted in FIG. 9.

Referring now to FIG. 13, there is depicted a time-space diagram illustrating the tenure of an exemplary operation with respect to the exemplary data structures depicted in FIG. 9 through FIG. 12B. As shown at the top of FIG. 13 and as described previously with reference to FIG. 4, the operation is issued by local master 100ac to each local hub 100, including local hub 100ab. Local hub 100ab forwards the operation to remote hub 100ba, which in turn forwards the operation to its remote leaves, including remote leaf 100bd. The partial responses to the operation traverse the same series of links in reverse order back to local master 100ac, which broadcasts the combined response to each processing unit 100, including local hub 100ab, remote hub 100ba, and remote leaf 100bd. As dictated by the timing constraints described above, the time from the initiation of the operation by local master 100ae to its launch by the local hubs 100aa, 100ab, 100ac and 100ad is a variable time, the time from the launch of the operation by local hubs 100 to its receipt by the remote leaves 100 is a bounded time, the partial response latency from the remote leaves 100 to the local master 100 is a variable time, and the combined response latency from the local master 100 to the remote leaves 100 is a bounded time.

Against the backdrop of this timing sequence, FIG. 13 illustrates the tenures of various items of information within various data structures within data processing system 200 during the request phase, partial response phase, and combined response phase of an operation. In particular, the tenure of a request in a LH launch buffer 910 (and hence the tenure of a local hub token) is depicted at reference numeral 1300, an the tenure of an entry in LH tag FIFO queue 924a is depicted at reference numeral 1302, the tenure of an entry 1200 in LH partial response FIFO queue 930 is depicted at block 1304, the tenure of an entry in a RH tag FIFO 924b is depicted at reference numeral 1306, the tenure of an entry 1230 in a RH partial response FIFO queue 940 is depicted at reference numeral 1308, and the tenure of an entry in the RL tag FIFO queues 924c, 924d and 924e is depicted at reference numeral 1310. FIG. 13 further illustrates the duration of a protection window 1312 (also 312a of FIGS. 3 and 6) extended by the snooper within remote leaf 100dd to protect the transfer of ownership of the memory block to local master 100ac from generation of its partial response until receipt of the combined response (reference numeral 1312). As shown at reference numeral 1314 (and also at 312b of FIGS. 3 and 6), local master 100ac also protects the transfer of ownership from receipt of the combined response.

As indicated at reference numerals 1302, 1306 and 1310, the entries in the LH tag FIFO queue 924a, RH tag FIFO queue 924b and RL tag FIFO queue 924c-924e are subject to the longest tenures. Consequently, the minimum depth of tag FIFO queues 924 (which are generally designed to be the same) limits the maximum number of requests that can be in flight in the data processing system at any one time. In general, the desired depth of tag FIFO queues 924 can be selected by dividing the expected maximum latency from snooping of a request by an arbitrarily selected processing unit 100 to receipt of the combined response by that processing unit 100 by the maximum number of requests that can be issued given the selected link information allocation. Although the other queues (e.g., LH partial response FIFO queue 930 and RH partial response FIFO queue 940) may safely be assigned shorter queue depths given the shorter tenure of their entries, for simplicity it is desirable in at least some embodiments to set the depths of these queues to be the same as tag FIFO queues 924a-924e.

Figure 14A:
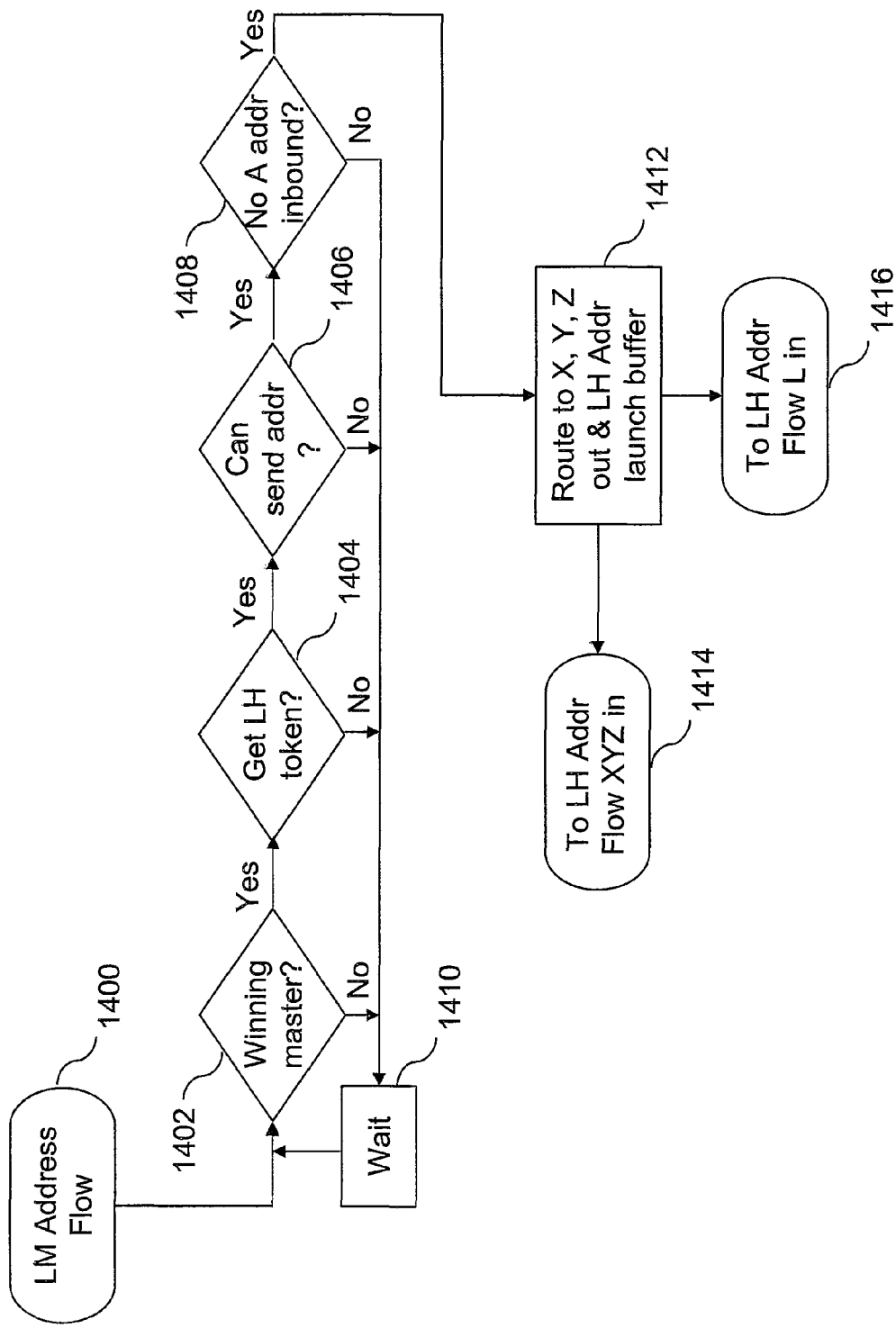
FIG. 14A-14D are flowcharts respectively depicting the request phase of an operation at a local master, local hub, remote hub, and remote leaf.

With reference now to FIG. 14A-14D, flowcharts are given that respectively depict exemplary processing of an operation during the request phase at a local master, local hub, remote hub, and remote leaf in accordance with an exemplary embodiment of the present invention. Referring now specifically to FIG. 14A, request phase processing at the local master 100 begins at block 1400 with the generation of a request by a particular master 300 (e.g., one of masters 112 within an L2 cache 110 or a master within an I/O controller 128) within a local master 100. Following block 1400, the process proceeds to blocks 1402, 1404, 1406, and 1408, each of which represents a condition on the issuance of the request by the particular master 300. The conditions illustrated at blocks 1402 and 1404 represent the operation of master multiplexer 900, and the conditions illustrated at block 1406 and 1408 represent the operation of request multiplexer 904.

Turning first to blocks 1402 and 1404, master multiplexer 900 outputs the request of the particular master 300 if the fair arbitration policy governing master multiplexer 900 selects the request of the particular master 300 from the requests of (possibly) multiple competing masters 300 (block 1402) and if a local hub token is available for assignment to the request (block 1404).

Assuming that the request of the particular master 300 progresses through master multiplexer 900 to request multiplexer 904, request multiplexer 904 issues the request on request bus 905 only if a address tenure is then available for a request in the outbound first tier link information allocation (block 1406). That is, the output of request multiplexer 904 is timeslice aligned with the selected link information allocation and will only generate an output during cycles designed to carry a request (e.g., cycle 0 or 2 of the embodiment of FIG. 7A or cycle 0 of the embodiment of FIG. 8A). As further illustrated at block 1408, request multiplexer 904 will only issue a request if no request is inbound on the second tier A link (block 1406), which is always given priority. Thus, the second tier links are guaranteed to be non-blocking with respect to inbound requests. Even with such a non-blocking policy, requests by masters 300 can prevented from "starving" through implementation of an appropriate policy in the arbiter 1032 of the upstream hub that prevents "brickwalling" of requests during numerous consecutive address tenures on the inbound A link of the downstream hub.

If a negative determination is made at any of blocks 1402-1408, the request is delayed, as indicated at block 1410, until a subsequent cycle during which all of the determinations illustrated at blocks 1402-1408 are positive. If, on the other hand, positive determinations are made at all of blocks 1402-1408, the process proceeds to block 1412, beginning tenure 1300 of FIG. 13. Block 1412 depicts request multiplexer 904 broadcasting the request on request bus 905 to each of the outbound X, Y and Z links and to the local hub address launch buffer 910. Thereafter, the process bifurcates and passes through page connectors 1414 and 1416 to FIG. 14B, which illustrates the processing of the request at each of the local hubs 100.

Figure 14B:
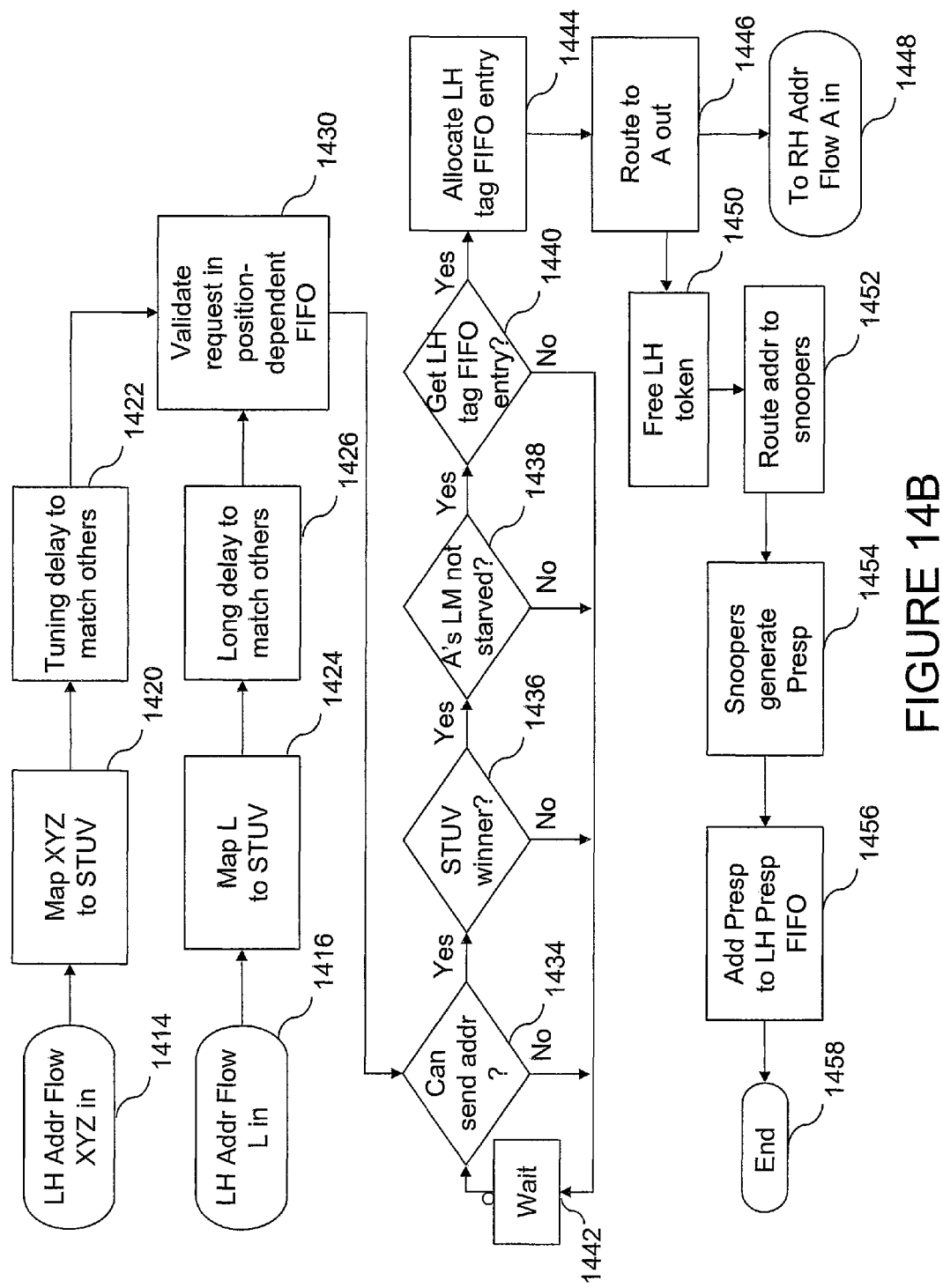

With reference now to FIG. 14B, processing of the request at the local hub 100 that is also the local master 100 is illustrated beginning at block 1416, and processing of the request at each of the other local hubs 100 in the same processing node 202 as the local master 100 is depicted beginning at block 1414. Turning first to block 1414, requests received by a local hub 100 on the inbound X, Y and Z links are received by LH address launch buffer 910. As depicted at block 1420 and in FIG. 10, map logic 1010 maps each of the X, Y and Z requests to the appropriate ones of position-dependent FIFO queues 1020a-1020d for buffering. As noted above, requests received on the X, Y and Z links and placed within position-dependent queues 1020a-1020d are not immediately validated. Instead, the requests are subject to respective ones of tuning delays 1000a-1000d, which synchronize the handling of the X, Y and Z requests and the local request on a given local hub 100 with the handling of the corresponding requests at the other local hubs 100 in the same processing node 202 (block 1422). Thereafter, as shown at block 1430, the tuning delays 1000 validate their respective requests within position-dependent FIFO queues 1020a-1020d.

Referring now to block 1416, at the local master/local hub 100, the request on request bus 905 is fed directly into LH address launch buffer 910. Because no inter-chip link is traversed, this local request arrives at LH address launch FIFO 910 earlier than requests issued in the same cycle arrive on the inbound X, Y and Z links. Accordingly, following the mapping by map logic 1010, which is illustrated at block 1424, one of tuning delays 1000a-100d applies a long delay to the local request to synchronize its validation with the validation of requests received on the inbound X, Y and Z links (block 1426). Following this delay interval, the relevant tuning delay 1000 validates the local request, as shown at block 1430.

Following the validation of the requests queued within LH address launch buffer 910 at block 1430, the process then proceeds to blocks 1434-1440, each of which represents a condition on the issuance of a request from LH address launch buffer 910 enforced by arbiter 1032. As noted above, the arbiters 1032 within all processing units 100 are synchronized so that the same decision is made by all local hubs 100 without inter-communication. As depicted at block 1434, an arbiter 1032 permits local hub request multiplexer 1030 to output a request only if an address tenure is then available for the request in the outbound second tier link information allocation. Thus, for example, arbiter 1032 causes local hub request multiplexer 1030 to initiate transmission of requests only during cycle 0 or 2 of the embodiment of FIG. 7B or cycle 0 of the embodiment of FIG. 8B. In addition, a request is output by local hub request multiplexer 1030 if the fair arbitration policy implemented by arbiter 1032 determines that the request belongs to the position-dependent FIFO queue 1020a-1020d that should be serviced next. As depicted further at block 1438, arbiter 1032 causes local hub request multiplexer 1030 to output a request only if it determines that it has not been outputting too many requests in successive address tenures, possibly "starving" the masters 300 in the processing unit 100 coupled to its outbound A link. Finally, arbiter 1032 permits a request to be output by local hub request multiplexer 1030 only if an entry is available for allocation in LH tag FIFO queue 924a (block 1440).

If a negative determination is made at any of blocks 1434-1440, the request is delayed, as indicated at block 1442, until a subsequent cycle during which all of the determinations illustrated at blocks 1434-1440 are positive. If, on the other hand, positive determinations are made at all of blocks 1434-1440, arbiter 1032 signals local hub request multiplexer 1030 to output the selected request to an input of multiplexer 920, which always gives priority to a request, if any, presented by LH address launch buffer 910. Thus, multiplexer 920 issues the request on snoop bus 922. It should be noted that the other ports of multiplexer 920 (e.g., RH, RLX, RLY, and RLZ) could present requests concurrently with LH address launch buffer 910, meaning that the maximum bandwidth of snoop bus 922 must equal 10/8 (assuming the embodiment of FIG. 7B) or 5/6 (assuming the embodiment of FIG. 8B) of the bandwidth of the outbound A link in order to keep up with maximum arrival rate.

It should also be observed that only requests buffered within local hub address launch buffer 910 are transmitted on the outbound A link and are required to be aligned with address tenures within the link information allocation. Because all other requests competing for issuance by multiplexer 920 target only the local snoopers 304 and their respective FIFO queues rather than the outbound A link, such requests may be issued in the remaining cycles of the information frames. Consequently, regardless of the particular arbitration scheme employed by multiplexer 920, all requests concurrently presented to multiplexer 920 are guaranteed to be transmitted within the latency of a single information frame.

As indicated at block 1444, in response to the issuance of the request on snoop bus 922, LH tag FIFO queue 924a records the master tag specified in the request and the link from which the request was received (local, X, Y or Z link) from the local master 100 in the master tag field 1100 and source field 1102, respectively, of an entry, beginning tenure 1302 The request is then routed to the outbound A link, as shown at block 1446. The process then passes through page connector 1448 to FIG. 14B, which depicts the processing of the request at the remote hub during the request phase.

The process depicted in FIG. 14B also proceeds from block 1446 to block 1450, which illustrates local hub 100 freeing the local hub token allocated to the request in response to the removal of the request from LH address launch buffer 910, ending tenure 1300. The request is further routed to the snoopers 304 in the local hub 100, as shown at block 1452. In response to receipt of the request, snoopers 304 generate a partial response (block 1454), which is recorded within LH partial response FIFO queue 930, beginning tenure 1304 (block 1456). In particular, at block 1456, an entry 1200 in the LH partial response FIFO queue 930 is allocated to the request by reference to allocation pointer 1210, allocation pointer 1210 is incremented, the partial response of the local hub is placed within the partial response field 1202 of the allocated entry, and the local (L) flag is set in the response flag field 1204. Thereafter, request phase processing at the local hub ends at block 1458.

Figure 14C:
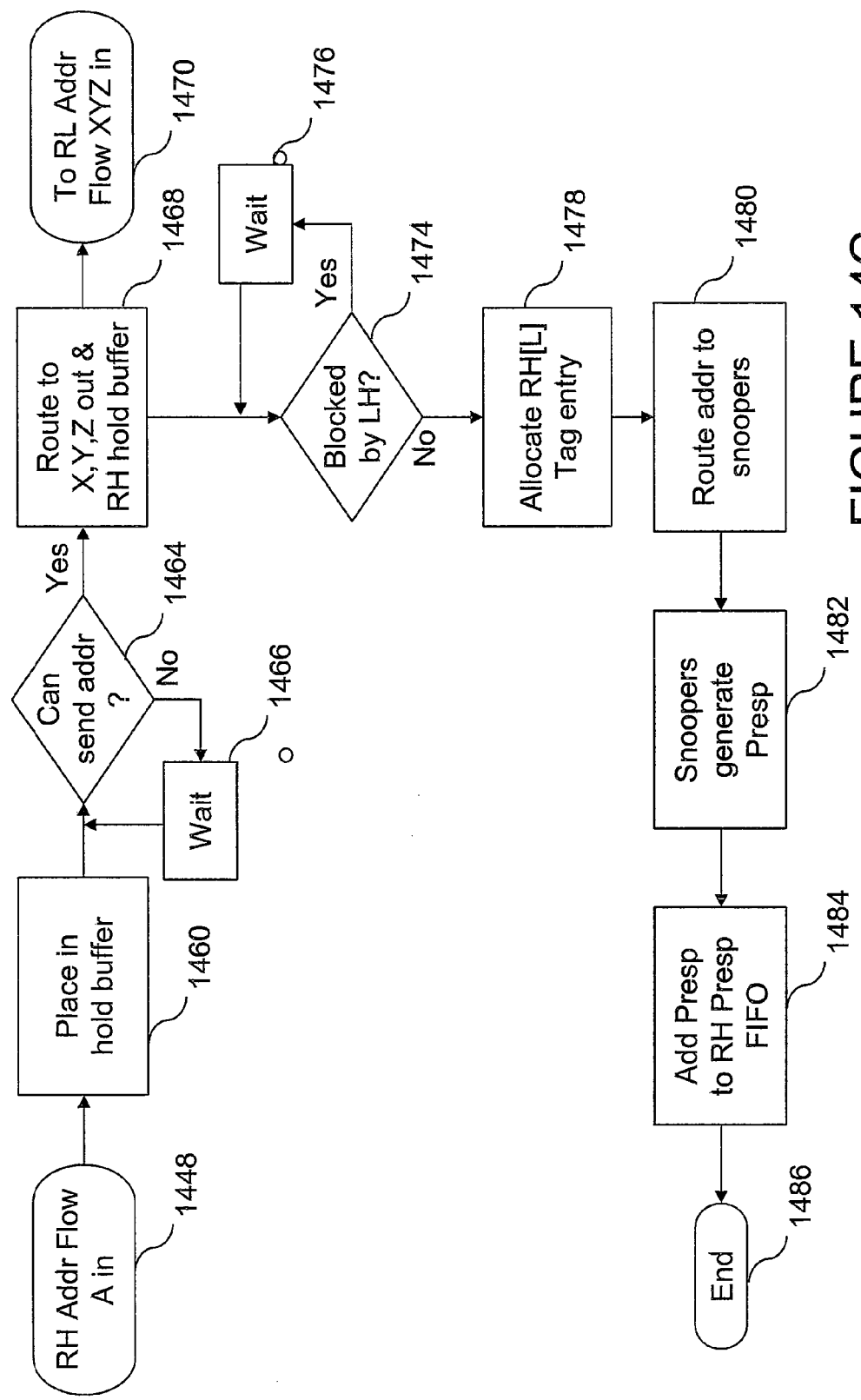

Referring now to FIG. 14C, there is depicted a high level logical flowchart of an exemplary method of request processing at a remote hub in accordance with the present invention. As depicted, the process begins at page connector 1448 upon receipt of the request at the remote hub 100 on its inbound A link. As noted above, the inbound A link is non-blocking, meaning that after the request is latched into a hold buffer 902 as shown at block 1460, the request is transmitted by request multiplexer 904 as soon as the next address tenure is available in the first tier link information allocation. Thus, as shown at block 1464, if no address tenure is available, multiplexer 904 waits for the next information frame as shown at block 1466. If an address tenure is available, the process proceeds from block 1464 to block 1468, which illustrates multiplexer 904 broadcasting the request on request bus 905 to the outbound X, Y and Z links and RH hold buffer 906.

Following block 1468, the process bifurcates. A first path passes through page connector 1470 to FIG. 14D, which illustrates an exemplary method of request processing at the remote leaves 100. The second path from block 1468 proceeds to block 1474, which illustrates the snoop multiplexer 920 determining which of the requests presented at its inputs to output on snoop bus 922. As indicated, snoop multiplexer 920 prioritizes local hub requests over remote hub requests, which are in turn prioritized over requests buffered in remote leaf buffers 914a-914c. Thus, if a local hub request is presented for selection by LH address launch buffer 910, the request buffered within remote hub buffer 906 is delayed, as shown at block 1476. If, however, no request is presented by LH address launch buffer 910, snoop multiplexer 920 issues the request from remote hub buffer 906 on snoop bus 922.

In response to detecting the request on snoop bus 922, RH tag FIFO 924b places the master tag specified by the request into master tag field 1100 of its next available entry, beginning tenure 1306 (block 1478). The request is further routed to the snoopers 304 in the remote hub 100, as shown at block 1480. In response to receipt of the request, snoopers 304 generate a partial response at block 1482, which is recorded within RH partial response FIFO queue 940, beginning tenure 1308 (block 1484). In particular, an entry 1230 in the RH partial response FIFO queue 940 is allocated to the request by reference to its allocation pointer 1210, the allocation pointer 1210 is incremented, the partial response of the remote hub is placed within the partial response field 1202, and the remote flag (R) is set in the response flag field 1234. Thereafter, request phase processing at the remote hub ends at block 1486.

Figure 14D:
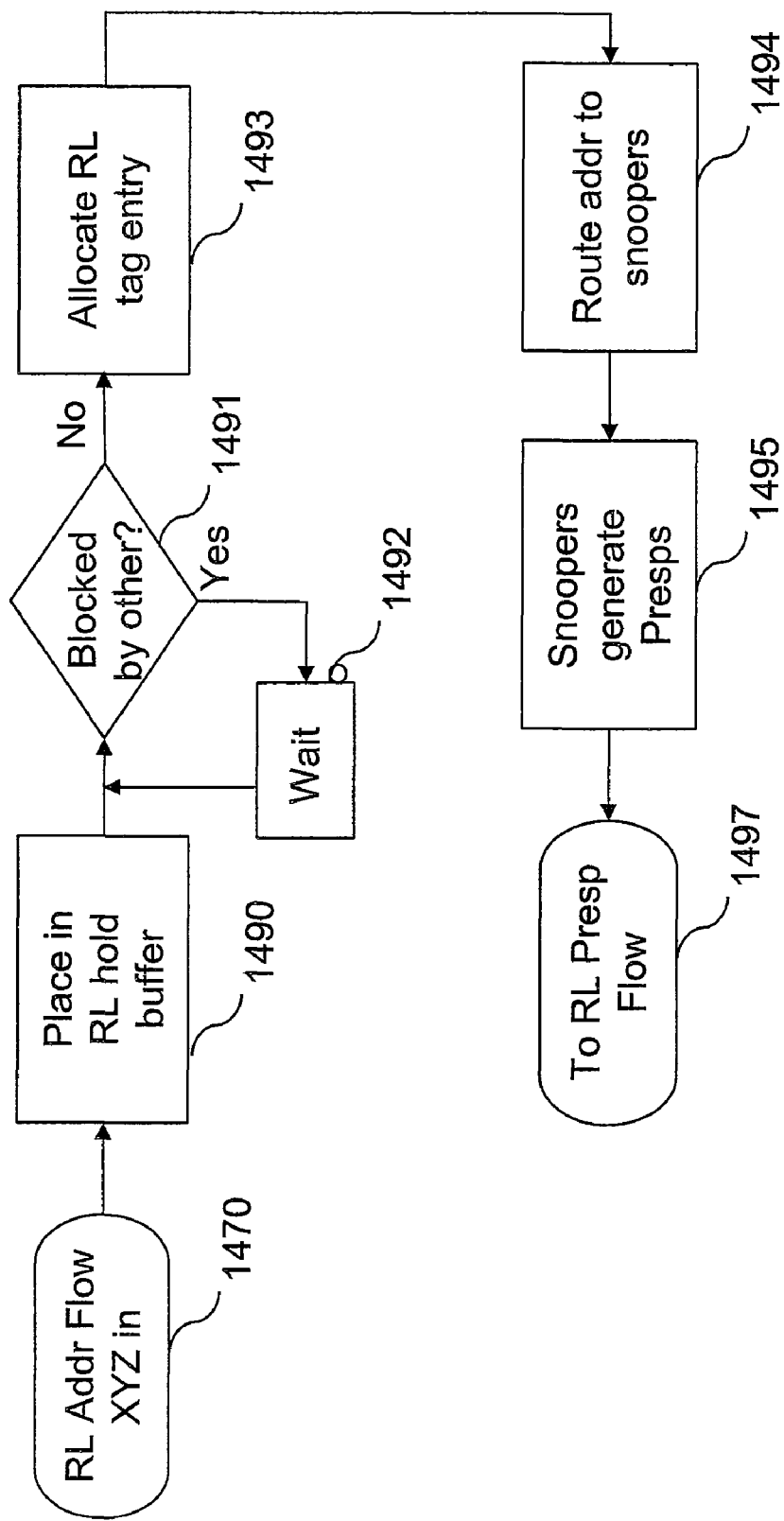

With reference now to FIG. 14D, there is illustrated a high level logical flowchart of an exemplary method of request processing at a remote leaf 100 in accordance with the present invention. As shown, the process begins at page connector 1470 upon receipt of the request at the remote leaf 100 on one of its inbound X, Y and Z links. As indicated at block 1490, in response to receipt of the request, the request is latched into one of RL hold buffers 914a-914c. Next, as depicted at block 1491, the request is evaluated by snoop multiplexer 920 together with the other requests presented to its inputs. As discussed above, snoop multiplexer 920 prioritizes local hub requests over remote hub requests, which are in turn prioritized over requests buffered in remote leaf buffers 914a-914c. Thus, if a local hub or remote hub request is presented for selection, the request buffered within the RL hold buffer 914 is delayed, as shown at block 1492. If, however, no higher priority request is presented to snoop multiplexer 920, snoop multiplexer 920 issues the request from the RL hold buffer 914 on snoop bus 922, fairly choosing between X, Y and Z requests.

In response to detecting the request on snoop bus 922, the RL tag FIFO 924c-924e associated with in the inbound first tier link on which the request was received places the master tag specified by the request into the master tag field 1100 of its next available entry, beginning tenure 1310 (block 1493). The request is further routed to the snoopers 304 in the remote leaf 100, as shown at block 1494. In response to receipt of the request, the snoopers 304 process the request, generate their respective partial response, and accumulate the partial responses to obtain the partial response of that processing unit 100 (block 1495). As indicated by page connector 1497, the partial response of the snoopers 304 of the remote leaf 100 is handled in accordance with FIG. 16A, which is described below.

Figure 14E:
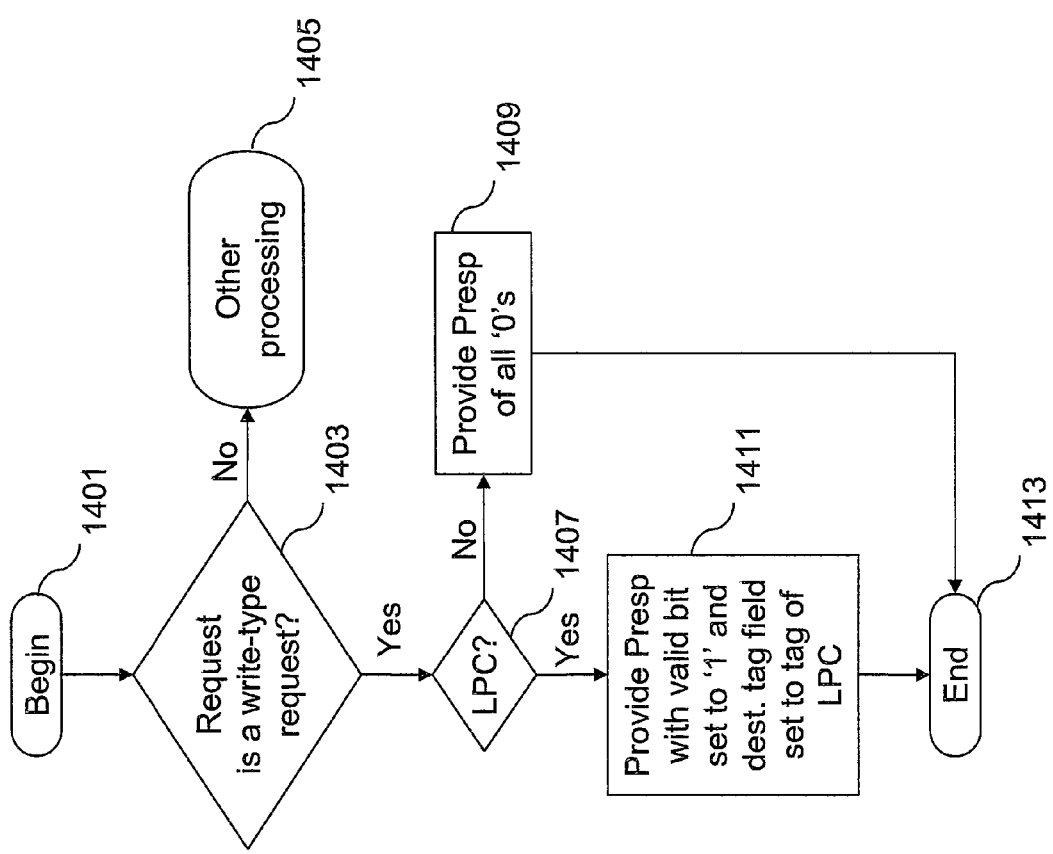
FIG. 14E is a high level logical flowchart of an exemplary method of generating a partial response at a snooper in accordance with the present invention.

FIG. 14E is a high level logical flowchart of an exemplary method by which snoopers 304 generate partial responses for requests, for example, at blocks 1454, 1482 and 1495 of FIGS. 14B-14D. The process begins at block 1401 in response to receipt by a snooper 304 (e.g., an IMC snooper 126, L2 cache snooper 116 or a snooper within an I/O controller 128) of a request. In response to receipt of the request, the snooper 304 determines by reference to the transaction type specified by the request whether or not the request is a write-type request, such as a castout request, write request, or partial write request. In response to the snooper 304 determining at block 1403 that the request is not a write-type request (e.g., a read or RWITM request), the process proceeds to block 1405, which illustrates the snooper 304 generating the partial response for the request, if required, by conventional processing. If, however, the snooper 304 determines that the request is write-type request, the process proceeds to block 1407.

Block 1407 depicts the snooper 304 determining whether or not it is the LPC for the request address specified by the write-type request. For example, snooper 304 may make the illustrated determination by reference to one or more base address registers (BARs) and/or address hash functions specifying address range(s) for which the snooper 304 is responsible (i.e., the LPC). If snooper 304 determines that it is not the LPC for the request address, the process passes to block

1409. Block 1409 illustrates snooper 304 generating a write request partial response 720 (FIG. 7C) in which the valid field 722 and the destination tag field 724 are formed of all '0's, thereby signifying that the snooper 304 is not the LPC for the request address. If, however, snooper 304 determines at block 1407 that it is the LPC for the request address, the process passes to block 1411, which depicts snooper 304 generating a write request partial response 720 in which valid field 722 is set to '1' and destination tag field 724 specifies a destination tag or route that uniquely identifies the location of snooper 304 within data processing system 200. Following either of blocks 1409 or 1411, the process shown in FIG. 14E ends at block 1413.

Figure 15:
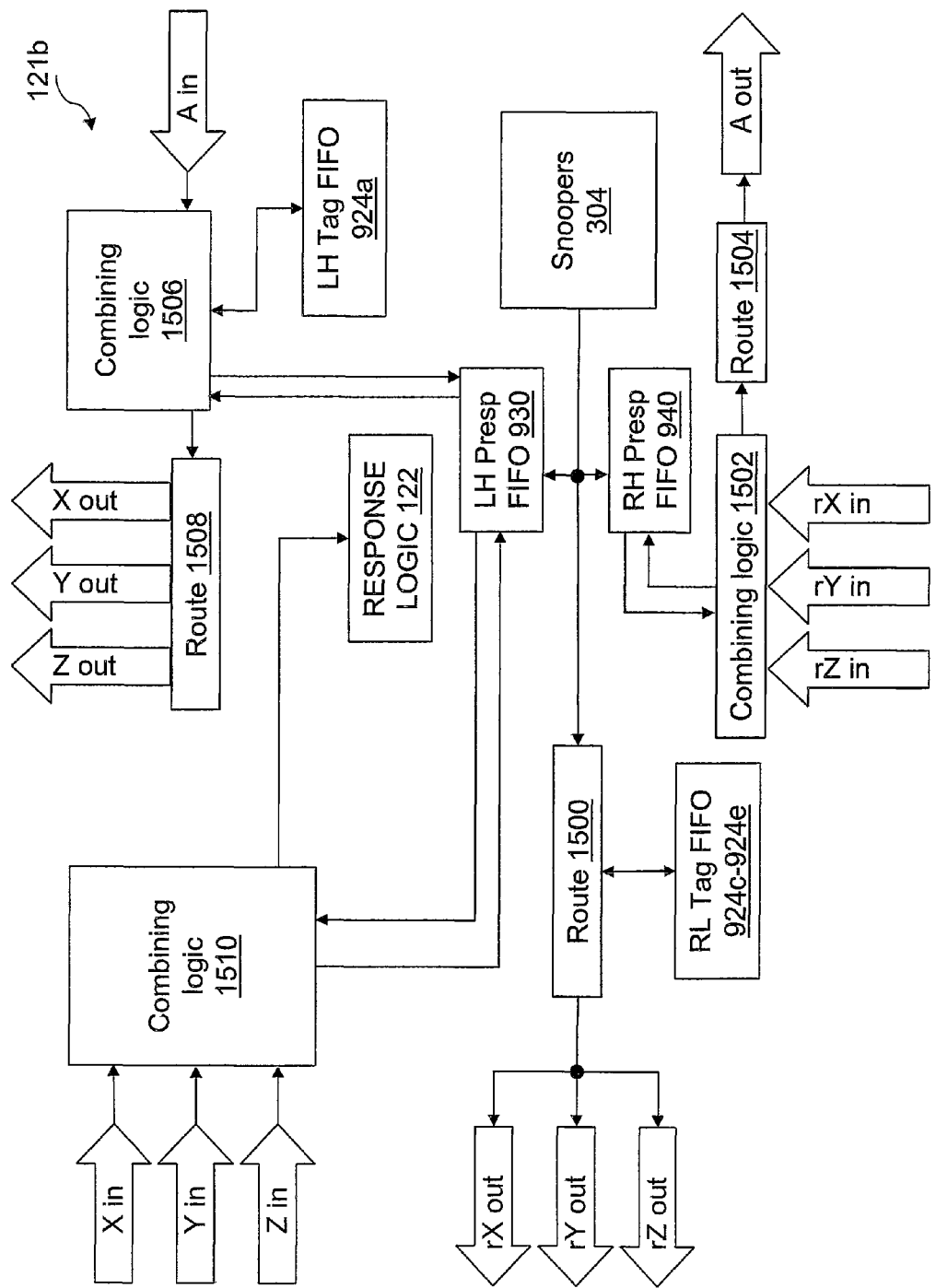
FIG. 15 is a block diagram illustrating a portion of the interconnect logic of FIG. 1 utilized in the partial response phase of an operation.

Referring now to FIG. 15, there is depicted a block diagram illustrating an exemplary embodiment of the partial response logic 121b within interconnect logic 120 of FIG. 1. As shown, partial response logic 121b includes route logic 1500 that routes a remote partial response generated by the snoopers 304 at a remote leaf 100 back to the remote hub 100 from which the request was received via the appropriate one of outbound first tier X, Y and Z links. In addition, partial response logic 121b includes combining logic 1502 and route logic 1504, which respectively combine partial responses received from remote leaves 100 and route such partial responses from RH partial response FIFO queue 940 to the local hub 100 via the outbound A link. Partial response logic 121b further includes combining logic 1506 and route logic 1508, which respectively combine partial responses received from remote hubs 100 and route such partial responses from LH partial response FIFO queue 930 to the local master 100 via the appropriate one of the X, Y and Z links. Finally, partial response logic 121b includes combining logic 1510, which accumulates partial responses received from local hubs 100 and passes the accumulated partial response to response logic 122 for generation of the combined response for the request.

With reference now to FIG. 16A-16D, there are illustrated flowcharts respectively depicting exemplary processing during the partial response phase of an operation at a remote leaf, remote hub, local hub, and local master. In these figures, transmission of partial responses may be subject to various delays that are not explicitly illustrated. However, because there is no timing constraint on partial response latency as discussed above, such delays, if present, will not induce errors in operation and are accordingly not described further herein.

Figure 16A:
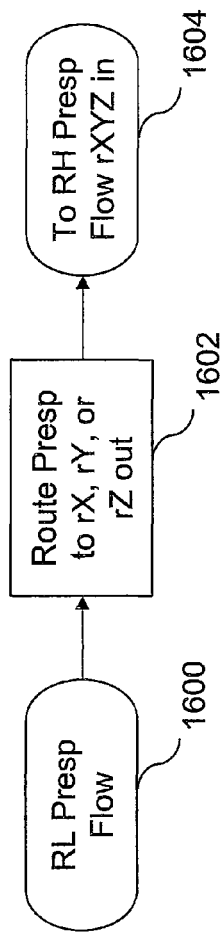
FIG. 16A-16D are flowcharts respectively depicting the partial response phase of an operation at a remote leaf, remote hub, local hub, and local master.

Referring now specifically to FIG. 16A, partial response phase processing at the remote leaf 100 begins at block 1600 when the snoopers 304 of the remote leaf 100 generate partial responses for the request. As shown at block 1602, route logic 1500 then routes, using the remote partial response field 712 or 812 of the link information allocation, the partial response to the remote hub 100 for the request via the outbound X, Y or Z link corresponding to the inbound first tier link on which the request was received. As indicated above, the inbound first tier link on which the request was received is indicated by which one of RL tag FIFO queue 924c-924e holds the master tag for the request. Thereafter, partial response processing continues at the remote hub 100, as indicated by page connector 1604 and as described below with reference to FIG. 16B.

Figure 16B:
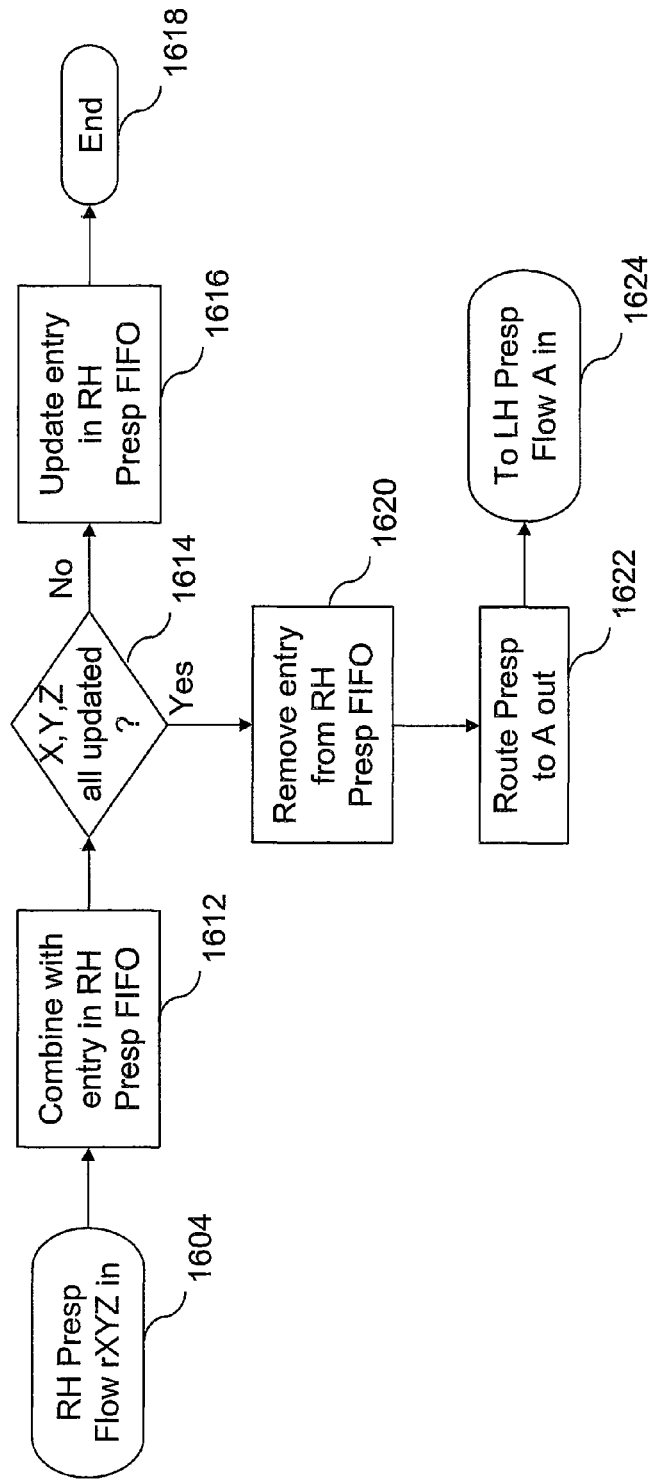

With reference now to FIG. 16B, there is illustrated a high level logical flowchart of an exemplary embodiment of a method of partial response processing at a remote hub in accordance with the present invention. The illustrated process begins at page connector 1604 in response to receipt of the partial response of one of the remote leaves 100 coupled to the remote hub 100 by one of the first tier X, Y and Z links. In response to receipt of the partial response, combining logic 1502 reads out the entry 1230 within RH partial response FIFO queue 940 allocated to the operation. The entry is identified by the FIFO ordering observed within RH partial response FIFO queue 940, as indicated by the X, Y or Z pointer 1216-1220 associated with the link on which the partial response was received. Combining logic 1502 then accumulates the partial response of the remote leaf 100 with the contents of the partial response field 1202 of the entry 1230 that was read. As mentioned above, the accumulation operation is preferably a non-destructive operation, such as a logical OR operation. Next, combining logic 1502 determines at block 1614 by reference to the response flag array 1234 of the entry 1230 whether, with the partial response received at block 1604, all of the remote leaves 100 have reported their respective partial responses. If not, the process proceeds to block 1616, which illustrates combining logic 1502 updating the partial response field 1202 of the entry 1230 allocated to the operation with the accumulated partial response, setting the appropriate flag in response flag array 1234 to indicate which remote leaf 100 provided a partial response, and advancing the associated one of pointers 1216-1220.

Referring again to block 1614, in response to a determination by combining logic 1502 that all remote leaves 100 have reported their respective partial responses for the operation, combining logic 1502 deallocates the entry 1230 for the operation from RH partial response FIFO queue 940 by reference to deallocation pointer 1212, ending tenure 1308 (block 1620). Combining logic 1502 also routes the accumulated partial response to the outbound A link utilizing the remote partial response field 712 or 812 in the link allocation information, as depicted at block 1622. Thereafter, the process passes through page connector 1624 to FIG. 16C.

Figure 16C:
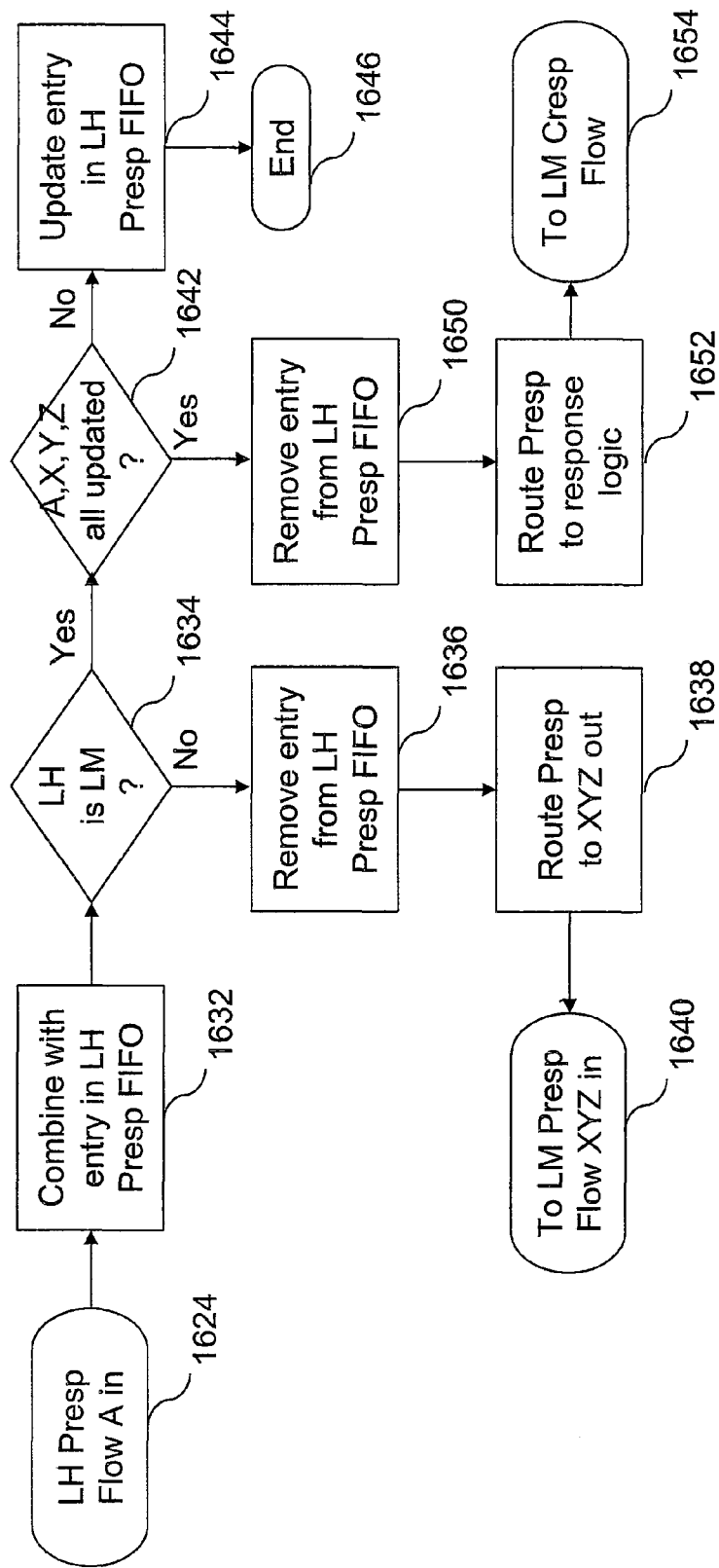

Referring now to FIG. 16C, there is depicted a high level logical flowchart of an exemplary method of partial response processing at a local hub in accordance with an embodiment of the present invention. The process begins at block 1624 in response to receipt at the local hub 100 of a partial response from a remote hub 100 via the inbound A link. In response to receipt of the partial response, combining logic 1506 reads out the entry 1200 within LH partial response FIFO queue 930 allocated to the operation. The entry is identified by the FIFO ordering observed within LH partial response FIFO queue 930, as indicated by the A pointer 1214. Combining logic 1506 then accumulates the partial response of the remote hub 100 with the contents of the partial response field 1202 of the entry 1200 that was read. As shown at blocks 1634, combining logic 1502 further determines by reference to the source field 1102 of the relevant entry in LH tag FIFO queue 924a whether the local hub 100 is the local master 100 of the operation. If not, the process proceeds to block 1636; otherwise, the process passes to block 1642.

At block 1636, combining logic 1506 deallocates the entry 1200 for the operation from LH partial response FIFO queue 930 by reference to deallocation pointer 1212, ending tenure 1304 Combining logic 1506 then passes the accumulated partial response and a source indication to route logic 1508, which routes the accumulated partial response to the local master 100 via the local partial response field 708 or 808 in the link information allocation of the particular first tier link indicated by the source indication 1102, as depicted at block 1638. Thereafter, the process passes through page connector 1640 to FIG. 16D, which illustrates partial response processing at the local master.

Referring now to block 1642, if the local hub 100 is the local master 100, combining logic 1506 determines by reference to the response flag array 1204 of the entry 1200 whether, with the partial response received at block 1624, all of the local hubs 100 and the remote hub, if any, have reported their respective partial responses. If not, the process proceeds to block 1644, which illustrates combining logic 1506 updating the partial response field 1202 of the entry 1200 allocated to the operation with the accumulated partial response, setting the appropriate flag in response flag array 1204 to indicate the link on which the partial response was received, and advancing the A pointer 1214 associated with the newly set flag to the next entry. Thereafter, the method of partial response processing at the local hub ends at block 1646.

Referring again to block 1642, if combining logic 1506 determines that all local hubs and the remote hub, if any, have all reported their respective partial responses for the operation, combining logic 1506 deallocates the entry 1200 for the operation from LH partial response FIFO queue 930 by reference to deallocation pointer 1212, ending tenure 1304 (block 1650). Combining logic 1506 also routes the accumulated partial response to response logic 122, as depicted at block 1652. Thereafter, the process passes through page connector 1654 to FIG. 18A, which is described below.

Figure 16D:
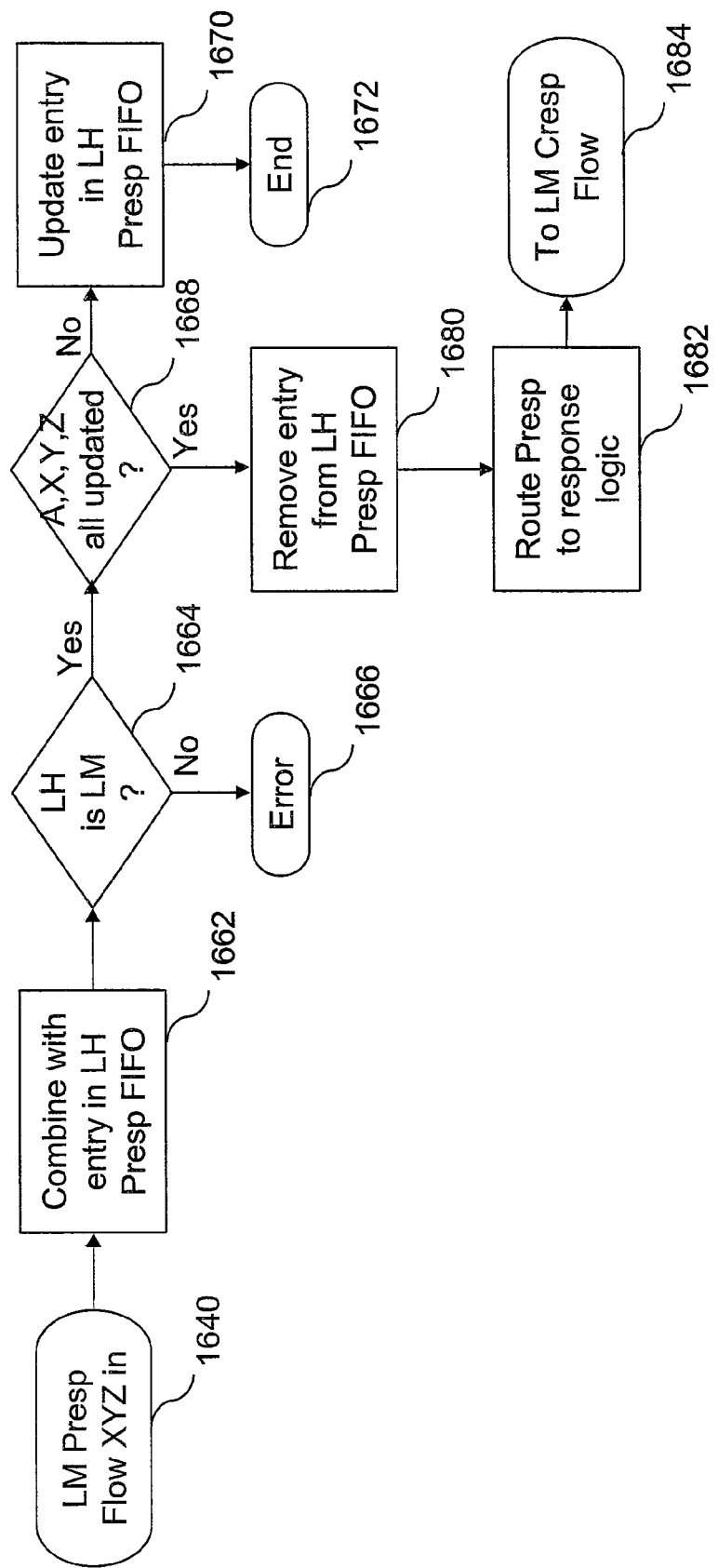

With reference now to FIG. 16D, there is illustrated a high level logical flowchart of an exemplary method of partial response processing at a local master in accordance with the present invention. The process begins at block 1640 in response to receipt at the local master 100 of a partial response from a local hub 100 via one of the inbound first tier X, Y and Z links. In response to receipt of the partial response, combining logic 1510 reads out the entry 1200 within LH partial response FIFO queue 930 allocated to the operation. The entry is identified by the FIFO ordering observed within LH partial response FIFO queue 930, as indicated by the X, Y or Z pointer 1216-1220 associated with the link on which the partial response was received. Combining logic 1510 then accumulates the partial response of the local hub 100 with the contents of the partial response field 1202 of the entry 1200 that was read. As shown at block 1664, combining logic 1502 further determines by reference to the source field 1102 of the relevant entry in LH tag FIFO queue 924b whether the local hub 100 is the local master 100. If not, an error occurs that causes processing to halt, as shown at block 1666. If, however, an affirmative determination is made at block 1664, the process proceeds to block 1668.

Block 1668 depicts combining logic 1510 determining by reference to response flag array 1204 whether, with the partial response received at block 1640, all of the local hubs 100 and the remote hub 100, if any, have reported their respective partial responses for the operation. If not, the process proceeds to block 1670, which illustrates combining logic 1510 updating the partial response field 1202 of the entry 1200 allocated to the operation with the accumulated partial response, setting the appropriate flag in response flag array 1204 to indicate the link on which the partial response was received, and advancing to the next entry the pointer among pointers 1216-1220 associated with the newly set flag. Thereafter, the method of partial response processing at the local master ends at block 1672.

Referring again to block 1668, if combining logic 1510 determines that all local hubs 100 and the remote hub 100, if any, have all reported their respective partial responses for the operation, combining logic 1510 deallocates the entry 1200 for the operation from LH partial response FIFO queue 930 by reference to deallocation pointer 1212, ending tenure 1304 at the local master/local hub 100 (block 1680). Combining logic 1510 also routes the accumulated partial response to response logic 122, as depicted at block 1682. Thereafter, the process passes through page connector 1684 to FIG. 18A, which is described below.

Figure 17:
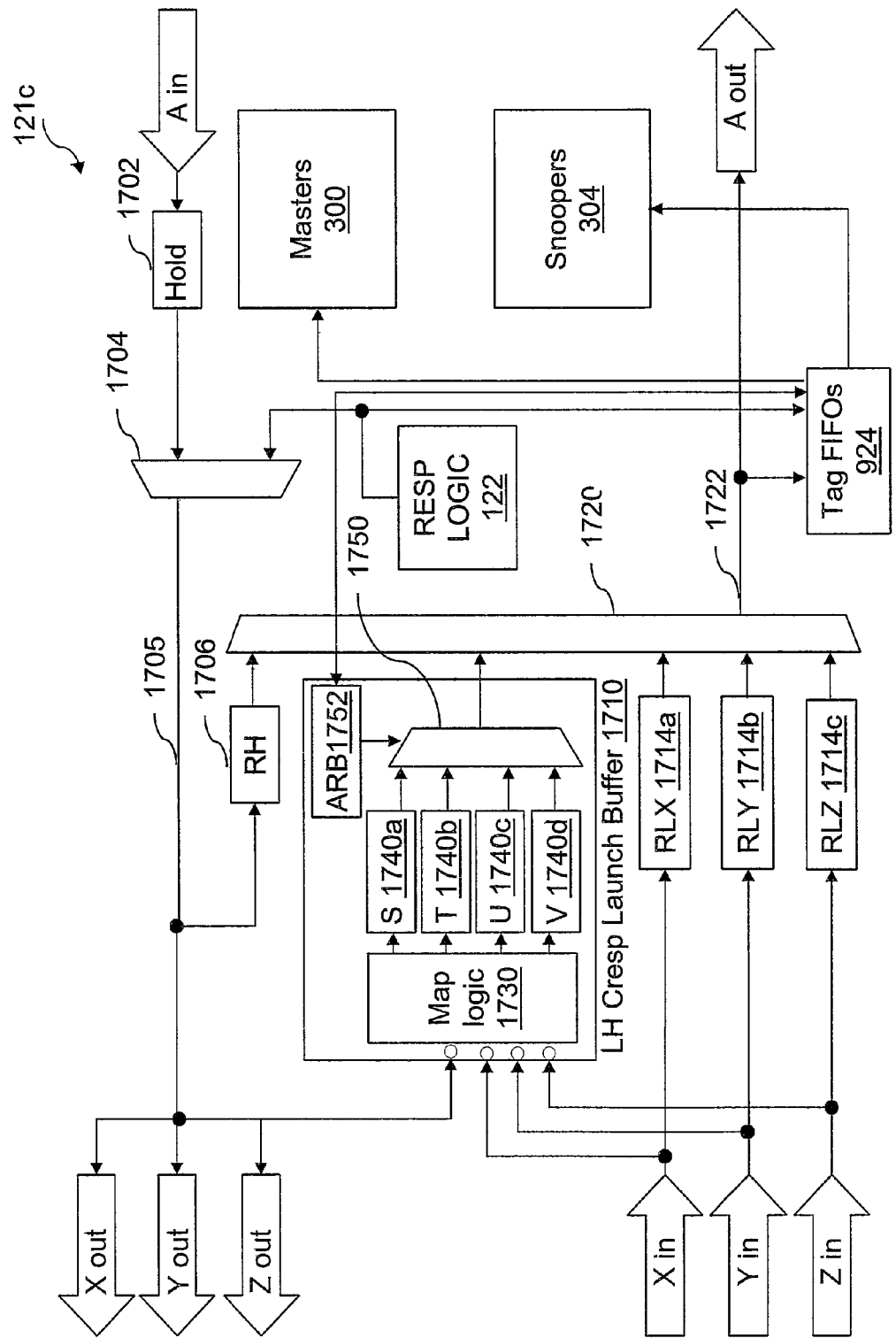
FIG. 17 is a block diagram illustrating a portion of the interconnect logic of FIG. 1 utilized in the combined response phase of an operation.

Referring now to FIG. 17, there is depicted a block diagram of exemplary embodiment of the combined response logic 121c within interconnect logic 120 of FIG. 1 in accordance with the present invention. As shown, combined response logic 121c includes a first multiplexer 1704 having a first input to which response logic 122 is coupled and a second input coupled to a hold buffer 1702 that receives frames on the inbound A link. The output of first multiplexer 1704 drives a first bus 1705 that is coupled to each of the outbound X, Y and Z links, a remote hub (RH) buffer 1706, and the local hub (LH) combined response launch buffer 1710.

The inbound first tier X, Y and Z links are each coupled to the LH combined response launch buffer 1710, as well as a respective one of remote leaf (RL) buffers 1714a-1714c. The outputs of remote hub buffer 1706, LH combined response launch buffer 1710, and RL buffers 1714a-1714c all form inputs of a second multiplexer 1720. The output of second multiplexer 1720 drives a second bus 1722 to which tag FIFO queues 924, the snoopers 304 (e.g., snoopers 116 of L2 cache 110 and snoopers 126 of IMC 124) of the processing unit 100, and the outbound A link are coupled. Masters 300 and response logic 122 are further coupled to tag FIFO queues 924. The connection to tag FIFO queue 924 permits the local master to observe the combined response and the accumulated partial response from which the combined response was produced before any snooper at a local hub observes the combined response. Consequently, the timing constraint term regarding the combined response latency from the winning master 300 to snooper 304n (i.e., C_lat(WM_S)) is non-zero and, more particularly, approximately equivalent to the first tier link transmission latency. Consequently, the timing constraint set forth above can be met.

Figure 18A:
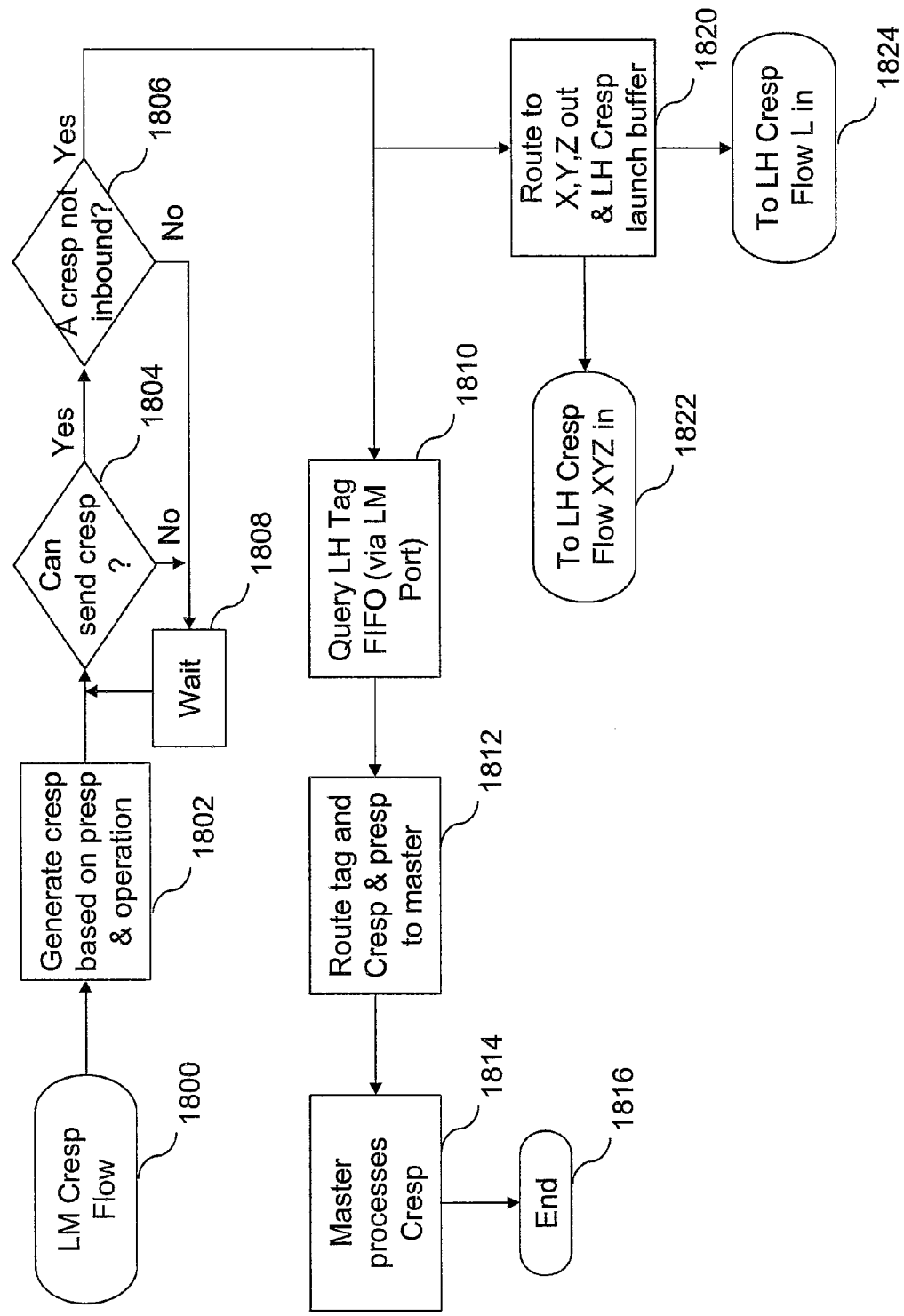
FIG. 18A-18D are flowcharts respectively depicting the combined response phase of an operation at a local master, local hub, remote hub, and remote leaf.

With reference now to FIG. 18A-18D, there are depicted high level logical flowcharts respectively depicting exemplary combined response phase processing at a local master, local hub, remote hub, and remote leaf in accordance with an exemplary embodiment of the present invention. Referring now specifically to FIG. 18A, combined response phase processing at the local master 100 begins at block 1800 and then proceeds to block 1802, which depicts response logic 122 generating the combined response for an operation based upon the type of request and the accumulated partial response. Response logic 122 presents the combined response to the first input of first multiplexer 1704 and to LH tag FIFO 924a.

Following block 1802, the process proceeds to blocks 1804 and 1806, each of which represents a condition on the issuance of the combined response on first bus 1705 by first multiplexer 1704. Block 1804 illustrates multiplexer 1704 determining if an address tenure is then available in the outbound first tier link information allocation. That is, the output of first multiplexer 1704 is timeslice-aligned with the selected link information allocation and will only generate an output during cycles designed to carry a combined response (e.g., cycle 1 or 3 of the embodiment of FIG. 7A or cycle 1 of the embodiment of FIG. 8A). As further illustrated at block 1806, first multiplexer 1704 will also only issue a combined response if no competing combined response is inbound on the second tier A link, which is always given priority. Thus, the second tier links are guaranteed to be non-blocking with respect to inbound combined responses.

If a negative determination is made at either of blocks 1804-1806, the combined response is delayed, as indicated at block 1808, until a subsequent cycle during which both of the determinations illustrated at blocks 1804-1806 are positive. If, on the other hand, positive determinations are made at both of blocks 1804-1806, the process bifurcates and proceeds to each of blocks 1810 and 1820. Block 1820 depicts first multiplexer 1704 broadcasting the request on first bus 1705 to each of the outbound X, Y and Z links and to LH combined response launch buffer 1710. Thereafter, the process bifurcates again and passes through page connectors 1822 and 1824 to FIG. 18B, which illustrates the processing of the combined response at each of the local hubs 100.

Returning to block 1810, response logic 122 also queries LH tag FIFO queue 924a via the local master port as shown in FIG. 17, which routes the master tag read from LH tag FIFO queue 924a and the associated combined response and accumulated partial response to the particular one of masters 300 identified by the master tag (block 1-812). In response to receipt of the combined response and master tag, the originating master 300 processes the combined response, and if the corresponding request was a write-type request, the accumulated partial response (block 1814).

For example, if the combined response indicates "success" and the corresponding request was a read-type request (e.g., a read, DClaim or RWITM request), the originating master 300 may update or prepare to receive a requested memory block. In this case, the accumulated partial response is discarded. If the combined response indicates "success" and the corresponding request was a write-type request (e.g., a castout, write or partial write request), the originating master 300 extracts the destination tag field 724 from the accumulated partial response and utilizes the contents thereof as the data tag 714 or 814 used to route the subsequent data phase of the operation to its destination, as described below with reference to FIGS. 20A-20C. If a "success" combined response indicates or implies a grant of HPC status for the originating master 300, then the originating master 300 will additionally begin to protect its ownership of the memory block, as depicted at reference numerals 312b and 1314. If, however, the combined response received at block 1814 indicates another outcome, such as "retry", the originating master 300 may be required to reissue the request. Thereafter, the process ends at block 1816.

Figure 18B:
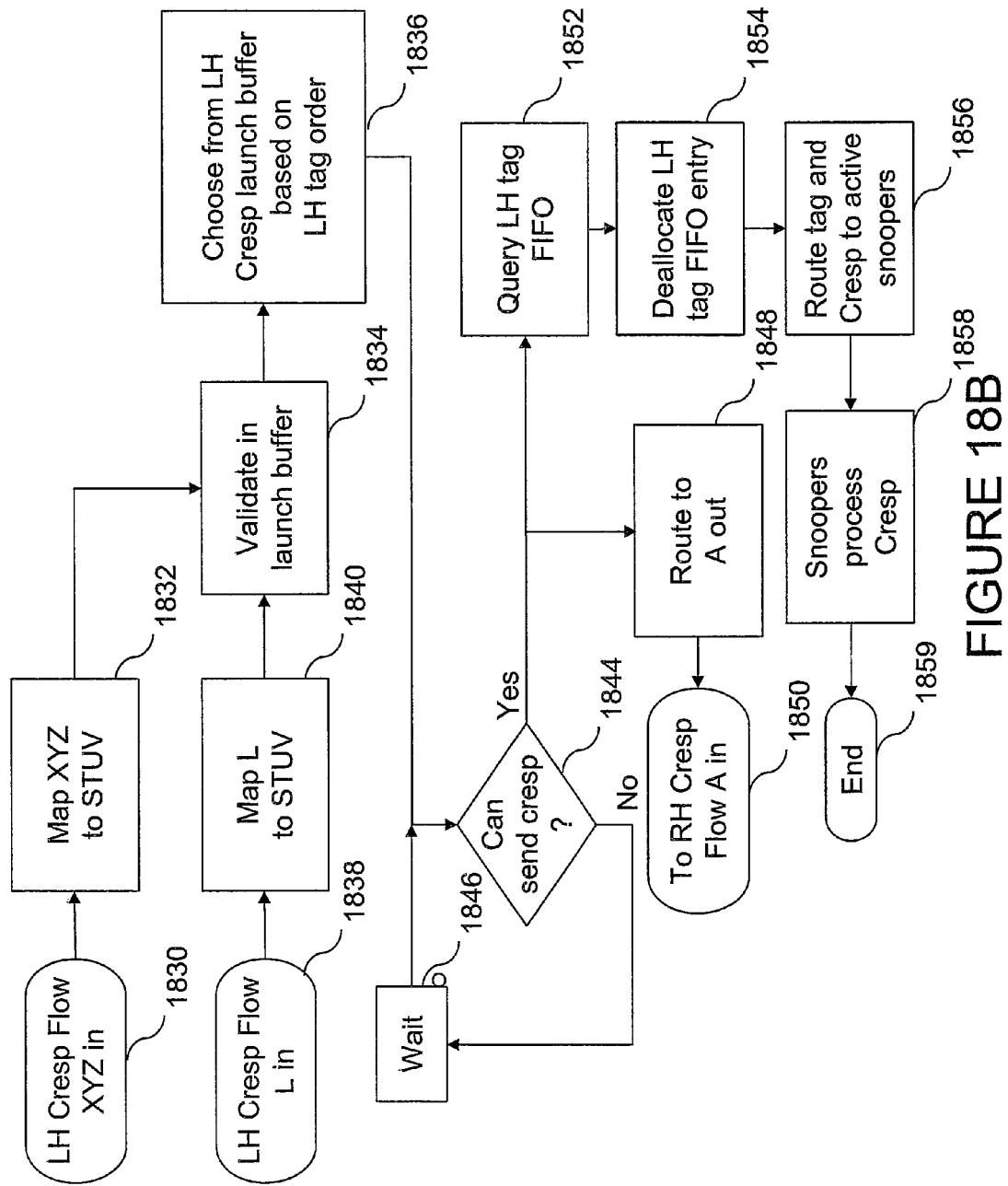

With reference now to FIG. 18B, an exemplary method of processing a combined response at a local hub 100 that is also the local master 100 is illustrated beginning at block 1838, and an exemplary method of processing of a combined response at each of the other local hubs 100 in the same processing node 202 as the local master 100 is depicted beginning at block 1830. Turning first to block 1830, combined responses received by a local hub 100 on the inbound X, Y and Z links are received by LH combined response launch buffer 1710. As depicted at blocks 1832-1834 and in FIG. 17, map logic 1730 within LH combined response launch buffer 1710 maps each of the X, Y and Z combined responses to the appropriate one of position-dependent FIFO queues 1740a-1740d and then validates the combined responses within position-dependent FIFO queues 1740a-1740d.

Referring now to block 1838, at the local master/local hub 100, the combined response on first bus 1705 is fed directly into LH combined response launch buffer 1710. As with the combined responses received on the X, Y and Z links, map logic 1730 maps the combined response to the appropriate position-dependent FIFO queue 1740 based upon the known physical position of the local master/local hub 100. Following the mapping by map logic 1730 at block 1840, map logic 1730 validates the combined response in its position-dependent FIFO queue 1740 as shown at block 1834.

Following the validation at block 1834, the process then proceeds to blocks 1836, which illustrates arbiter 1752 selecting from position-dependent FIFO queues 1740a-1740d a combined response for presentation to second multiplexer 1720. As indicated, the combined response selected by arbiter 1752 is not necessarily the oldest combined response out of all the combined response residing in position-dependent FIFO queues 1740a-1740d, but is instead the combined response that corresponds to the oldest master tag residing within LH tag FIFO queue 924a. Thus, the combined responses are broadcast in the same relative order as the requests.

As depicted at block 1844, arbiter 1752 is time-slice aligned with the selected second tier link information allocation and permits multiplexer 1750 to output a combined response only if an address tenure is then available for the combined response in the outbound second tier link information allocation. Thus, for example, arbiter 1752 causes multiplexer 1750 to output combined responses only during cycle 1 or 3 of the embodiment of FIG. 7B or cycle 1 of the embodiment of FIG. 8B. If a negative determination is made at blocks 1844, the combined response is delayed, as indicated at block 1846, until a subsequent cycle during which an address tenure is available. If, on the other hand, a positive determination is made at block 1844, arbiter 1752 signals multiplexer 1750 to output the selected combined response to an input of second multiplexer 1720, which always gives priority to a combined response, if any, presented by LH combined response launch buffer 1710. Thus, second multiplexer 1720 issues the combined response received from LH combined response launch buffer 1710 on second bus 1722. It should be noted that arbiter 1752 cannot overdrive the output bandwidth since the inbound arrival rate of combined responses is limited by prior request grant.

It should also be noted that the other ports of second multiplexer 1720 (e.g., RH, RLX, RLY, and RLZ) could present requests concurrently with LH combined response launch buffer 1710, meaning that the maximum bandwidth of second bus 1722 must equal 10/8 (assuming the embodiment of FIG. 7B) or 5/6 (assuming the embodiment of FIG. 8B) of the bandwidth of the outbound A link in order to keep up with maximum arrival rate.

It should further be observed that only combined responses buffered within local hub combined response launch buffer 1710 are transmitted on the outbound A link and are required to be aligned with address tenures within the link information allocation. Because all other combined responses competing for issuance by second multiplexer 1720 target only the local snoopers 304 and their respective FIFO queues rather than the outbound A link, such combined responses may be issued in the remaining cycles of the information frames. Consequently, regardless of the particular arbitration scheme employed by second multiplexer 1720, all combined responses concurrently presented to second multiplexer 1720 are guaranteed to be transmitted within the latency of a single information frame.

Following the issuance of the combined response on second bus 1722, the process bifurcates and proceeds to each of blocks 1848 and 1852. Block 1848 depicts routing the combined response to the outbound A link for transmission to the remote hub 100. Thereafter, the process proceeds through page connector 1850 to FIG. 18C, which depicts an exemplary method of combined response processing at a remote hub 100.

Referring now to block 1852, the combined response issued on second bus 1722 is also utilized to query LH tag FIFO queue 924a to obtain the master tag from the oldest entry therein. Thereafter, LH tag FIFO queue 924a deallocates the entry allocated to the operation, ending tenure 1302 (block 1854). The combined response and the associated master tag are then routed to the snoopers 304 within the local hub 100, as shown at block 1856. In response to receipt of the combined response, snoopers 304 process the combined response and perform any operation required in response thereto (block 1858). For example, a snooper 304 may source a requested memory block to the master 300 of the request, invalidate a cached copy of the requested memory block, etc. If the combined response includes an indication that the snooper 304 is to transfer ownership of the memory block to the requesting master 300, snooper 304 ends its protection window 312a. Thereafter, combined response phase processing at the local hub 100 ends at block 1859.

Figure 18C:
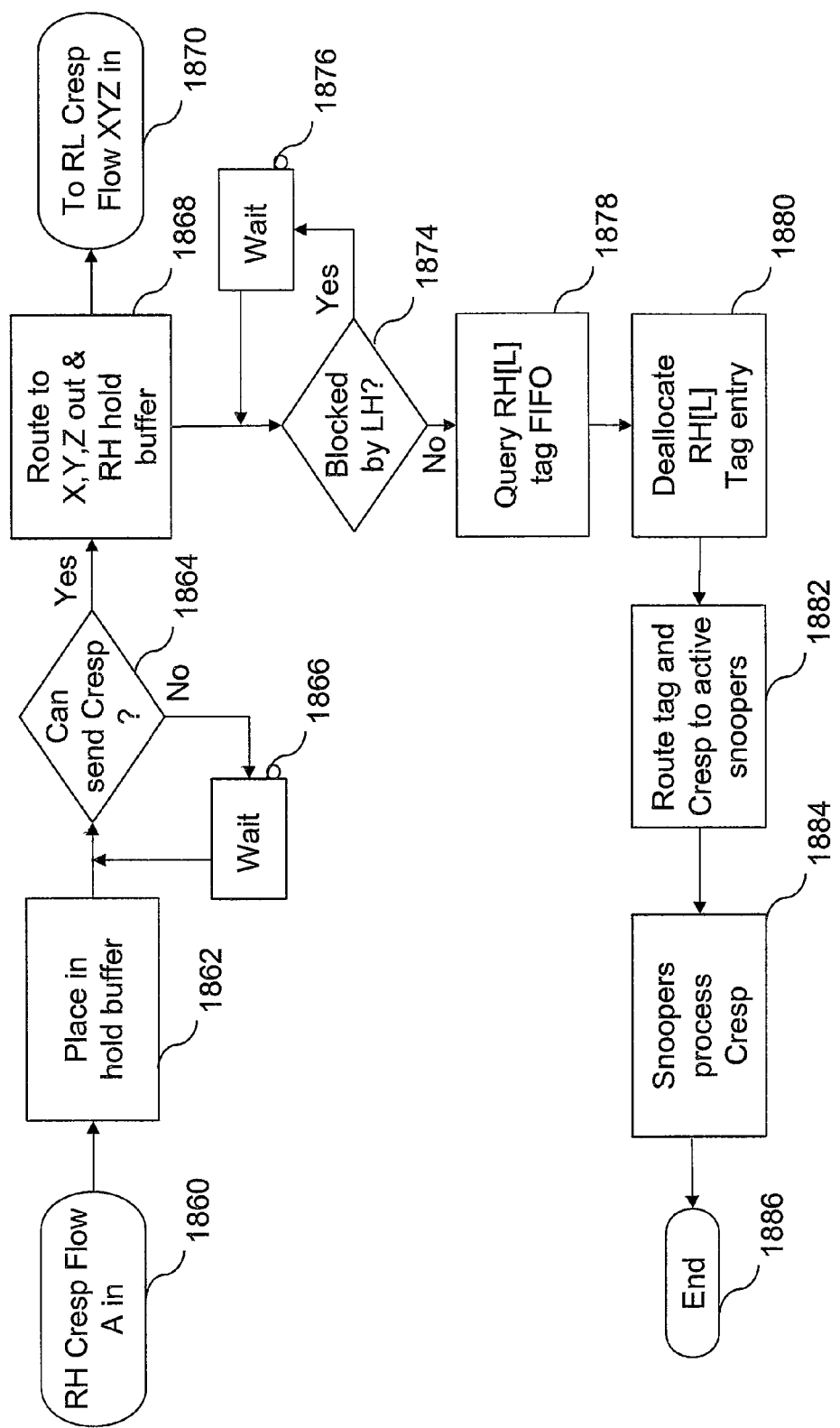

Referring now to FIG. 18C, there is depicted a high level logical flowchart of an exemplary method of combined response phase processing at a remote hub 100 in accordance with the present invention. As depicted, the process begins at page connector 1860 upon receipt of a combined response at a remote hub 100 on its inbound A link. As noted above, the inbound A link is non-blocking, meaning that after the frame containing a combined response is latched into a hold buffer 1702 as shown at block 1862, the combined response is transmitted by first multiplexer 1704 as soon as the next address tenure is available in the first tier link information allocation. Thus, as shown at block 1864, if no address tenure is available, first multiplexer 1704 waits for the next address tenure as shown at block 1866. If an address tenure is available, the process proceeds from block 1864 to block 1868, which illustrates first multiplexer 1704 broadcasting the combined response on first bus 1705 to the outbound X, Y and Z links and RH hold buffer 1706.

Following block 1868, the process bifurcates. A first path passes through page connector 1870 to FIG. 18D, which illustrates an exemplary method of combined response phase processing at the remote leaves 100. The second path from block 1868 proceeds to block 1874, which illustrates the second multiplexer 1720 determining which of the combined responses presented at its inputs to output on second bus 1722. As indicated, second multiplexer 1720 prioritizes local hub combined responses over remote hub combined responses, which are in turn prioritized over combined responses buffered in remote leaf buffers 1714a-1714c. Thus, if a local hub combined response is presented for selection by LH combined response launch buffer 1710, the combined response buffered within remote hub buffer 1706 is delayed, as shown at block 1876. If, however, no combined response is presented by LH combined response launch buffer 1710, second multiplexer 1720 issues the combined response from remote hub buffer 1706 on second bus 1722.

In response to detecting the combined response on second bus 1722, RH[L] tag FIFO 924b reads out the master tag specified by the relevant request from the master tag field 1100 of the relevant entries, as depicted at block 1878, and then deallocates the entry, ending tenure 1306 (block 1880). The combined response and the master tag are further routed to the snoopers 304 in the remote hub 100, as shown at block 1882. In response to receipt of the combined response, the snoopers 304 process the combined response (block 1884) and perform any required operations, as discussed above. If the combined response includes an indication that the snooper 304 is to transfer ownership of the memory block to the requesting master 300, the snooper 304 ends its protection window 312a. Thereafter, combined response phase processing at the remote hub ends at block 1886.

Figure 18D:
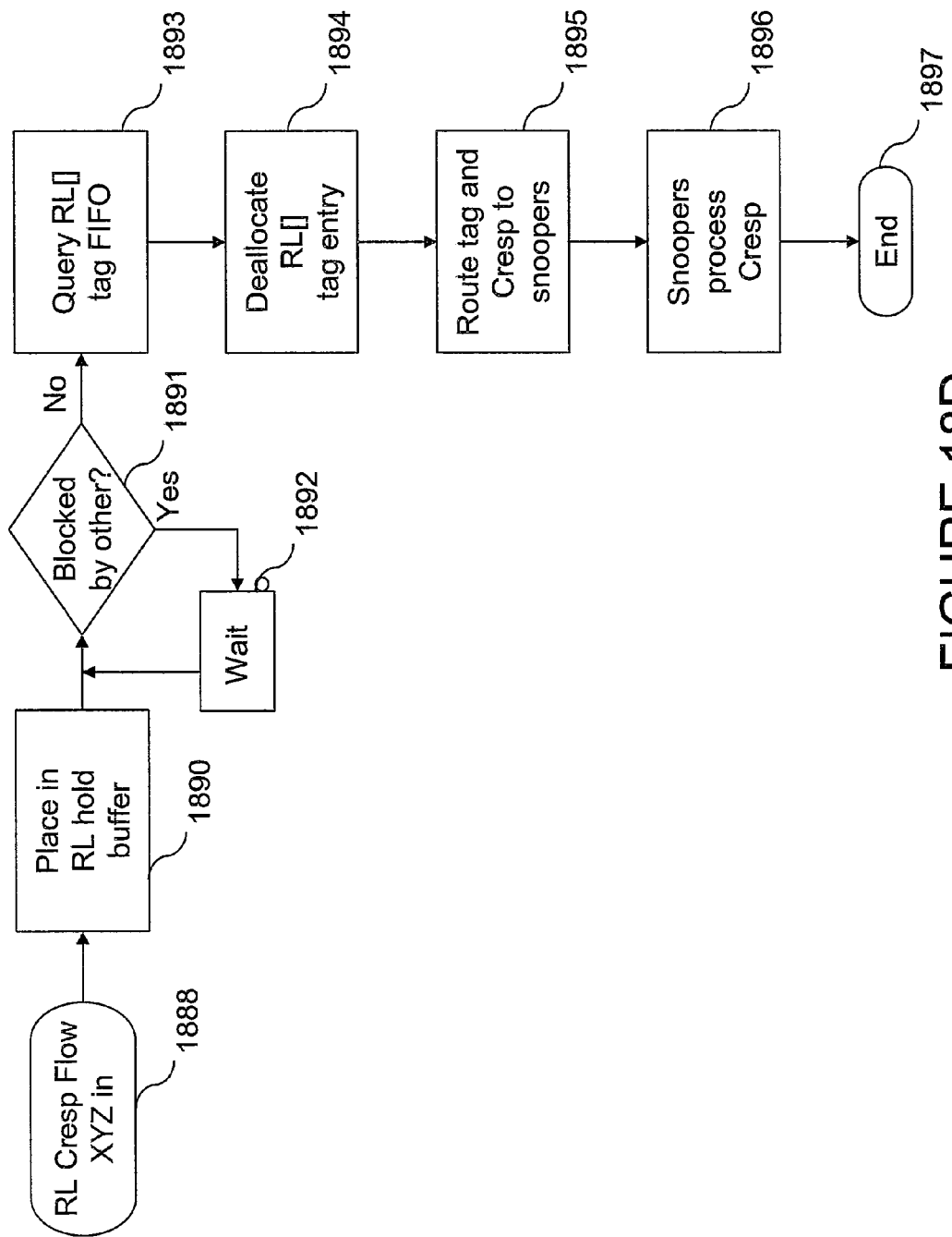

With reference now to FIG. 18D, there is illustrated a high level logical flowchart of an exemplary method of combined response phase processing at a remote leaf 100 in accordance with the present invention. As shown, the process begins at page connector 1888 upon receipt of a combined response at the remote leaf 100 on one of its inbound X, Y and Z links. As indicated at block 1890, the combined response is latched into one of RL hold buffers 1714a-1714c. Next, as depicted at block 1891, the combined response is evaluated by second multiplexer 1720 together with the other combined responses presented to its inputs. As discussed above, second multiplexer 1720 prioritizes local hub combined responses over remote hub combined responses, which are in turn prioritized over combined responses buffered in remote leaf buffers 1714a-1714c. Thus, if a local hub or remote hub combined response is presented for selection, the combined response buffered within the RL hold buffer 1714 is delayed, as shown at block 1892. If, however, no higher priority combined response is presented to second multiplexer 1720, second multiplexer 920 issues the combined response from the RL hold buffer 1714 on second bus 1722.

In response to detecting the combined response on second bus 1722, the RL tag FIFO 924c-924e associated with the inbound first tier link on which the combined response was received reads out from the master tag field 1100 of one of its entries the master tag specified by the associated request, as depicted at block 1893, and then deallocates the entry, ending tenure 1310 (block 1894). The combined response and the master tag are further routed to the snoopers 304 in the remote leaf 100, as shown at block 1895. In response to receipt of the combined response, the snoopers 304 process the combined response (block 1896) and perform any required operations, as discussed above. If the combined response includes an indication that the snooper 304 is to transfer ownership of the memory block to the requesting master 300, snooper 304 ends its protection window 312a (and protection window 1312 of FIG. 13). Thereafter, combined response phase processing at the remote leaf 100 ends at block 1897.

Figure 19:
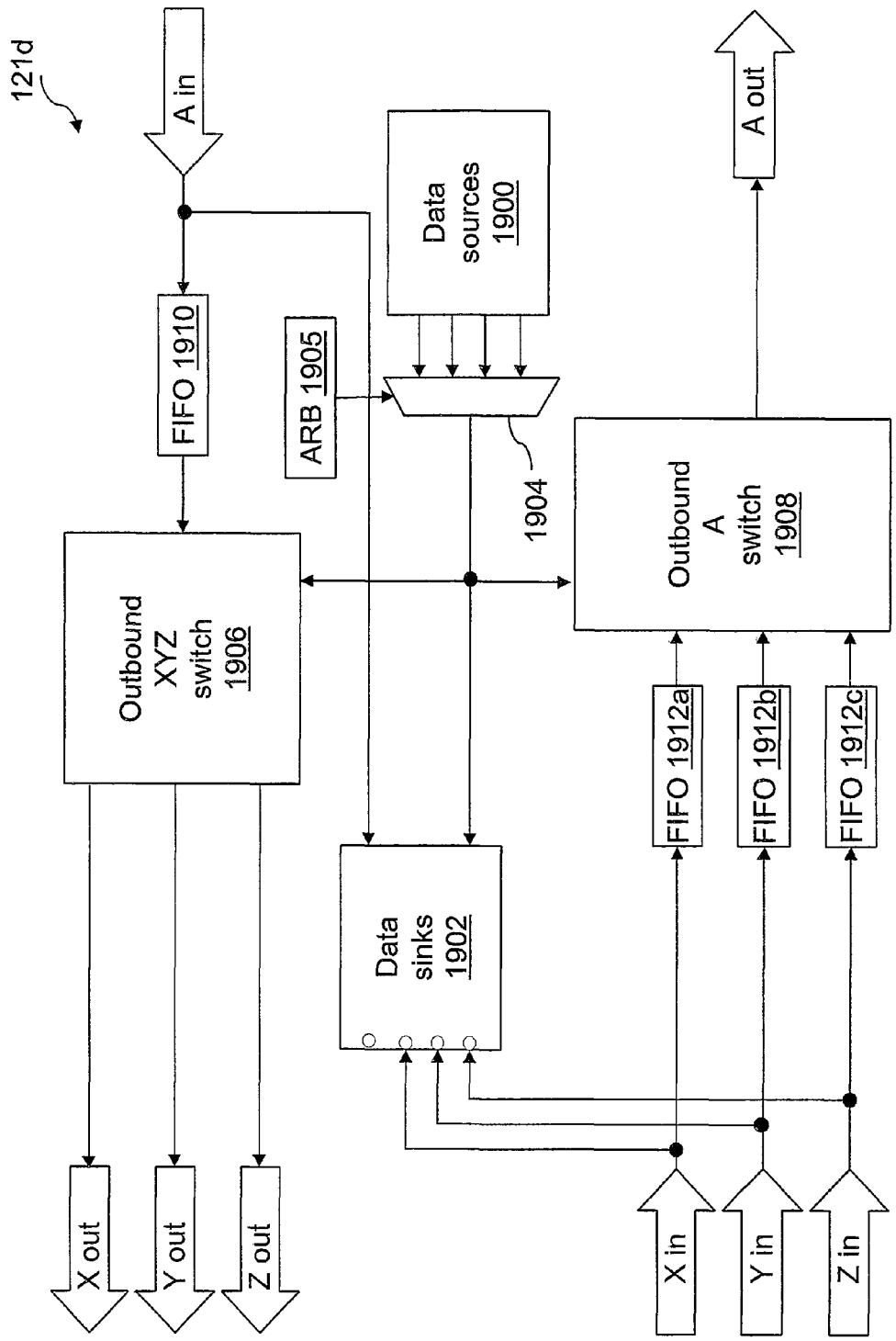
FIG. 19 is a block diagram depicting a portion of the interconnect logic of FIG. 1 utilized in the data phase of an operation.

Referring now to FIG. 19, there is depicted a block diagram of an exemplary embodiment of data logic 121d within interconnect logic 120. As shown, data logic 121d includes a second tier link FIFO queue 1910 for buffering in arrival order data tags and tenures received on the in-bound A link, as well as an outbound XYZ switch 1906, coupled to the output of second tier link FIFO queue 1910, for routing data tags and tenures to outbound first tier X, Y and Z links. In addition, data logic 121d includes first tier link FIFO queues 1912a-1912c, which are each coupled to a respective one of the inbound X, Y and Z links to queue in arrival order inbound data tags and tenures, and an outbound A switch 1908, coupled to the outputs of first tier link FIFO queues 1912a-1912c, for routing data tags and tenures to outbound A links. Data logic 121d further includes an m:n data multiplexer 1904, which outputs data from one or more selected data sources 1900 (e.g., data sources within L2 cache array 114, IMC 124 and I/O controller 128) to outbound XYZ switch 1906, data sinks 1902 (e.g., data sinks within L2 cache array 114, IMC 124 and I/O controller 128), and/or outbound A switch 1908 under the control of arbiter 1905. Data sinks 1902 are further coupled to receive data from the inbound X, Y, Z and A links. The operation of data logic 121d is described below with reference to FIGS. 20A-20C, which respectively depict data phase processing at the processing unit containing the data source, at a processing unit receiving data from another processing unit in its processing node, and at a processing unit receiving data from a processing unit in another processing node.

Figure 20A:
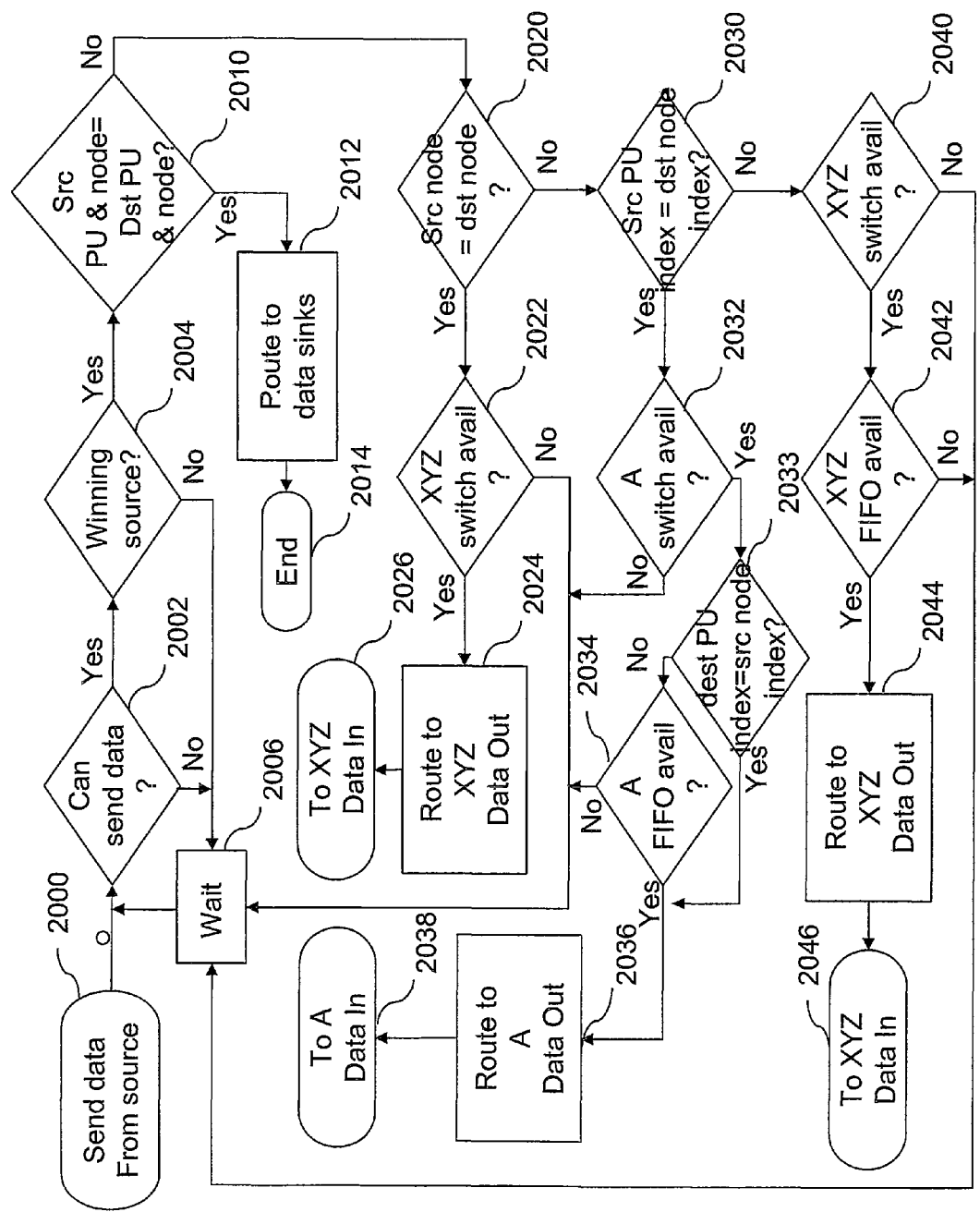
FIGS. 20A-20C are flowcharts respectively depicting the data phase of an operation at the processing unit containing the data source, at a processing unit receiving data from another processing unit in its same processing node, and at a processing unit receiving data from a processing unit in another processing node.

Referring now to FIG. 20A, there is depicted a high level logical flowchart of an exemplary method of data phase processing at a source processing unit 100 containing the data source 1900 that initiates transmission of data. The source processing unit 100 may be the local master, local hub, remote hub or remote leaf with respect to the request with which the data transfer is associated. In the depicted method, decision blocks 2002, 2004, 2010, 2020, 2022, 2030, 2032, 2033, 2034, 2040 and 2042 all represent determinations made by arbiter 1905 in selecting the data source(s) 1900 that will be permitted to transmit data via multiplexer 1904 to outbound XYZ switch 1906, data sinks 1902, and/or outbound A switch 1908.

As shown, the process begins at block 2000 and then proceeds to block 2002, which illustrates arbiter 1905 determining whether or not a data tenure is currently available. For example, in the embodiment of FIGS. 7A-7B, the data tenure includes the data tag 714 of cycle 2 and the data payload of cycles 4-7. Alternatively, in the embodiment of FIGS. 8A-8B, the data tenure includes the data tag 814 of cycle 0 and the data payload of cycles 2-5. If a data tenure is not currently available, data transmission must wait, as depicted at block 2006. Thereafter, the process returns to block 2002.

Referring now to block 2004, assuming the presence of multiple data sources 1900 all contending for the opportunity to transmit data, arbiter 1905 further selects one or more "winning" data sources 1900 that are candidates to transmit data from among the contending data sources 1900. In a preferred embodiment, the "winning" data source(s) 1900 are permitted to output data on up to all of the X, Y, Z and A links during each given link information allocation frame. A data source 1900 that is contending for an opportunity to transmit data and is not selected by arbiter 1905 in the current link information allocation frame must delay transmission of its data until a subsequent frame, as indicated by the process returning to blocks 2006 and 2002.

Referring now to blocks 2010, 2020, and 2030, arbiter 1905 examines the data tag presented by a "winning" data source 1900 to identify a destination for its data. For example, the data tag may indicate, for example, a destination processing node 202, a destination processing unit 100 (e.g., by S, T, U, V position), a logic unit within the destination processing unit 100 (e.g., L2 cache masters 112), and a particular state machine (e.g., a specific data sink 1902) within the logic unit. By examining the data tag in light of the known topology of data processing system 200, arbiter 1905 can determine whether or not the source processing unit 100 is the destination processing unit 100 (block 2010), within the same processing node 202 as the destination processing unit 100 (block 2020), or directly coupled to the destination processing node 202 by a second tier link (block 2030). Based upon this examination, arbiter 1905 can determine whether or not the resource(s) required to transmit a "winning" data source's data are available.

For example, if the source processing unit 100 is the destination processing unit 100 (block 2010), there is no resource constraint on the data transmission, and arbiter 1905 directs multiplexer 1904 to route the data and associated data tag to the local data sinks 1902 for processing by the indicated data sink 1902 (block 2012). Thereafter, the process ends at block 2014.

If, however, the source processing unit 100 is not the destination processing unit 100 but the source processing node 202 is the destination processing node 202 (block 2020), arbiter 1905 determines at block 2022 whether outbound XYZ switch 1906 is available to handle a selected data transmission. If not, the process passes to block 2006, which has been described. If, however, outbound XYZ switch 1906 is available to handle a selected data transmission, arbiter 1905 directs multiplexer 1904 to route the data to outbound XYZ switch 1906 for transmission to the destination processing unit 100 identified by the data tag, which by virtue of the determination at block 2020 is directly connected to the present processing unit 100 by a first tier link (block 2024). Thereafter, the process proceeds through page connector 2026 to FIG. 20B, which illustrates processing of the data at the destination processing unit 100. It should also be noted by reference to block 2020, 2022 and 2024 that data transmission by a source processing unit 100 to any destination processing unit 100 in the same processing node 202 is non-blocking and not subject to any queuing or other limitation by the destination processing unit 100.

Referring now to block 2030, arbiter 1905 determines whether or not the source processing unit 100 is directly connected to a destination processing node 202 by a second tier (A) link. Assuming the topology construction rule set forth previously, this determination can be made by determining whether the index assigned to the source processing unit 100 matches the index assigned to the destination processing node 202. If the source processing unit 100 is not directly connected to a destination processing node 202 by a second tier (A) link, the source processing unit 100 must transmit the data tenure to the destination processing node 202 via an intermediate hub 100 in the same processing node 202 as the source processing unit 100. This data transmission is subject to two additional constraints depicted at blocks 2040 and 2042.

First, as illustrated at block 2040, outbound XYZ switch 1906 must be available to handle the data transmission. Second, as depicted at block 2042, the intermediate hub 100 must have an entry available in the relevant one of its FIFO queues 1912a-1912c to receive the data transmission. As noted briefly above, in a preferred embodiment, source processing unit 100 tracks the availability of queue entries at the intermediate hub 100 based upon data tokens 715 or 815 transmitted from the intermediate hub 100 to the source processing unit 100. If either of the criteria depicted at blocks 2040 and 2042 is not met, the process passes to block 2006, which is described above. If, however, both criteria are met, arbiter 1905 directs multiplexer 1904 to route the data tenure to outbound XYZ switch 1906 for transmission to the intermediate hub 100 (block 2044). Thereafter, the process proceeds through page connector 2046 to FIG. 20B.

Returning to block 2030, if arbiter 1905 determines that the source processing unit 100 is directly connected to a destination processing node 202 by a second tier (A) link, the data transmission is again conditioned on the availability of resources at one or both of the source processing unit 100 and the receiving processing unit 100. In particular, as shown at block 2032, outbound A switch 1908 must be available to handle the data transmission. In addition, as indicated at blocks 2033 and 2034, the data transmission may be dependent upon whether a queue entry is available for the data transmission in the FIFO queue 1910 of the downstream processing unit 100. That is, if the source processing unit 100 is directly connected to the destination processing unit 100 (e.g., as indicated by the index of the destination processing unit 100 having the same index than the source processing node 202), data transmission by the source processing unit 100 to the destination processing unit 100 is non-blocking and not subject to any queuing or other limitation by the destination processing unit 100. If, however, the source processing unit 100 is connected to the destination processing unit 100 via an intermediate hub 100 (e.g., as indicated by the index of the destination processing unit 100 having a different index than the source processing node 202), the intermediate hub 100 must have an entry available in its FIFO queue 1910 to receive the data transmission. The availability of a queue entry in FIFO queue 1910 is indicated to the source processing unit 100 by data tokens 715 or 815 received from the intermediate hub 100.

Assuming the condition depicted at block 2032 is met and, if necessary (as determined by block 2033), the condition illustrated at block 2034 is met, the process passes to block 2036. Block 2036 depicts arbiter 1905 directing multiplexer 1904 to route the data tag and data tenure to outbound A switch 1908 for transmission to the intermediate hub 100. Thereafter, the process proceeds through page connector 2038 to FIG. 20C, which is described below. In response to a negative determination at either of blocks 2032 and 2034, the process passes to block 2006, which has been described.

Figure 20B:
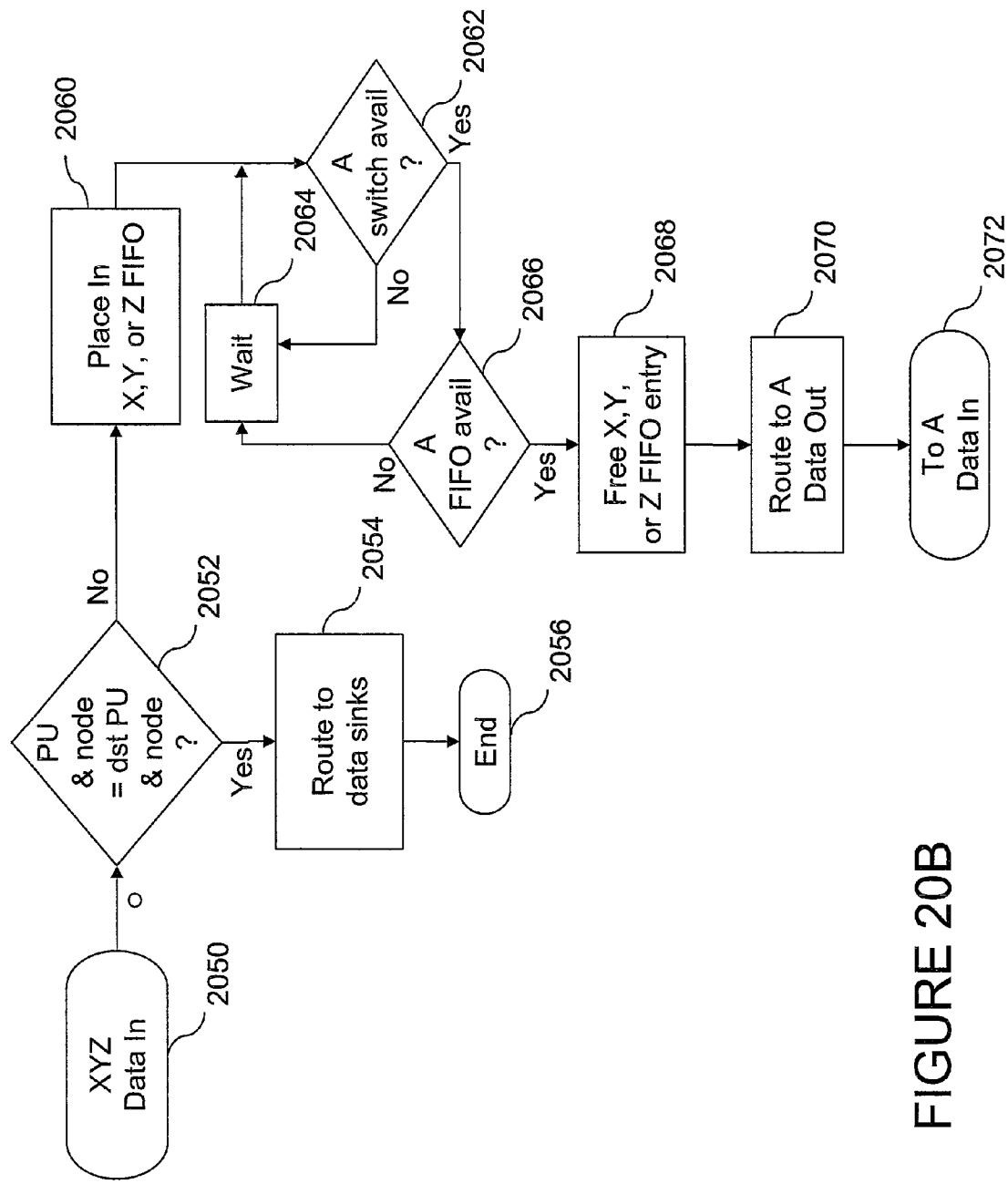

With reference now to FIG. 20B, there is illustrated a high level logical flowchart of an exemplary method of data phase processing at a processing unit 100 receiving data from another processing unit 100 in the same processing node 202. As depicted, the process begins at block 2050 in response to receipt of a data tag on one of the inbound first tier X, Y and Z links. In response to receipt of the data tag, unillustrated steering logic within data logic 121d examines the data tag at block 2052 to determine if the processing unit 100 is the destination processing unit 100. If so, the steering logic routes the data tag and the data tenure following the data tag to the local data sinks 1902, as shown at block 2054. Thereafter, data phase processing ends at block 2056.

If, however, the steering logic determines at block 2052 that the present processing unit 100 is not the destination processing unit 100, the process passes to block 2060. Block 2060 depicts buffering the data tag and data tenure within the relevant one of FIFO queues 1912a-1912c until the data tag and data tenure can be forwarded via the outbound A link. As illustrated at block 2062, 2064 and 2066, the data tag and data tenure can be forwarded only when outbound A switch 1908 is available to handle the data transmission (block 2062) and the downstream processing unit 100 has an entry available in its FIFO queue 1910 to receive the data transmission (as indicated by data tokens 715 or 815 received from the downstream processing unit 100). When the conditions illustrated at block 2062 and 2066 are met concurrently, the entry in FIFO queue 1912 allocated to the data tag and data tenure is freed (block 2068), and a data token 715 or 815 is transmitted to the upstream processing unit 100 to indicate that the entry in FIFO queue 1912 is available for reuse. In addition, outbound A switch 1908 routes the data tag and data tenure to the outbound A link (block 2070). Thereafter, the process proceeds through page connector 2072 to FIG. 20C.

Figure 20C:
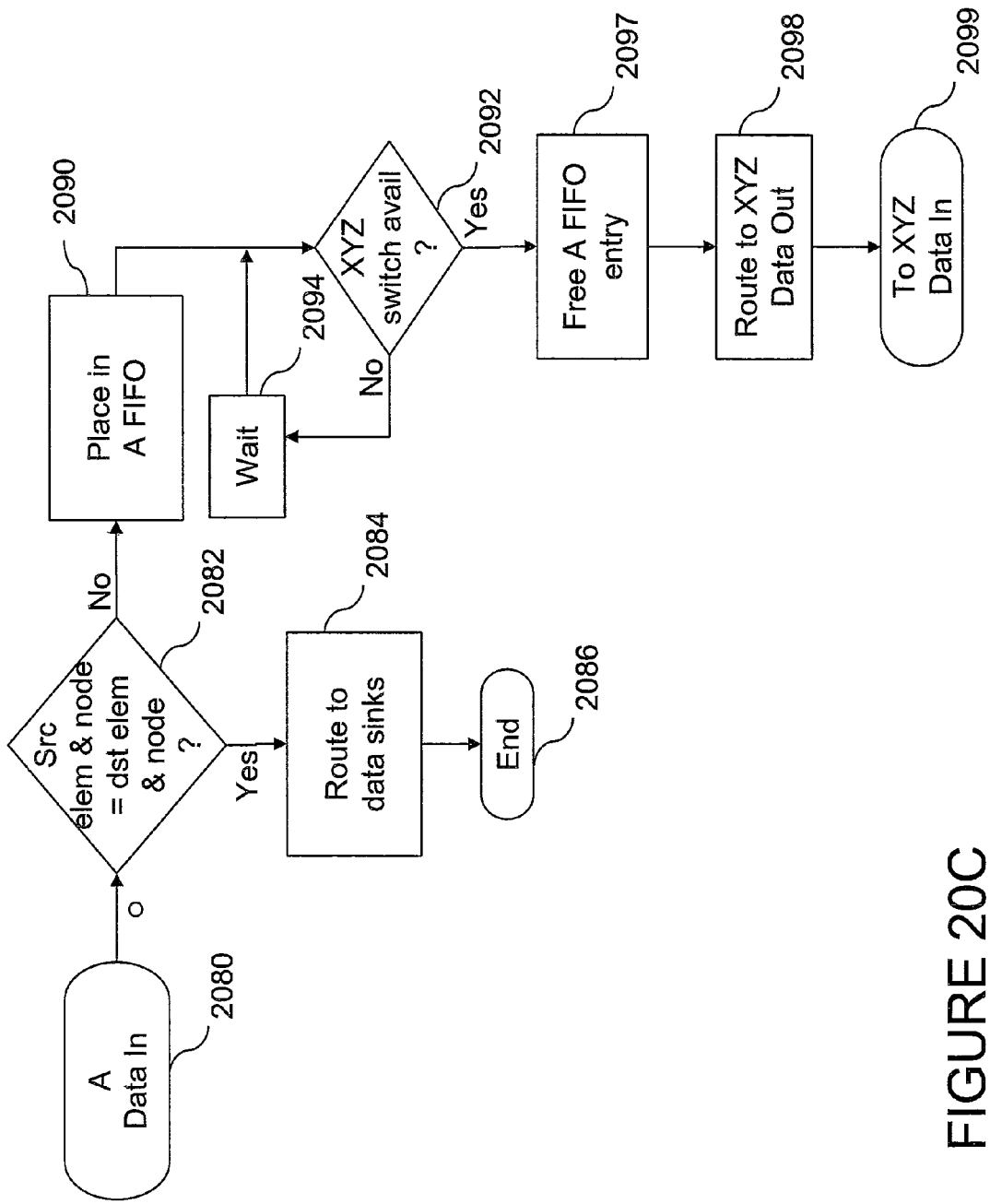

Referring now to FIG. 20C, there is depicted a high level logical flowchart of an exemplary method of data phase processing at a processing unit 100 receiving data from a processing unit 100 in another processing node 202. As depicted, the process begins at block 2080 in response to receipt of a data tag on the inbound second tier A link. In response to receipt of the data tag, unillustrated steering logic within data logic 121d examines the data tag at block 2082 to determine if the present processing unit 100 is the destination processing unit 100. If so, the steering logic routes the data tag and the data tenure following the data tag to the local data sinks 1902, as shown at block 2084. Thereafter, data phase processing ends at block 2086.

If, however, the steering logic determines at block 2082 that the present processing unit 100 is not the destination processing unit 100, the process passes to block 2090. Block 2090 depicts buffering the data tag and data tenure within FIFO queue 1910 until the data tag and data tenure can be forwarded via the appropriate one of the outbound X, Y and Z links. As illustrated at block 2092 and 2094, the data tag and data tenure can be forwarded only when outbound XYZ switch 1906 is available to handle the data transmission (block 2092). When the condition illustrated at block 2092 is met, the entry in FIFO queue 1910 allocated to the data tag and data tenure is freed (block 2097), and a data token 715 or 815 is transmitted to the upstream processing unit 100 via the A link to indicate that the entry in FIFO queue 1910 is available for reuse. In addition, outbound XYZ switch 1906 routes the data tag and data tenure to the relevant one of the outbound X, Y and Z links (block 2098). Thereafter, the process proceeds through page connector 2099 to FIG. 20B, which has been described.

As has been described, the present invention provides an improved processing unit, data processing system and interconnect fabric for a data processing system. The inventive data processing system topology disclosed herein increases in interconnect bandwidth with system scale. In addition, a data processing system employing the topology disclosed herein may also be hot upgraded (i.e., processing nodes may be added during operation), downgraded (i.e., processing nodes may be removed), or repaired without disruption of communication between processing units in the resulting data processing system through the connection, disconnection or repair of individual processing nodes. The data processing system topology described herein also permits the latency of operation phases on the interconnect fabric to remain bounded regardless of system scale. For example, the request latency beginning with block 1444 and ending at each of blocks 1454, 1482, and 1495 for the local hubs, remote hubs and remote leaves, respectively, is bounded, as shown in FIG. 13. In addition, the combined response latency beginning at block 1802 and ending at each of blocks 1814, 1858, 1884 and 1896 for the local master, local hubs, remote hubs and remote leaves, respectively, is similarly bounded. Consequently, increases in system scale do not modify latencies in a manner that violates the time constraint required for correctness.

While the invention has been particularly shown as described with reference to a preferred embodiment, it will be understood by those skilled in the art that various changes in form and detail may be made therein without departing from the spirit and scope of the invention. For example, although the present invention discloses preferred embodiments in which FIFO queues are utilized to order operation-related tags and partial responses, those skilled in the art will appreciated that other ordered data structures may be employed to maintain an order between the various tags and partial responses of operations in the manner described. In addition, although preferred embodiments of the present invention employ uni-directional communication links, those skilled in the art will understand by reference to the foregoing that bi-directional communication links could alternatively be employed.

What is claimed is:

1. A data processing system, comprising:
   at least three processing nodes each including at least four processing units, wherein:
      each of the processing units is connected by a respective point-to-point communication link with each other processing unit in its own processing node ;
      at least one processing unit in each of the processing nodes is connected by a point-to-point communication link to a processing unit in a different processing node;

no more than one processing unit in each processing node is connected by a point-to-point communication link to a processing unit in a given other processing node;

wherein each of said processing units includes interconnect logic, coupled to each point-to-point communication link of that processing unit, that broadcasts operations received from others of said processing units to one or more of said processing units.

2. The data processing system of claim 1, wherein:

each point-to-point communication link coupling processing units within said plurality of processing nodes comprises a first tier link;

each point-to-point communication link coupling processing units in different processing nodes comprises a second tier link;

processing units coupled by said first tier links all follow a first uniform connectivity rule; and processing units coupled by said second tier links all follow a second uniform connectivity rule.

3. The data processing system of claim 1, wherein each point-to-point communication link comprises a uni-directional communication link.

4. The data processing system of claim 3, wherein each said point-to-point communication link comprises one of a pair of point-to-point communication links having opposing directions of information flow.

5. The data processing system of claim 1, wherein each of said processing nodes comprises a multi-chip module (MCM).

6. The data processing system of claim 1, wherein each processing node of the data processing system is directly connected to each other processing node by a respective one of multiple point-to-point communication links between pairs of processing units.

7. A processing unit for a multi-processor data processing system, wherein said multi-processor data processing system includes at least three processing nodes, said processing unit comprising:

at least one processor core that executes instructions;

at least one master that initiates operations communicated to other processing units;

at least one snooper that receives operations from the other processing units; and interconnect logic having:

connections for a plurality of first tier point-to-point communication links that links the processing unit to each other of at least four local processing units in a processing node to which the processing unit belongs; and a connection for a second tier point-to-point communication link that links the processing unit to a remote processing unit in a different processing node than the processing unit;

wherein said interconnect logic broadcasts operations received from local processing units via the first tier point-to-point communication links to said remote processing unit via the second tier point-to-point communication link and broadcasts operations received from the remote processing unit via the second tier point-to-point communication link to each other of the local processing units via the first tier point-to-point communication links;

wherein the processing unit is a sole processing unit in its processing node coupled to any processing unit in the different processing node.

8. The processing unit of claim 7, wherein each point-to-point communication link comprises a uni-directional communication link.

9. The processing unit of claim 8, wherein each said point-to-point communication link comprises one of a pair of point-to-point communication links having opposing directions of information flow.

10. A multi-chip module, comprising:

a plurality of processing units including the processing unit of claim 7; and a package containing said plurality of processing units.

11. A method in a data processing system including at least three processing node each including at least four processing units, said method comprising:

connecting each of the processing units in the data processing system by a respective point-to-point communication link with each other processing unit in its processing node;

connecting at least one processing unit in each of the processing nodes by a point-to-point communication link to a processing unit in a different processing node;

connecting no more than one processing unit in each processing node by a point-to-point communication link to a processing unit in a given other processing node; and configuring each of said plurality of processing units to broadcast operations received from others of said processing units to one or more of said processing units.

12. The method of claim 11, wherein:

each point-to-point communication link coupling processing units within said plurality of processing nodes comprises a first tier link;

each point-to-point communication link coupling processing units in different processing nodes comprises a second tier link; and said providing comprises providing a data processing system in which processing units coupled by said first tier links all follow a first uniform connectivity rule and processing units coupled by said second tier links all follow a second uniform connectivity rule.

13. The method of claim 11, and further comprising:

reconfiguring the data processing system from a first configuration to a second configuration during operation of the data processing system without interrupting communication of operations between processing units in the second configuration.

14. The method of claim 13, wherein said reconfiguring comprises coupling one or more additional processing units to the data processing system.

15. The method of claim 11, and further comprising directly connecting each processing node to each other processing node in the data processing system by a respective one of multiple point-to-point communication links between pairs of processing units.

* * * * *